US012634653B2

(12) United States Patent
Walker et al.

(10) Patent No.: US 12,634,653 B2
(45) **Date of Patent: \*May 19, 2026**

(54) LOCATION BASED AUDIO SIGNAL MESSAGE PROCESSING

(71) Applicant: ST VRTech, LLC, Delray Beach, FL (US)

(72) Inventors: Bruce Walker, Atlanta, GA (US); John Usher, Beer (GB); John P. Keady, Fairfax Station, VA (US)

(73) Assignee: ST VRTech, LLC, Delray Beach, FL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/736,639

(22) Filed: Jun. 7, 2024

(65) Prior Publication Data

US 2024/0349005 A1     Oct. 17, 2024

Related U.S. Application Data

(63) Continuation of application No. 18/134,567, filed on Apr. 13, 2023, now Pat. No. 12,041,438.

(51) Int. Cl.
| | |
|---|---|
| *H04S 7/00* | (2006.01) |
| *H04R 3/04* | (2006.01) |
| *H04R 5/033* | (2006.01) |
| *H04R 5/04* | (2006.01) |
| *H04W 4/029* | (2018.01) |

(52) U.S. Cl.
CPC ............... *H04S 7/304* (2013.01); *H04R 3/04* (2013.01); *H04R 5/033* (2013.01); *H04R 5/04* (2013.01); *H04S 7/307* (2013.01); *H04W 4/029* (2018.02); *H04S 2420/01* (2013.01)

(58) Field of Classification Search
CPC ...... H04S 7/304; H04S 7/307; H04S 2420/01; H04R 3/04; H04R 5/033; H04R 5/04; H04W 4/029
USPC .................................... 381/309, 310, 98, 57
See application file for complete search history.

(56) References Cited

U.S. PATENT DOCUMENTS

| | | | |
|---|---|---|---|
| 2,803,308 | A | 8/1957 | Mattia |
| 3,028,454 | A | 4/1962 | Kohorn |
| 3,729,598 | A | 4/1973 | Tegt |
| 3,876,843 | A | 4/1975 | Moen |

(Continued)

FOREIGN PATENT DOCUMENTS

| | | |
|---|---|---|
| AU | 2006200446 | 2/2006 |
| CA | 2215764 | 11/1996 |

(Continued)

OTHER PUBLICATIONS

'400 Patent Family Tree, Exhibit-1009, Filed on Dec. 10, 2021—Cited in IPR2022-00282, challenging U.S. Pat. No. 8,315,400.

(Continued)

*Primary Examiner* — Xu Mei
(74) *Attorney, Agent, or Firm* — Akerman LLP; Peter A. Chiabotti

(57) ABSTRACT

A system is described that includes a display configured to visually display a mixed visual signal and audio signal, which includes a camera, a first microphone, a second microphone, two speakers, memory, a processor, that displays a mixed visual signal and the speakers emit a mixed audio signal.

18 Claims, 9 Drawing Sheets

(56) References Cited

U.S. PATENT DOCUMENTS

| | | | |
|---|---|---|---|
| 4,041,256 A | 8/1977 | Ohta |
| 4,054,749 A | 10/1977 | Suzuki et al. |
| 4,088,849 A | 5/1978 | Usami et al. |
| 4,455,677 A | 6/1984 | Fox |
| 4,533,795 A | 8/1985 | Baumhauer |
| 4,555,677 A | 11/1985 | Beesley |
| 4,596,902 A | 6/1986 | Gilman |
| 4,827,458 A | 5/1989 | D'Alayer de Costemore D'Arc |
| 4,891,841 A | 1/1990 | Bohn |
| 4,941,187 A | 7/1990 | Slater |
| 4,947,432 A | 8/1990 | Topholm |
| 4,947,440 A | 8/1990 | Bateman et al. |
| 5,002,151 A | 3/1991 | Oliveira et al. |
| 5,027,410 A | 6/1991 | Williamson et al. |
| 5,033,090 A | 7/1991 | Weinrich |
| 5,182,774 A | 1/1993 | Bourk |
| 5,202,927 A | 4/1993 | Topholm |
| 5,204,906 A | 4/1993 | Nohara |
| 5,208,867 A | 5/1993 | Stites, III |
| 5,251,263 A | 10/1993 | Andrea |
| 5,259,033 A | 11/1993 | Goodings |
| 5,267,321 A | 11/1993 | Langberg |
| 5,276,740 A | 1/1994 | Inanaga et al. |
| 5,298,692 A | 3/1994 | Ikeda |
| 5,317,273 A | 5/1994 | Hanson |
| 5,327,506 A | 7/1994 | Stites |
| 5,345,430 A | 9/1994 | Moe |
| 5,390,254 A | 2/1995 | Adelman |
| 5,430,826 A | 7/1995 | Webster |
| 5,467,401 A | 11/1995 | Nagamitsu et al. |
| 5,473,684 A | 12/1995 | Bartlett |
| 5,479,522 A | 12/1995 | Lindemann |
| 5,524,056 A | 6/1996 | Killion et al. |
| 5,526,819 A | 6/1996 | Martin |
| 5,528,739 A | 6/1996 | Lucas et al. |
| 5,539,831 A | 7/1996 | Harley |
| 5,550,923 A | 8/1996 | Hotvet |
| 5,557,659 A | 9/1996 | Hyde-Thomson |
| 5,577,511 A | 11/1996 | Killion |
| 5,606,621 A | 2/1997 | Reiter et al. |
| 5,632,002 A | 5/1997 | Hashimoto et al. |
| 5,636,351 A | 6/1997 | Lee |
| 5,647,011 A | 7/1997 | Garvis |
| 5,649,055 A | 7/1997 | Gupta |
| 5,692,059 A | 11/1997 | Kruger |
| 5,740,262 A | 4/1998 | Yoshida et al. |
| 5,748,754 A | 5/1998 | Maag et al. |
| 5,764,778 A | 6/1998 | Zurek |
| 5,771,041 A | 6/1998 | Small |
| 5,787,187 A | 7/1998 | Bouchard |
| 5,799,273 A | 8/1998 | Mitchell et al. |
| 5,826,064 A | 10/1998 | Loring et al. |
| 5,862,065 A | 1/1999 | Muthusamy |
| 5,887,070 A | 3/1999 | Iseberg |
| 5,903,868 A | 5/1999 | Yuen et al. |
| 5,909,667 A | 6/1999 | Leontiades et al. |
| 5,920,835 A | 7/1999 | Huzenlaub et al. |
| 5,923,624 A | 7/1999 | Groeger |
| 5,930,751 A | 7/1999 | Cohrs et al. |
| 5,933,506 A | 8/1999 | Aoki |
| 5,933,510 A | 8/1999 | Bryant |
| 5,937,070 A | 8/1999 | Todter |
| 5,946,050 A | 8/1999 | Wolff |
| 5,953,392 A | 9/1999 | Rhie et al. |
| 5,956,681 A | 9/1999 | Yamakita |
| 6,005,525 A | 12/1999 | Kivela |
| 6,021,205 A | 2/2000 | Yamada |
| 6,021,207 A | 2/2000 | Puthuff et al. |
| 6,021,325 A | 2/2000 | Hall |
| 6,028,514 A | 2/2000 | Lemelson |
| 6,048,320 A | 4/2000 | Brainard, II |
| 6,056,698 A | 5/2000 | Iseberg |
| 6,069,963 A | 5/2000 | Martin |
| 6,072,645 A | 6/2000 | Sprague |
| 6,094,492 A | 7/2000 | Boesen |
| 6,094,494 A | 7/2000 | Haroldson |
| 6,101,256 A | 8/2000 | Steelman |
| 6,118,877 A | 9/2000 | Lindemann |
| 6,118,878 A | 9/2000 | Jones |
| 6,141,426 A | 10/2000 | Stobba |
| 6,151,571 A | 11/2000 | Pertrushin |
| 6,160,758 A | 12/2000 | Spiesberger |
| 6,163,338 A | 12/2000 | Johnson et al. |
| 6,163,508 A | 12/2000 | Kim et al. |
| 6,173,259 B1 | 1/2001 | Bijl |
| 6,175,633 B1 | 1/2001 | Morrill |
| 6,198,971 B1 | 3/2001 | Leysieffer |
| 6,226,389 B1 | 5/2001 | Lemelson et al. |
| 6,263,147 B1 | 7/2001 | Tognazzini |
| 6,269,161 B1 | 7/2001 | McLaughlin |
| 6,298,323 B1 | 10/2001 | Kaemmerer |
| 6,308,158 B1 | 10/2001 | Kuhnen et al. |
| 6,311,092 B1 | 10/2001 | Yamada |
| 6,338,038 B1 | 1/2002 | Hanson |
| 6,359,993 B2 | 3/2002 | Brimhall |
| 6,400,652 B1 | 6/2002 | Goldberg et al. |
| 6,405,165 B1 | 6/2002 | Blum et al. |
| 6,408,272 B1 | 6/2002 | White |
| 6,415,034 B1 | 7/2002 | Hietanen |
| 6,424,721 B1 | 7/2002 | Hohn |
| 6,445,799 B1 | 9/2002 | Taenzer |
| 6,456,975 B1 | 9/2002 | Chang |
| 6,463,413 B1 | 10/2002 | Applebaum |
| 6,475,163 B1 | 11/2002 | Smits |
| 6,483,899 B2 | 11/2002 | Agraharam et al. |
| 6,490,557 B1 | 12/2002 | Jeppesen |
| 6,513,621 B1 | 2/2003 | Deslauriers et al. |
| 6,526,148 B1 | 2/2003 | Jourjine |
| 6,526,381 B1 | 2/2003 | Wilson |
| 6,554,761 B1 | 4/2003 | Puria |
| 6,567,524 B1 | 5/2003 | Svean et al. |
| 6,593,848 B1 | 7/2003 | Atkins |
| 6,597,787 B1 | 7/2003 | Lindgren |
| 6,606,598 B1 | 8/2003 | Holthouse |
| 6,639,987 B2 | 10/2003 | McIntosh |
| 6,647,123 B2 | 11/2003 | Kandel |
| 6,647,368 B2 | 11/2003 | Nemirovski |
| 6,648,368 B2 | 11/2003 | Nemirovski |
| RE38,351 E | 12/2003 | Iseberg |
| 6,658,122 B1 | 12/2003 | Westermann |
| 6,661,886 B1 | 12/2003 | Huart |
| 6,661,901 B1 | 12/2003 | Svean et al. |
| 6,671,379 B2 | 12/2003 | Nemirovski |
| 6,671,643 B2 | 12/2003 | Kachler |
| 6,674,862 B1 | 1/2004 | Magilen |
| 6,687,339 B2 | 2/2004 | Martin |
| 6,687,377 B2 | 2/2004 | Voix |
| 6,687,671 B2 | 2/2004 | Gudorf et al. |
| 6,717,991 B1 | 4/2004 | Gustafsson |
| 6,725,194 B1 | 4/2004 | Bartosik et al. |
| 6,728,385 B2 | 4/2004 | Kvaloy et al. |
| 6,738,482 B1 | 5/2004 | Jaber |
| 6,738,485 B1 | 5/2004 | Boesen |
| 6,748,238 B1 | 6/2004 | Lau |
| 6,754,359 B1 | 6/2004 | Svean et al. |
| 6,760,754 B1 | 7/2004 | Isaacs et al. |
| 6,775,206 B2 | 8/2004 | Karhu |
| 6,782,106 B1 | 8/2004 | Kong et al. |
| 6,785,394 B1 | 8/2004 | Olsen |
| 6,789,060 B1 | 9/2004 | Wolfe et al. |
| 6,804,638 B2 | 10/2004 | Fiedler |
| 6,804,643 B1 | 10/2004 | Kiss |
| 6,826,286 B1 | 11/2004 | Arndt et al. |
| 6,837,857 B2 | 1/2005 | Stirnemenn |
| 6,879,692 B2 | 4/2005 | Nielsen |
| 6,910,013 B2 | 6/2005 | Allegro |
| 6,912,289 B2 | 6/2005 | Vonlanthen |
| 6,941,161 B1 | 9/2005 | Bobisuthi |
| 6,987,992 B2 | 1/2006 | Hundal |
| 7,003,099 B1 | 2/2006 | Zhang |
| 7,003,123 B2 | 2/2006 | Kanevsky |
| 7,020,297 B2 | 3/2006 | Fang |
| 7,037,274 B2 | 5/2006 | Thornton |
| 7,039,195 B1 | 5/2006 | Svean |

(56)  References Cited

U.S. PATENT DOCUMENTS

| | | | |
|---|---|---|---|
| 7,039,585 | B2 | 5/2006 | Wilmot |
| 7,043,037 | B2 | 5/2006 | Lichtblau |
| 7,050,592 | B1 | 5/2006 | Iseberg |
| 7,050,966 | B2 | 5/2006 | Schneider |
| 7,050,971 | B1 | 5/2006 | Kaufholz |
| 7,072,482 | B2 | 7/2006 | Van Doorn et al. |
| 7,082,393 | B2 | 7/2006 | Lahr |
| 7,092,532 | B2 | 8/2006 | Luo |
| 7,103,188 | B1 | 9/2006 | Jones |
| 7,107,109 | B1 | 9/2006 | Nathan et al. |
| 7,110,554 | B2 | 9/2006 | Brennan |
| 7,130,437 | B2 | 10/2006 | Stonikas et al. |
| 7,158,643 | B2 | 1/2007 | Lavoie et al. |
| 7,158,933 | B2 | 1/2007 | Balan |
| 7,162,041 | B2 | 1/2007 | Haapapuro |
| 7,174,022 | B1 | 2/2007 | Zhan |
| 7,177,433 | B2 | 2/2007 | Sibbald |
| 7,181,020 | B1 | 2/2007 | Riley |
| 7,181,030 | B2 | 2/2007 | Rasmussen |
| 7,209,569 | B2 | 4/2007 | Boesen |
| 7,215,766 | B2 | 5/2007 | Wurtz |
| 7,223,245 | B2 | 5/2007 | Zoth |
| 7,246,058 | B2 | 7/2007 | Burnett |
| 7,277,722 | B2 | 10/2007 | Rosenzweig |
| 7,280,849 | B1 | 10/2007 | Bailey |
| 7,312,699 | B2 | 12/2007 | Chornenky |
| 7,346,504 | B2 | 3/2008 | Liu |
| 7,359,504 | B1 | 4/2008 | Reuss |
| 7,383,178 | B2 | 6/2008 | Visser |
| 7,395,090 | B2 | 7/2008 | Alden |
| 7,430,299 | B2 | 9/2008 | Armstrong et al. |
| 7,430,300 | B2 | 9/2008 | Vosburgh |
| 7,433,463 | B2 | 10/2008 | Alves |
| 7,433,714 | B2 | 10/2008 | Howard et al. |
| 7,444,353 | B1 | 10/2008 | Chen |
| 7,450,730 | B2 | 11/2008 | Bertg et al. |
| 7,464,029 | B2 | 12/2008 | Visser |
| 7,477,754 | B2 | 1/2009 | Rasmussen |
| 7,477,756 | B2 | 1/2009 | Wickstrom et al. |
| 7,477,922 | B2 | 1/2009 | Lewis |
| 7,502,484 | B2 | 3/2009 | Ngia |
| 7,512,245 | B2 | 3/2009 | Rasmussen |
| 7,519,193 | B2 | 4/2009 | Fretz |
| 7,529,379 | B2 | 5/2009 | Zurek |
| 7,532,734 | B2 | 5/2009 | Pham |
| 7,536,006 | B2 | 5/2009 | Patel |
| 7,562,020 | B2 | 7/2009 | Le et al. |
| 7,574,917 | B2 | 8/2009 | Von Dach |
| 7,590,254 | B2 | 9/2009 | Olsen |
| 7,617,099 | B2 | 11/2009 | Yang |
| 7,623,823 | B2 | 11/2009 | Zito |
| 7,634,094 | B2 | 12/2009 | Reber |
| 7,659,827 | B2 | 2/2010 | Gunderson |
| 7,680,465 | B2 | 3/2010 | Issa |
| 7,702,482 | B2 | 4/2010 | Graepel |
| 7,710,654 | B2 | 5/2010 | Ashkenazi |
| 7,715,568 | B2 | 5/2010 | Nakano |
| 7,715,577 | B2 | 5/2010 | Allen |
| 7,729,912 | B1 | 6/2010 | Bacchiani |
| 7,756,281 | B2 | 7/2010 | Goldstein et al. |
| 7,756,283 | B2 | 7/2010 | Bramslow |
| 7,756,285 | B2 | 7/2010 | Sjursen et al. |
| 7,773,743 | B2 | 8/2010 | Stokes |
| 7,773,759 | B2 | 8/2010 | Alves |
| 7,773,763 | B2 | 8/2010 | Pedersen |
| 7,774,202 | B2 | 8/2010 | Spengler |
| 7,778,434 | B2 | 8/2010 | Juneau et al. |
| 7,801,318 | B2 | 9/2010 | Bartel |
| 7,801,726 | B2 | 9/2010 | Ariu |
| 7,804,974 | B2 | 9/2010 | Paludan-Muller |
| 7,813,520 | B2 | 10/2010 | Dach |
| 7,817,808 | B2 | 10/2010 | Konchitsky |
| 7,844,070 | B2 | 11/2010 | Abolfathi |
| 7,844,248 | B2 | 11/2010 | Sotack |
| 7,853,031 | B2 | 12/2010 | Hamacher |
| 7,861,008 | B2 | 12/2010 | Batson et al. |
| 7,861,723 | B2 | 1/2011 | Dedrick |
| 7,869,606 | B2 | 1/2011 | Fichtl |
| 7,903,825 | B1 | 3/2011 | Melanson |
| 7,903,826 | B2 | 3/2011 | Boersma |
| 7,903,833 | B2 | 3/2011 | Goldberg |
| 7,920,557 | B2 | 4/2011 | Moote |
| 7,925,007 | B2 | 4/2011 | Stokes |
| 7,929,713 | B2 | 4/2011 | Victorian |
| 7,933,423 | B2 | 4/2011 | Baekgaard Jensen |
| 7,936,885 | B2 | 5/2011 | Frank |
| 7,953,241 | B2 | 5/2011 | Jorgensen |
| 7,983,433 | B2 | 7/2011 | Nemirovski |
| 7,983,907 | B2 | 7/2011 | Visser |
| 7,986,791 | B2 | 7/2011 | Bostick |
| 7,986,802 | B2 | 7/2011 | Ziller |
| 7,995,773 | B2 | 8/2011 | Mao |
| 8,014,553 | B2 | 9/2011 | Radivojevic et al. |
| 8,018,337 | B2 | 9/2011 | Jones |
| 8,019,091 | B2 | 9/2011 | Burnett |
| 8,027,481 | B2 | 9/2011 | Beard |
| 8,045,840 | B2 | 10/2011 | Murata et al. |
| 8,047,207 | B2 | 11/2011 | Perez |
| 8,050,143 | B2 | 11/2011 | Nicholas |
| 8,068,627 | B2 | 11/2011 | Zhan |
| 8,077,872 | B2 | 12/2011 | Dyer |
| 8,081,780 | B2 | 12/2011 | Goldstein |
| 8,085,943 | B2 | 12/2011 | Bizjak |
| 8,086,093 | B2 | 12/2011 | Stuckman |
| 8,111,839 | B2 | 2/2012 | Goldstein |
| 8,111,840 | B2 | 2/2012 | Haulick |
| 8,111,849 | B2 | 2/2012 | Tateno |
| 8,116,472 | B2 | 2/2012 | Mizuno |
| 8,116,489 | B2 | 2/2012 | Mejia |
| 8,121,301 | B2 | 2/2012 | Suzuki |
| 8,140,325 | B2 | 3/2012 | Kanevsky |
| 8,144,881 | B2 | 3/2012 | Crockett |
| 8,144,891 | B2 | 3/2012 | Her |
| 8,150,044 | B2 | 4/2012 | Goldstein |
| 8,150,084 | B2 | 4/2012 | Jessen |
| 8,160,261 | B2 | 4/2012 | Schulein |
| 8,160,273 | B2 | 4/2012 | Visser |
| 8,162,846 | B2 | 4/2012 | Epley |
| 8,180,078 | B2 | 5/2012 | Zellner |
| 8,184,823 | B2 | 5/2012 | Itabashi |
| 8,186,478 | B1 | 5/2012 | Grason |
| 8,189,803 | B2 | 5/2012 | Bergeron |
| 8,194,864 | B2 | 6/2012 | Goldstein et al. |
| 8,194,865 | B2 | 6/2012 | Goldstein |
| 8,199,919 | B2 | 6/2012 | Goldstein et al. |
| 8,199,942 | B2 | 6/2012 | Mao |
| 8,204,435 | B2 | 6/2012 | Seshadri |
| 8,208,609 | B2 | 6/2012 | Harris |
| 8,208,642 | B2 | 6/2012 | Edwards |
| 8,208,644 | B2 | 6/2012 | Goldstein et al. |
| 8,208,652 | B2 | 6/2012 | Keady |
| 8,209,181 | B2 | 6/2012 | Heckerman et al. |
| 8,213,629 | B2 | 7/2012 | Goldstein |
| 8,218,784 | B2 | 7/2012 | Schulein |
| 8,221,861 | B2 | 7/2012 | Keady |
| 8,229,128 | B2 | 7/2012 | Keady |
| 8,229,148 | B2 | 7/2012 | Rasmssen |
| 8,229,513 | B2 | 7/2012 | Ibe |
| 8,251,925 | B2 | 8/2012 | Staab et al. |
| 8,254,586 | B2 | 8/2012 | Voix |
| 8,254,591 | B2 | 8/2012 | Goldstein |
| 8,270,629 | B2 | 9/2012 | Bothra |
| 8,270,634 | B2 | 9/2012 | Harney |
| 8,306,235 | B2 | 11/2012 | Mahowald |
| 8,312,960 | B2 | 11/2012 | Keady |
| 8,315,400 | B2 | 11/2012 | Goldstein et al. |
| 8,322,222 | B2 | 12/2012 | Goldberg |
| 8,340,309 | B2 | 12/2012 | Burnett |
| 8,351,634 | B2 | 1/2013 | Khenkin |
| 8,369,901 | B2 | 2/2013 | Haulick |
| 8,374,361 | B2 | 2/2013 | Moon |
| 8,385,560 | B2 | 2/2013 | Solbeck |
| 8,391,534 | B2 | 3/2013 | Ambrose et al. |
| 8,401,198 | B2 | 3/2013 | Oh et al. |

(56) References Cited

U.S. PATENT DOCUMENTS

| | | |
|---|---|---|
| 8,401,200 B2 | 3/2013 | Tiscareno |
| 8,411,880 B2 | 4/2013 | Wang |
| 8,437,492 B2 | 5/2013 | Goldstein et al. |
| 8,447,370 B2 | 5/2013 | Ueda |
| 8,462,969 B2 | 6/2013 | Claussen |
| 8,462,974 B2 | 6/2013 | Jeong |
| 8,472,616 B1 | 6/2013 | Jiang |
| 8,477,955 B2 | 7/2013 | Engle |
| 8,488,799 B2 | 7/2013 | Goldstein et al. |
| 8,493,204 B2 | 7/2013 | Wong et al. |
| 8,515,089 B2 | 8/2013 | Nicholson |
| 8,522,916 B2 | 9/2013 | Keady |
| 8,548,181 B2 | 10/2013 | Kraemer |
| 8,550,206 B2 | 10/2013 | Keady et al. |
| 8,554,350 B2 | 10/2013 | Keady et al. |
| 8,577,062 B2 | 11/2013 | Goldstein |
| 8,594,341 B2 | 11/2013 | Rothschild |
| 8,600,067 B2 | 12/2013 | Usher et al. |
| 8,611,548 B2 | 12/2013 | Bizjak |
| 8,611,560 B2 | 12/2013 | Goldstein |
| 8,625,818 B2 | 1/2014 | Stultz |
| 8,625,819 B2 | 1/2014 | Goldstein |
| 8,631,801 B2 | 1/2014 | Keady |
| 8,649,540 B2 | 2/2014 | Killion et al. |
| 8,652,040 B2 | 2/2014 | LeBoeuf |
| 8,657,064 B2 | 2/2014 | Staab et al. |
| 8,678,011 B2 | 3/2014 | Goldstein et al. |
| 8,693,704 B2 | 4/2014 | Kim |
| 8,718,288 B2 | 5/2014 | Woods |
| 8,718,305 B2 | 5/2014 | Usher |
| 8,718,313 B2 | 5/2014 | Keady |
| 8,744,091 B2 | 6/2014 | Chen et al. |
| 8,750,295 B2 | 6/2014 | Liron |
| 8,774,433 B2 | 7/2014 | Goldstein |
| 8,774,435 B2 | 7/2014 | Ambrose et al. |
| 8,792,669 B2 | 7/2014 | Harsch |
| 8,798,278 B2 | 8/2014 | Isabelle |
| 8,798,279 B2 | 8/2014 | Ranta |
| 8,798,289 B1 | 8/2014 | Every |
| 8,804,974 B1 | 8/2014 | Melanson |
| 8,848,939 B2 | 9/2014 | Keady et al. |
| 8,851,372 B2 | 10/2014 | Zhou |
| 8,855,343 B2 | 10/2014 | Usher |
| 8,903,113 B2 | 12/2014 | Gebert |
| 8,917,880 B2 | 12/2014 | Goldstein et al. |
| 8,917,892 B2 | 12/2014 | Poe |
| 8,917,894 B2 | 12/2014 | Goldstein |
| 8,942,370 B2 | 1/2015 | Li |
| 8,942,405 B2 | 1/2015 | Jones et al. |
| 8,948,428 B2 | 2/2015 | Kates |
| 8,983,081 B2 | 3/2015 | Bayley |
| 8,992,710 B2 | 3/2015 | Keady |
| 9,002,023 B2 | 4/2015 | Gauger |
| 9,013,351 B2 | 4/2015 | Park |
| 9,037,458 B2 | 5/2015 | Park et al. |
| 9,053,697 B2 | 6/2015 | Park |
| 9,076,427 B2 | 7/2015 | Alderson |
| 9,112,701 B2 | 8/2015 | Sano |
| 9,113,240 B2 | 8/2015 | Ramakrishman |
| 9,113,267 B2 | 8/2015 | Usher et al. |
| 9,123,323 B2 | 9/2015 | Keady |
| 9,123,343 B2 | 9/2015 | Kurki-Suonio |
| 9,124,982 B2 | 9/2015 | Goldstein et al. |
| 9,135,797 B2 | 9/2015 | Couper et al. |
| 9,135,809 B2 | 9/2015 | Chang |
| 9,137,597 B2 | 9/2015 | Usher |
| 9,138,353 B2 | 9/2015 | Keady |
| 9,142,207 B2 | 9/2015 | Hendrix |
| 9,165,567 B2 | 10/2015 | Visser |
| 9,185,481 B2 | 11/2015 | Goldstein et al. |
| 9,191,732 B2 | 11/2015 | Wurtz |
| 9,191,740 B2 | 11/2015 | McIntosh |
| 9,196,247 B2 | 11/2015 | Harada |
| 9,216,237 B2 | 12/2015 | Keady |
| 9,270,244 B2 | 2/2016 | Usher et al. |
| 9,288,592 B2 | 3/2016 | Basseas |
| 9,338,568 B2 | 5/2016 | Van Hal |
| 9,357,288 B2 | 5/2016 | Goldstein |
| 9,369,814 B2 | 6/2016 | Victorian |
| 9,445,183 B2 | 9/2016 | Dahl |
| 9,456,279 B1 | 9/2016 | Murdoch |
| 9,462,100 B2 | 10/2016 | Usher |
| 9,491,542 B2 | 11/2016 | Usher |
| 9,497,423 B2 | 11/2016 | Moberly |
| 9,539,147 B2 | 1/2017 | Keady et al. |
| 9,584,948 B2 | 2/2017 | Yeo et al. |
| 9,609,424 B2 | 3/2017 | Goldstein |
| 9,628,896 B2 | 4/2017 | Ichimura |
| 9,653,869 B1 | 5/2017 | Hersman |
| 9,684,778 B2 | 6/2017 | Tharappel |
| 9,685,921 B2 | 6/2017 | Smith |
| 9,757,069 B2 | 9/2017 | Keady et al. |
| 9,763,003 B2 | 9/2017 | Usher |
| 9,779,716 B2 | 10/2017 | Gadonniex |
| 9,781,530 B2 | 10/2017 | Usher et al. |
| 9,843,854 B2 | 12/2017 | Keady |
| 9,894,452 B1 | 2/2018 | Termeulen |
| 9,943,185 B2 | 4/2018 | Chen |
| 9,977,644 B2 | 5/2018 | Schissler |
| 10,012,529 B2 | 7/2018 | Goldstein et al. |
| 10,045,107 B2 | 8/2018 | Kirsch et al. |
| 10,142,332 B2 | 11/2018 | Ravindran |
| 10,190,904 B2 | 1/2019 | Goldstein et al. |
| 10,248,744 B2 | 4/2019 | Schissler et al. |
| 10,284,939 B2 | 5/2019 | Radin |
| 10,297,246 B2 | 5/2019 | Asada |
| 10,365,883 B2 | 7/2019 | Goldstein et al. |
| 10,413,197 B2 | 9/2019 | LeBoeuf |
| 10,506,320 B1 | 12/2019 | Lott |
| 10,667,072 B2 | 5/2020 | Schmidt et al. |
| 10,709,339 B1 | 7/2020 | Lusted |
| 10,760,948 B2 | 9/2020 | Goldstein |
| 10,848,827 B2 | 11/2020 | Sengupta et al. |
| 10,917,711 B2 | 2/2021 | Higgins |
| 10,966,015 B2 | 3/2021 | Usher |
| 10,970,375 B2 | 4/2021 | Shila |
| 10,979,836 B2 | 4/2021 | Usher et al. |
| 11,006,198 B2 | 5/2021 | Lott |
| 11,012,770 B2 | 5/2021 | Hatfield et al. |
| 11,032,664 B2 | 6/2021 | Walker |
| 11,039,259 B2 | 6/2021 | Goldstein et al. |
| 11,051,704 B1 | 7/2021 | Tran |
| 11,057,701 B2 | 7/2021 | Goldstein et al. |
| 11,115,750 B2 | 9/2021 | Monsarrant-Chanon |
| 11,122,357 B2 | 9/2021 | Burnett |
| 11,172,298 B2 | 11/2021 | Carrigan |
| 11,217,237 B2 | 1/2022 | Usher et al. |
| 11,244,666 B2 | 2/2022 | Goldstein et al. |
| 11,277,682 B2 | 3/2022 | Usher |
| 11,277,700 B2 | 3/2022 | Goldstein |
| 11,294,619 B2 | 4/2022 | Usher et al. |
| 11,383,158 B2 | 7/2022 | Bonanno |
| 11,393,486 B1 | 7/2022 | Woodruff et al. |
| 11,451,923 B2 * | 9/2022 | Walker .................. H04R 5/033 |
| 11,610,587 B2 | 3/2023 | Goldstein et al. |
| 11,659,315 B2 | 5/2023 | Perez et al. |
| 11,665,493 B2 | 5/2023 | Usher et al. |
| 11,665,499 B2 * | 5/2023 | Walker .................. H04W 4/029 |
| | | 381/98 |
| 11,710,473 B2 | 7/2023 | Goldstein et al. |
| 11,750,965 B2 | 9/2023 | Usher et al. |
| 12,041,438 B2 * | 7/2024 | Walker .................. H04R 5/04 |
| 2001/0041559 A1 | 11/2001 | Salabaschew |
| 2001/0043738 A1 | 11/2001 | Sawhney et al. |
| 2001/0046304 A1 | 11/2001 | Rast |
| 2002/0003889 A1 | 1/2002 | Fischer |
| 2002/0009203 A1 | 1/2002 | Erten |
| 2002/0018798 A1 | 2/2002 | Sewing et al. |
| 2002/0026311 A1 | 2/2002 | Okitsu |
| 2002/0057817 A1 | 5/2002 | Darbut |
| 2002/0069056 A1 | 6/2002 | Nofsinger |
| 2002/0076057 A1 | 6/2002 | Voix |
| 2002/0076059 A1 | 6/2002 | Joynes |
| 2002/0085690 A1 | 7/2002 | Davidson et al. |

(56) References Cited

U.S. PATENT DOCUMENTS

| | | |
|---|---|---|
| 2002/0098878 A1 | 7/2002 | Mooney |
| 2002/0106091 A1 | 8/2002 | Furst et al. |
| 2002/0111798 A1 | 8/2002 | Huang |
| 2002/0116541 A1 | 8/2002 | Parker et al. |
| 2002/0118798 A1 | 8/2002 | Langhart et al. |
| 2002/0123893 A1 | 9/2002 | Woodward |
| 2002/0133513 A1 | 9/2002 | Townsend et al. |
| 2002/0141599 A1 | 10/2002 | Trajkovic |
| 2002/0141602 A1 | 10/2002 | Nemirovski |
| 2002/0143534 A1 | 10/2002 | Hol |
| 2002/0165719 A1 | 11/2002 | Wang |
| 2002/0169596 A1 | 11/2002 | Brill et al. |
| 2002/0169615 A1 | 11/2002 | Kruger et al. |
| 2002/0191799 A1 | 12/2002 | Nordqvist |
| 2002/0191952 A1 | 12/2002 | Fiore |
| 2002/0193130 A1 | 12/2002 | Yang |
| 2003/0008633 A1 | 1/2003 | Bartosik |
| 2003/0026438 A1 | 2/2003 | Ray |
| 2003/0032447 A1 | 2/2003 | Bulthuis |
| 2003/0033152 A1 | 2/2003 | Cameron |
| 2003/0035551 A1 | 2/2003 | Light |
| 2003/0048882 A1 | 3/2003 | Smith |
| 2003/0050777 A1 | 3/2003 | Walker |
| 2003/0055627 A1 | 3/2003 | Balan |
| 2003/0061032 A1 | 3/2003 | Gonopolskiy |
| 2003/0065512 A1 | 4/2003 | Walker |
| 2003/0065620 A1 | 4/2003 | Gailey et al. |
| 2003/0069002 A1 | 4/2003 | Hunter |
| 2003/0083879 A1 | 5/2003 | Cyr et al. |
| 2003/0083883 A1 | 5/2003 | Cyr et al. |
| 2003/0110040 A1 | 6/2003 | Holland et al. |
| 2003/0130016 A1 | 7/2003 | Matsuura |
| 2003/0138118 A1 | 7/2003 | Stahl |
| 2003/0152359 A1 | 8/2003 | Kim |
| 2003/0156725 A1 | 8/2003 | Boone |
| 2003/0161097 A1 | 8/2003 | Le et al. |
| 2003/0165246 A1 | 9/2003 | Kvaloy et al. |
| 2003/0165319 A1 | 9/2003 | Barber |
| 2003/0198357 A1 | 10/2003 | Schneider |
| 2003/0198359 A1 | 10/2003 | Killion |
| 2003/0200096 A1 | 10/2003 | Asai |
| 2003/0228019 A1 | 12/2003 | Eichler |
| 2003/0228023 A1 | 12/2003 | Burnett |
| 2004/0008850 A1 | 1/2004 | Gustavsson |
| 2004/0019482 A1 | 1/2004 | Holub |
| 2004/0042103 A1 | 3/2004 | Mayer |
| 2004/0047474 A1 | 3/2004 | Vries |
| 2004/0047486 A1 | 3/2004 | Van Doorn |
| 2004/0049385 A1 | 3/2004 | Lovance et al. |
| 2004/0086138 A1 | 5/2004 | Kuth |
| 2004/0088162 A1 | 5/2004 | He et al. |
| 2004/0109579 A1 | 6/2004 | Izuchi |
| 2004/0109668 A1 | 6/2004 | Stuckman |
| 2004/0125965 A1 | 7/2004 | Alberth, Jr. et al. |
| 2004/0128136 A1 | 7/2004 | Irani |
| 2004/0133421 A1 | 7/2004 | Burnett |
| 2004/0150717 A1 | 8/2004 | Page |
| 2004/0160573 A1 | 8/2004 | Jannard |
| 2004/0165742 A1 | 8/2004 | Shennib |
| 2004/0179694 A1 | 9/2004 | Alley |
| 2004/0185804 A1 | 9/2004 | Kanamori |
| 2004/0190737 A1 | 9/2004 | Kuhnel et al. |
| 2004/0196992 A1 | 10/2004 | Ryan |
| 2004/0202333 A1 | 10/2004 | Csermak |
| 2004/0202339 A1 | 10/2004 | O'Brien |
| 2004/0202340 A1 | 10/2004 | Armstrong |
| 2004/0203351 A1 | 10/2004 | Shearer et al. |
| 2004/0252852 A1 | 12/2004 | Taenzer |
| 2004/0258263 A1 | 12/2004 | Saxton |
| 2004/0264938 A1 | 12/2004 | Felder |
| 2005/0008167 A1 | 1/2005 | Gleissner |
| 2005/0028212 A1 | 2/2005 | Laronne |
| 2005/0033384 A1 | 2/2005 | Sacha |
| 2005/0033571 A1 | 2/2005 | Huang |
| 2005/0047611 A1 | 3/2005 | Mao |
| 2005/0049854 A1 | 3/2005 | Reding |
| 2005/0058300 A1 | 3/2005 | Suzuki |
| 2005/0058313 A1 | 3/2005 | Victorian |
| 2005/0060142 A1 | 3/2005 | Visser |
| 2005/0068171 A1 | 3/2005 | Kelliher |
| 2005/0070337 A1 | 3/2005 | Byford |
| 2005/0071158 A1 | 3/2005 | Byford |
| 2005/0071626 A1 | 3/2005 | Bear |
| 2005/0077102 A1 | 4/2005 | Banter et al. |
| 2005/0078838 A1 | 4/2005 | Simon |
| 2005/0078842 A1 | 4/2005 | Vonlanthen |
| 2005/0090295 A1 | 4/2005 | Ali |
| 2005/0096764 A1 | 5/2005 | Weiser |
| 2005/0096899 A1 | 5/2005 | Padhi et al. |
| 2005/0102142 A1 | 5/2005 | Soufflet |
| 2005/0114124 A1 | 5/2005 | Liu |
| 2005/0123146 A1 | 6/2005 | Voix et al. |
| 2005/0134710 A1 | 6/2005 | Nomura |
| 2005/0157891 A1 | 7/2005 | Johansen |
| 2005/0163289 A1 | 7/2005 | Caspi et al. |
| 2005/0175194 A1 | 8/2005 | Anderson |
| 2005/0182620 A1 | 8/2005 | Kabi |
| 2005/0207605 A1 | 9/2005 | Dehe |
| 2005/0215907 A1 | 9/2005 | Toda |
| 2005/0216531 A1 | 9/2005 | Blandford |
| 2005/0222820 A1 | 10/2005 | Chung |
| 2005/0227674 A1 | 10/2005 | Kopra |
| 2005/0254640 A1 | 11/2005 | Ohki |
| 2005/0254676 A1 | 11/2005 | Rass |
| 2005/0258942 A1 | 11/2005 | Manasseh |
| 2005/0260978 A1 | 11/2005 | Rader |
| 2005/0264425 A1 | 12/2005 | Sato |
| 2005/0281422 A1 | 12/2005 | Armstrong |
| 2005/0281423 A1 | 12/2005 | Armstrong |
| 2005/0283369 A1 | 12/2005 | Clausner et al. |
| 2005/0288057 A1 | 12/2005 | Lai et al. |
| 2006/0013410 A1 | 1/2006 | Wurtz |
| 2006/0018496 A1 | 1/2006 | Niederdrank et al. |
| 2006/0053007 A1 | 3/2006 | Niemisto |
| 2006/0064037 A1 | 3/2006 | Shalon et al. |
| 2006/0067551 A1 | 3/2006 | Cartwright et al. |
| 2006/0074895 A1 | 4/2006 | Belknap |
| 2006/0083387 A1 | 4/2006 | Emoto |
| 2006/0083388 A1 | 4/2006 | Rothschild |
| 2006/0083390 A1 | 4/2006 | Kaderavek |
| 2006/0083395 A1 | 4/2006 | Allen et al. |
| 2006/0088176 A1 | 4/2006 | Werner |
| 2006/0092043 A1 | 5/2006 | Lagassey |
| 2006/0095199 A1 | 5/2006 | Lagassey |
| 2006/0116175 A1 | 6/2006 | Chu |
| 2006/0116877 A1 | 6/2006 | Pickering |
| 2006/0120545 A1 | 6/2006 | Rasmussen |
| 2006/0126821 A1 | 6/2006 | Sahashi |
| 2006/0126865 A1 | 6/2006 | Blarney |
| 2006/0140425 A1 | 6/2006 | Berg |
| 2006/0147063 A1 | 7/2006 | Chen |
| 2006/0153394 A1 | 7/2006 | Beasley |
| 2006/0154642 A1 | 7/2006 | Scannell, Jr. |
| 2006/0167687 A1 | 7/2006 | Kates |
| 2006/0173563 A1 | 8/2006 | Borovitski |
| 2006/0182287 A1 | 8/2006 | Schulein |
| 2006/0182295 A1 | 8/2006 | Dijkstra et al. |
| 2006/0184983 A1 | 8/2006 | Casey |
| 2006/0188075 A1 | 8/2006 | Peterson |
| 2006/0188105 A1 | 8/2006 | Baskerville |
| 2006/0195322 A1 | 8/2006 | Broussard et al. |
| 2006/0204014 A1 | 9/2006 | Iseberg et al. |
| 2006/0223547 A1 | 10/2006 | Chin et al. |
| 2006/0233413 A1 | 10/2006 | Nam |
| 2006/0241948 A1 | 10/2006 | Abrash |
| 2006/0258325 A1 | 11/2006 | Tsutaichi |
| 2006/0262935 A1 | 11/2006 | Goose |
| 2006/0262938 A1 | 11/2006 | Gauger |
| 2006/0262944 A1 | 11/2006 | Raber |
| 2006/0264176 A1 | 11/2006 | Hong |
| 2006/0274166 A1 | 12/2006 | Lee |
| 2006/0285709 A1 | 12/2006 | Barthel |
| 2006/0287014 A1 | 12/2006 | Matsuura |
| 2007/0003090 A1 | 1/2007 | Anderson |

(56) References Cited

U.S. PATENT DOCUMENTS

| | | |
|---|---|---|
| 2007/0009122 A1 | 1/2007 | Hamacher |
| 2007/0009127 A1 | 1/2007 | Klemenz |
| 2007/0014423 A1 | 1/2007 | Darbut |
| 2007/0019817 A1 | 1/2007 | Siltmann |
| 2007/0021148 A1 | 1/2007 | Mahini |
| 2007/0021958 A1 | 1/2007 | Visser et al. |
| 2007/0027676 A1 | 2/2007 | Chambers et al. |
| 2007/0036377 A1 | 2/2007 | Stirnemann |
| 2007/0041589 A1 | 2/2007 | Patel et al. |
| 2007/0043563 A1 | 2/2007 | Comerford et al. |
| 2007/0076896 A1 | 4/2007 | Hosaka |
| 2007/0086600 A1 | 4/2007 | Boesen |
| 2007/0092087 A1 | 4/2007 | Bothra |
| 2007/0100637 A1 | 5/2007 | McCune |
| 2007/0127660 A1 | 6/2007 | Roberts et al. |
| 2007/0143820 A1 | 6/2007 | Pawlowski |
| 2007/0147635 A1 | 6/2007 | Dijkstra |
| 2007/0160243 A1 | 7/2007 | Dijkstra |
| 2007/0172087 A1 | 7/2007 | Olsen |
| 2007/0177743 A1 | 8/2007 | Mertens |
| 2007/0185601 A1 | 8/2007 | Lee |
| 2007/0189544 A1 | 8/2007 | Rosenberg |
| 2007/0194893 A1 | 8/2007 | Deyoe |
| 2007/0201705 A1 | 8/2007 | Dorogusker et al. |
| 2007/0206825 A1 | 9/2007 | Thomasson |
| 2007/0223717 A1 | 9/2007 | Boersma |
| 2007/0225035 A1 | 9/2007 | Gauger |
| 2007/0230734 A1 | 10/2007 | Beard |
| 2007/0233487 A1 | 10/2007 | Cohen |
| 2007/0239294 A1 | 10/2007 | Brueckner |
| 2007/0253569 A1 | 11/2007 | Bose |
| 2007/0255435 A1 | 11/2007 | Cohen |
| 2007/0260460 A1 | 11/2007 | Hyatt |
| 2007/0274531 A1 | 11/2007 | Camp |
| 2007/0281744 A1 | 12/2007 | Andreasson |
| 2007/0291953 A1 | 12/2007 | Ngia et al. |
| 2008/0037801 A1 | 2/2008 | Alves et al. |
| 2008/0063228 A1 | 3/2008 | Mejia |
| 2008/0069369 A1 | 3/2008 | Dyer |
| 2008/0079571 A1 | 4/2008 | Samadani |
| 2008/0089530 A1 | 4/2008 | Bostick et al. |
| 2008/0091421 A1 | 4/2008 | Gustavsson |
| 2008/0101638 A1 | 5/2008 | Ziller |
| 2008/0107282 A1 | 5/2008 | Asada |
| 2008/0107297 A1 | 5/2008 | Fischer et al. |
| 2008/0123866 A1 | 5/2008 | Rule |
| 2008/0129520 A1 | 6/2008 | Lee |
| 2008/0130908 A1 | 6/2008 | Cohen |
| 2008/0137873 A1 | 6/2008 | Goldstein |
| 2008/0145032 A1 | 6/2008 | Lindroos |
| 2008/0152167 A1 | 6/2008 | Taenzer |
| 2008/0152169 A1 | 6/2008 | Asada |
| 2008/0159547 A1 | 7/2008 | Schuler |
| 2008/0162133 A1 | 7/2008 | Couper |
| 2008/0165988 A1 | 7/2008 | Terlizzi et al. |
| 2008/0175411 A1 | 7/2008 | Greve |
| 2008/0181419 A1 | 7/2008 | Goldstein |
| 2008/0201138 A1 | 8/2008 | Visser |
| 2008/0221880 A1 | 9/2008 | Cerra et al. |
| 2008/0240458 A1 | 10/2008 | Goldstein |
| 2008/0257047 A1 | 10/2008 | Pelecanos |
| 2008/0260180 A1 | 10/2008 | Goldstein |
| 2008/0269926 A1 | 10/2008 | Xiang |
| 2009/0010456 A1 | 1/2009 | Goldstein et al. |
| 2009/0016501 A1 | 1/2009 | May |
| 2009/0016541 A1 | 1/2009 | Goldstein |
| 2009/0024234 A1 | 1/2009 | Archibald |
| 2009/0034748 A1 | 2/2009 | Sibbald |
| 2009/0046864 A1 | 2/2009 | Mahabub et al. |
| 2009/0046867 A1 | 2/2009 | Clemow |
| 2009/0067661 A1 | 3/2009 | Keady |
| 2009/0071487 A1 | 3/2009 | Keady |
| 2009/0076821 A1 | 3/2009 | Brenner |
| 2009/0085873 A1 | 4/2009 | Betts |
| 2009/0087003 A1 | 4/2009 | Zurek |
| 2009/0122996 A1 | 5/2009 | Klein |
| 2009/0146840 A1 | 6/2009 | Hess et al. |
| 2009/0175474 A1 | 7/2009 | Salvetti |
| 2009/0180631 A1 | 7/2009 | Michael |
| 2009/0192688 A1 | 7/2009 | Padmanabhan |
| 2009/0227888 A1 | 9/2009 | Salmi |
| 2009/0238386 A1 | 9/2009 | Usher |
| 2009/0274314 A1 | 11/2009 | Arndt |
| 2009/0286515 A1 | 11/2009 | Othmer |
| 2010/0061564 A1 | 3/2010 | Clemow et al. |
| 2010/0119077 A1 | 5/2010 | Platz |
| 2010/0150367 A1 | 6/2010 | Mizuno |
| 2010/0166203 A1 | 7/2010 | Peissig |
| 2010/0223223 A1 | 9/2010 | Sandler |
| 2010/0241256 A1 | 9/2010 | Goldstein et al. |
| 2010/0296668 A1 | 11/2010 | Lee et al. |
| 2010/0316033 A1 | 12/2010 | Atwal |
| 2010/0328224 A1 | 12/2010 | Kerr et al. |
| 2011/0026724 A1 | 2/2011 | Doclo |
| 2011/0055256 A1 | 3/2011 | Phillips |
| 2011/0079227 A1 | 4/2011 | Turcot et al. |
| 2011/0096939 A1 | 4/2011 | Ichimura |
| 2011/0103620 A1 | 5/2011 | Strauss et al. |
| 2011/0116643 A1 | 5/2011 | Tiscareno |
| 2011/0125063 A1 | 5/2011 | Shalon |
| 2011/0135120 A1 | 6/2011 | Larsen |
| 2011/0187640 A1 | 8/2011 | Jacobsen et al. |
| 2011/0264447 A1 | 10/2011 | Visser et al. |
| 2011/0288860 A1 | 11/2011 | Schevciw |
| 2011/0293103 A1 | 12/2011 | Park et al. |
| 2011/0299695 A1 | 12/2011 | Nicholson |
| 2012/0076317 A1 | 3/2012 | Fratti |
| 2012/0170412 A1 | 7/2012 | Calhoun |
| 2013/0041648 A1 | 2/2013 | Osman |
| 2013/0089223 A1 | 4/2013 | Heineman et al. |
| 2013/0098706 A1 | 4/2013 | Keady |
| 2013/0136285 A1 | 5/2013 | Naumann |
| 2013/0149192 A1 | 6/2013 | Keady |
| 2013/0219345 A1 | 8/2013 | Saukko |
| 2013/0251172 A1 | 9/2013 | Mosseri |
| 2014/0003644 A1 | 1/2014 | Keady et al. |
| 2014/0010378 A1 | 1/2014 | Voix |
| 2014/0023203 A1 | 1/2014 | Rotschild |
| 2014/0026665 A1 | 1/2014 | Keady |
| 2014/0089672 A1 | 3/2014 | Luna |
| 2014/0122092 A1 | 5/2014 | Goldstein |
| 2014/0126748 A1 | 5/2014 | Usher et al. |
| 2014/0148101 A1 | 5/2014 | Seshadri |
| 2014/0163976 A1 | 6/2014 | Park |
| 2014/0166122 A1 | 6/2014 | Goldstein et al. |
| 2014/0205123 A1 | 7/2014 | Lafort et al. |
| 2014/0270200 A1 | 9/2014 | Usher et al. |
| 2014/0328505 A1 | 11/2014 | Heinemann et al. |
| 2014/0373854 A1 | 12/2014 | Keady |
| 2015/0150728 A1 | 6/2015 | Duvall |
| 2015/0170645 A1 | 6/2015 | Di et al. |
| 2015/0195641 A1 | 7/2015 | Di et al. |
| 2015/0215701 A1 | 7/2015 | Usher |
| 2015/0358730 A1 | 12/2015 | Kirsch |
| 2015/0382127 A1 | 12/2015 | Sun |
| 2016/0012714 A1 | 1/2016 | Patenaude |
| 2016/0015568 A1 | 1/2016 | Keady |
| 2016/0019024 A1 | 1/2016 | Suzuki et al. |
| 2016/0050483 A1 | 2/2016 | Kulavik et al. |
| 2016/0058378 A1 | 3/2016 | Wisby et al. |
| 2016/0104452 A1 | 4/2016 | Guan et al. |
| 2016/0127818 A1 | 5/2016 | Ambrose |
| 2016/0150064 A1 | 5/2016 | Norris et al. |
| 2016/0192077 A1 | 6/2016 | Keady |
| 2016/0249128 A1 | 8/2016 | Goldstein |
| 2016/0277854 A1 | 9/2016 | Puria |
| 2016/0295311 A1 | 10/2016 | Keady et al. |
| 2017/0134865 A1 | 5/2017 | Goldstein et al. |
| 2017/0142511 A1 | 5/2017 | Dennis |
| 2017/0223451 A1 | 8/2017 | Kirsch |
| 2017/0223478 A1 | 8/2017 | Jot et al. |
| 2017/0245081 A1 | 8/2017 | Lyren et al. |
| 2018/0054668 A1 | 2/2018 | Keady |
| 2018/0115818 A1 | 4/2018 | Asada et al. |

(56) References Cited

U.S. PATENT DOCUMENTS

| | | |
|---|---|---|
| 2018/0132048 A1 | 5/2018 | Usher et al. |
| 2018/0160211 A1 | 6/2018 | Kirsch et al. |
| 2018/0220239 A1 | 8/2018 | Keady et al. |
| 2018/0233125 A1 | 8/2018 | Mitchell |
| 2019/0038224 A1 | 2/2019 | Zhang |
| 2019/0082272 A9 | 3/2019 | Goldstein et al. |
| 2019/0379995 A1 | 12/2019 | Lee |
| 2019/0387305 A1 | 12/2019 | Keady |
| 2020/0379717 A1 | 12/2020 | Mazur et al. |
| 2020/0380945 A1 | 12/2020 | Woodruff et al. |
| 2021/0014597 A1 | 1/2021 | Andersen |
| 2021/0152924 A1 | 5/2021 | Keady |
| 2022/0061767 A1 | 3/2022 | Goldstein et al. |

FOREIGN PATENT DOCUMENTS

| | | |
|---|---|---|
| DE | 4312155 | 10/1994 |
| DE | 102012221233 | 3/2014 |
| DE | 102013203334 | 5/2014 |
| EP | 0495653 A1 | 7/1992 |
| EP | 0643881 | 12/1998 |
| EP | 0935236 | 8/1999 |
| EP | 1415505 | 12/2002 |
| EP | 1033063 B1 | 5/2003 |
| EP | 1320281 | 6/2003 |
| EP | 0692169 | 7/2003 |
| EP | 1483591 | 11/2003 |
| EP | 1385324 | 1/2004 |
| EP | 1385324 A1 | 1/2004 |
| EP | 1401240 | 3/2004 |
| EP | 1570244 | 6/2004 |
| EP | 1489596 | 12/2004 |
| EP | 1519625 A2 | 3/2005 |
| EP | 1594344 | 9/2005 |
| EP | 1638079 | 3/2006 |
| EP | 1640972 A1 | 3/2006 |
| EP | 1674061 | 6/2006 |
| EP | 1681903 | 7/2006 |
| EP | 1800950 | 6/2007 |
| EP | 1841283 | 10/2007 |
| EP | 2749043 | 7/2014 |
| EP | 3158560 | 1/2018 |
| EP | 2991381 | 4/2019 |
| EP | 3068142 | 9/2019 |
| FR | 2560520 | 9/1985 |
| GB | 1518299 | 7/1978 |
| GB | 2082820 | 8/1980 |
| GB | 2441835 | 8/2008 |
| JP | 5145623 | 6/1993 |
| JP | H05199590 | 8/1993 |
| JP | H05336599 | 12/1993 |
| JP | H0877468 | 3/1996 |
| JP | H10162283 | 6/1998 |
| JP | H10294989 | 11/1998 |
| JP | 297362 | 9/1999 |
| JP | 12878298 | 11/1999 |
| JP | H11331990 | 11/1999 |
| JP | 3085237 | 7/2000 |
| JP | 2001045585 | 2/2001 |
| JP | 2001054184 | 2/2001 |
| JP | 2002-204500 A | 7/2002 |
| JP | 3353701 B2 | 12/2002 |
| JP | 2003304599 | 10/2003 |
| JP | 3556987 | 5/2004 |
| JP | 2005064744 | 3/2005 |
| JP | 2005130205 | 5/2005 |
| JP | 2005168888 | 6/2005 |
| JP | 2005227511 | 8/2005 |
| JP | 2005260944 | 9/2005 |
| JP | 2005295175 | 10/2005 |
| JP | 2006107044 | 4/2006 |
| JP | 2004289762 | 2/2007 |
| JP | 2009003040 | 1/2009 |
| JP | 2017147677 | 8/2017 |
| KR | 20020086433 | 11/2002 |
| KR | 100366231 | 12/2002 |
| KR | 20030013732 | 2/2003 |
| KR | 20030058432 | 7/2003 |
| KR | 20030068021 | 8/2003 |
| KR | 20030069471 | 8/2003 |
| KR | 101154948 | 7/2006 |
| KR | 100607492 | 8/2006 |
| KR | 100783099 | 12/2007 |
| KR | 101194923 | 10/2012 |
| TW | 200615862 | 5/2006 |
| WO | WO1986000133 | 1/1986 |
| WO | WO1993026085 | 12/1993 |
| WO | WO1997025790 | 7/1997 |
| WO | WO1998054878 | 12/1998 |
| WO | WO1999043185 | 8/1999 |
| WO | WO2001001731 | 1/2001 |
| WO | WO2001057852 | 8/2001 |
| WO | 01/89083 A1 | 11/2001 |
| WO | WO2002013522 | 2/2002 |
| WO | WO2002017836 | 3/2002 |
| WO | WO2002093891 | 11/2002 |
| WO | WO2002101720 | 12/2002 |
| WO | WO2003023766 | 3/2003 |
| WO | WO2003073790 | 9/2003 |
| WO | WO2004016037 | 2/2004 |
| WO | WO2006026812 | 3/2004 |
| WO | WO2007028250 | 3/2004 |
| WO | WO2004114722 | 12/2004 |
| WO | WO2005029468 | 3/2005 |
| WO | WO2005073875 | 8/2005 |
| WO | WO2005107320 | 11/2005 |
| WO | WO2006034029 | 3/2006 |
| WO | 2006/036262 A2 | 4/2006 |
| WO | 2006/037156 A1 | 4/2006 |
| WO | WO2006037156 | 4/2006 |
| WO | WO2006054205 | 5/2006 |
| WO | WO2006054698 | 5/2006 |
| WO | WO2006074082 | 7/2006 |
| WO | 2006/097099 A1 | 9/2006 |
| WO | WO2006114101 | 11/2006 |
| WO | WO2007007916 | 1/2007 |
| WO | WO2007017809 | 2/2007 |
| WO | WO2007017810 | 2/2007 |
| WO | 2007/073818 A1 | 7/2007 |
| WO | WO2007073818 | 7/2007 |
| WO | WO2007082579 | 7/2007 |
| WO | WO2007092660 | 8/2007 |
| WO | WO2007147077 | 12/2007 |
| WO | WO2008017326 | 2/2008 |
| WO | WO2008050583 | 5/2008 |
| WO | 2008/067454 A2 | 6/2008 |
| WO | WO2008096125 | 8/2008 |
| WO | 2009/023633 A1 | 2/2009 |
| WO | WO2009023633 | 2/2009 |
| WO | WO2009023784 | 2/2009 |
| WO | WO2009097009 | 8/2009 |
| WO | WO2011110901 | 9/2011 |
| WO | WO2011161487 | 12/2011 |
| WO | WO2012097150 | 7/2012 |

OTHER PUBLICATIONS

Nov. 3, 2022 [16] Notice of Deposition of David Kleinschmidt, Exhibit-16, Filed on Nov. 3, 2022—Cited in IPR2022-00282, challenging U.S. Pat. No. 8,315,400.

Aarts, Exhibit-1015, Filed on Jan. 14, 2022—Cited in IPR2022-00410, challenging U.S. Pat. No. 10,979,836.

Adaptive Filtering (Dentino), Exhibit-1012, Filed on Dec. 10, 2021—Cited in IPR2022-00282, challenging U.S. Pat. No. 8,315,400.

Adaptive Filtering Algorithims (Diniz), Exhibit-1013, Filed on Dec. 10, 2021—Cited in IPR2022-00282, challenging U.S. Pat. No. 8,315,400.

Adaptive Noise Cancelling (Widrow), Exhibit-1011, Filed on Dec. 10, 2021—Cited in IPR2022-00282, challenging U.S. Pat. No. 8,315,400.

AirPods (1st generation)—Technical Specifications, Exhibit-2009, Filed on Sep. 13, 2022—Cited in IPR2022-00243, challenging U.S. Pat. No. 8,111,839.

(56)        References Cited

OTHER PUBLICATIONS

Amended Complaint, *Techiya* v. *Samsung,* E.D. Tex., Exhibit-1014, Filed on Jan. 14, 2022—Cited in IPR2022-00410, challenging U.S. Pat. No. 10,979,836.

Amended Complaint, *Techiya* v. *Samsung,* E.D. Tex., Exhibit-1014, Filed on Dec. 21, 2021—Cited in IPR2022-00302, challenging U.S. Pat. No. 9,609,424.

Amended Complaint, *Techiya* v. *Samsung,* E.D. Tex., Exhibit-1017, Filed on Jan. 4, 2022—Cited in IPR2022-00388, challenging U.S. Pat. No. 10,966,015.

Amended Complaint, *Techiya* v. *Samsung,* E.D. Tex., Exhibit-1017, Filed on Dec. 30, 2021—Cited in IPR2022-00369, challenging U.S. Pat. No. 10,405,082.

Amended Docket Control Order, DN 156 from E.D. Tex. 21-cv-00413, Exhibit-1029, Filed on Nov. 15, 2022—Cited in IPR2022-01098, challenging U.S. Pat. No. 11,217,237.

Amended Docket Control Order, DN 156 from E.D. Tex., Exhibit-1023, Filed on Nov. 10, 2022—Cited in IPR2022-01099, challenging U.S. Pat. No. 11,244,666.

Amended Docket Control Order, DN 156 from E.D. Tex., Exhibit-1026, Filed on Nov. 10, 2022—Cited in IPR2022-01078, challenging U.S. Pat. No. 11,057,701.

Amended Docket Control Order, DN 156 from E.D. Tex., Exhibit-1032, Filed on Nov. 10, 2022—Cited in IPR2022-01106, challenging U.S. Pat. No. 11,039,259.

Amended Notice of Deposition of Les E. Atlas, Ph.D., Exhibit-15, Filed on Mar. 14, 2023—Cited in IPR2022-01106, challenging U.S. Pat. No. 11,039,259.

Amendment in U.S. Appl. No. 11/616,973, dated Apr. 13, 2015, Exhibit-2009, Filed on Oct. 11, 2022—Cited in IPR2022-01106, challenging U.S. Pat. No. 11,039,259.

Anderson Declaration ISO MSJ of No Infringement of '259 Patent, Exhibit-2019, Filed on Aug. 14, 2023—Cited in IPR2022-01106, challenging U.S. Pat. No. 11,039,259.

Anderson Non-Infringement Report (excerpt, redacted), Exhibit-2020, Filed on Aug. 14, 2023—Cited in IPR2022-01106, challenging U.S. Pat. No. 11,039,259.

Anderson Rebuttal Report (Redacted, Excerpt), Exhibit-2017, Filed on Apr. 10, 2023—Cited in IPR2022-01106, challenging U.S. Pat. No. 11,039,259.

Android Central, The History of True Wireless Earbuds, Exhibit-2009, Filed on Oct. 17, 2022—Cited in IPR2022-00324, challenging U.S. Pat. No. 8,254,591.

Android Central, The History of True Wireless Earbuds, Exhibit-2011, Filed on Sep. 13, 2022—Cited in IPR2022-00243, challenging U.S. Pat. No. 8,111,839.

C.V. of Richard Stern, Ph.D., Exhibit-1003, Filed on Jan. 4, 2022—Cited in IPR2022-00388, challenging U.S. Pat. No. 10,966,015.

C.V. of Richard Stern, Ph.D., Exhibit-1003, Filed on Dec. 10, 2021—Cited in IPR2022-00282, challenging U.S. Pat. No. 8,315,400.

CDC, What Noises Cause Hearing Loss?, Exhibit-2009, Filed on Sep. 13, 2022—Cited in IPR2022-00242, challenging U.S. Pat. No. 8,111,839.

Christopher J. Struck CV, Exhibit-2002, Filed on Apr. 13, 2022—Cited in IPR2022-00302, challenging U.S. Pat. No. 9,609,424.

Claim Construction Order, Exhibit-2008, Filed on Feb. 22, 2023—Cited in IPR2022-00253, challenging U.S. Pat. No. 9,491,542.

Claim Construction Order, Exhibit-2008, Filed on Apr. 18, 2023—Cited in IPR2022-00281, challenging U.S. Pat. No. 9,270,244.

Claim Construction Order, Exhibit-2013, Filed on Apr. 10, 2023—Cited in IPR2022-01106, challenging U.S. Pat. No. 11,039,259.

Complaint, DN 1 from E.D. Tex. 21-cv-00413, Exhibit-1022, Filed on Nov. 10, 2022—Cited in IPR2022-01099, challenging U.S. Pat. No. 11,244,666.

Complaint, DN 1 from E.D. Tex. 21-cv-00413, Exhibit-1025, Filed on Nov. 10, 2022—Cited in IPR2022-01078, challenging U.S. Pat. No. 11,057,701.

Complaint, DN 1 from E.D. Tex. 21-cv-00413, Exhibit-1028, Filed on Nov. 15, 2022—Cited in IPR2022-01098, challenging U.S. Pat. No. 11,217,237.

Complaint, DN 1 from E.D. Tex. 21-cv-00413, Exhibit-1031, Filed on Nov. 10, 2022—Cited in IPR2022-01106, challenging U.S. Pat. No. 11,039,259.

Complaint, E.D. Tex. 22-53, Exhibit-1020, Filed on Jun. 14, 2022—Cited in IPR2022-00369, challenging U.S. Pat. No. 10,405,082.

Complaint, E.D. Tex. 22-53, Exhibit-1020, Filed on Jun. 14, 2022—Cited in IPR2022-00388, challenging U.S. Pat. No. 10,966,015.

Complaint, E.D. Tex. 22-53, Exhibit-1021, Filed on Jun. 14, 2022—Cited in IPR2022-00410, challenging U.S. Pat. No. 10,979,836.

Complaint, E.D. Tex., 22-cv-53, Exhibit-1024, Filed on May 10, 2022—Cited in IPR2022-00302, challenging U.S. Pat. No. 9,609,424.

Complaint, E.D. Tex., 22-cv-53, Exhibit-1032, Filed on May 11, 2022—Cited in IPR2022-00324, challenging U.S. Pat. No. 8,254,591.

Complaint, *Techiya* v. *Samsung,* E.D. Tex., Exhibit-1008, Filed on Jan. 14, 2022—Cited in IPR2022-00410, challenging U.S. Pat. No. 10,979,836.

Complaint, *Techiya* v. *Samsung,* E.D. Tex., Exhibit-1008, Filed on Dec. 21, 2021—Cited in IPR2022-00302, challenging U.S. Pat. No. 9,609,424.

Consolidation Order, E.D. Tex. 21-413 & 22-53, Exhibit-1021, Filed on Jun. 14, 2022—Cited in IPR2022-00369, challenging U.S. Pat. No. 10,405,082.

Consolidation Order, E.D. Tex. 21-413 & 22-53, Exhibit-1021, Filed on Jun. 14, 2022—Cited in IPR2022-00388, challenging U.S. Pat. No. 10,966,015.

Consolidation Order, E.D. Tex. 21-413 & 22-53, Exhibit-1022, Filed on Jun. 14, 2022—Cited in IPR2022-00410, challenging U.S. Pat. No. 10,979,836.

Consolidation Order, E.D. Tex., Exhibit-1025, Filed on May 10, 2022—Cited in IPR2022-00302, challenging U.S. Pat. No. 9,609,424.

Consolidation Order, E.D. Tex., Exhibit-1033, Filed on May 11, 2022—Cited in IPR2022-00324, challenging U.S. Pat. No. 8,254,591.

Corrected Declaration of Richard Stern, Ph.D., Exhibit-1002, Filed on Jan. 4, 2022—Cited in IPR2022-00388, challenging U.S. Pat. No. 10,966,015.

Corrected Declaration of Richard Stern, Ph.D., Exhibit-1002, Filed on Dec. 10, 2021—Cited in IPR2022-00282, challenging U.S. Pat. No. 8,315,400.

Corrected Petition for Inter Partes Review of U.S. Pat. No. 8,111,839, Exhibit-11, Filed on Feb. 3, 2022—Cited in IPR2022-00243, challenging U.S. Pat. No. 8,111,839.

Corrected Petition for Inter Partes Review of U.S. Pat. No. 8,111,839, Exhibit-12, Filed on Feb. 3, 2022—Cited in IPR2022-00242, challenging U.S. Pat. No. 8,111,839.

Corrected Petition for IPR of U.S. Pat. No. 8,315,400, Exhibit-4, Filed on Dec. 10, 2021—Cited in IPR2022-00282, challenging U.S. Pat. No. 8,315,400.

Curriculum Vitae of Christopher J. Struck, Exhibit-2002, Filed on Oct. 7, 2022—Cited in IPR2022-01078, challenging U.S. Pat. No. 11,057,701.

Curriculum Vitae of Christopher J. Struck, Exhibit-2002, Filed on Oct. 7, 2022—Cited in IPR2022-01098, challenging U.S. Pat. No. 11,217,237.

Curriculum Vitae of David Kleinschmidt, Exhibit-2002, Filed on Oct. 11, 2022—Cited in IPR2022-01106, challenging U.S. Pat. No. 11,039,259.

Curriculum Vitae of David Kleinschmidt, Exhibit-2002, Filed on Oct. 7, 2022—Cited in IPR2022-01099, challenging U.S. Pat. No. 11,244,666.

CV for Marshall Buck, Ph.D., Exhibit-2002, Filed on May 18, 2022—Cited in IPR2022-00369, challenging U.S. Pat. No. 10,405,082.

CV of Chris Kyriakakis, Ph.D., Exhibit-1003, Filed on Dec. 21, 2021—Cited in IPR2022-00302, challenging U.S. Pat. No. 9,609,424.

CV of Christopher J. Struck, Exhibit-2002, Filed on May 18, 2022—Cited in IPR2022-00410, challenging U.S. Pat. No. 10,979,836.

CV of Daniel P. Anagnos, Exhibit-2002, Filed on Mar. 23, 2022—Cited in IPR2022-00242, challenging U.S. Pat. No. 8,111,839.

CV of Daniel P. Anagnos, Exhibit-2002, Filed on Mar. 23, 2022—Cited in IPR2022-00243, challenging U.S. Pat. No. 8,111,839.

CV of Daniel P. Anagnos; Exhibit-2002, Filed on Mar. 21, 2022—Cited in IPR2022-00234, challenging U.S. Pat. No. 9,124,982.

CV of Dr. Chris Kyriakakis, Exhibit-1003, Filed on Jan. 14, 2022—Cited in IPR2022-00410, challenging U.S. Pat. No. 10,979,836.

(56) References Cited

OTHER PUBLICATIONS

CV of Les E. Atlas, Ph.D., Exhibit-1003, Filed on Dec. 20, 2021—Cited in IPR2022-00324, challenging U.S. Pat. No. 8,254,591.

CV of Les E. Atlas, Ph.D., Exhibit-1004, Filed on Dec. 13, 2021—Cited in IPR2022-00242, challenging U.S. Pat. No. 8,111,839.

CV of Les E. Atlas, Ph.D., Exhibit-1004, Filed on Dec. 13, 2021—Cited in IPR2022-00243, challenging U.S. Pat. No. 8,111,839.

CV of Marshall Buck, Ph.D., Exhibit-2002, Filed on May 18, 2022—Cited in IPR2022-00388, challenging U.S. Pat. No. 10,966,015.

CV of Nathaniel Polish, Ph.D., Exhibit-1003, Filed on Dec. 17, 2021—Cited in IPR2022-00253, challenging U.S. Pat. No. 9,491,542.

CV of Nathaniel Polish, Ph.D., Exhibit-1003, Filed on Dec. 21, 2021—Cited in IPR2022-00281, challenging U.S. Pat. No. 9,270,244.

CV of of Les E. Atlas, Ph.D.; Exhibit-1003, Filed on Dec. 13, 2021—Cited in IPR2022-00234, challenging U.S. Pat. No. 9,124,982.

CV of Richard Stern, Ph.D., Exhibit-1003, Filed on Dec. 30, 2021—Cited in IPR2022-00369, challenging U.S. Pat. No. 10,405,082.

Daniel P. Anagnos CV, Exhibit-2002, Filed on Apr. 13, 2022—Cited in IPR2022-00324, challenging U.S. Pat. No. 8,254,591.

David Kleinschmidt CV, Exhibit-2002, Filed on Mar. 21, 2022—Cited in IPR2022-00282, challenging U.S. Pat. No. 8,315,400.

David Kleinschmidt CV, Exhibit-2002, Filed on Apr. 18, 2022—Cited in IPR2022-00253, challenging U.S. Pat. No. 9,491,542.

David Kleinschmidt CV, Exhibit-2002, Filed on Apr. 18, 2022—Cited in IPR2022-00281, challenging U.S. Pat. No. 9,270,244.

Decision Denying Institution of Inter Partes Review 35 U.S.C. § 314, Exhibit-10, Filed on Jan. 3, 2023—Cited in IPR2022-01099, challenging U.S. Pat. No. 11,244,666.

Decision Denying Institution of Inter Partes Review 35 U.S.C. § 314, Exhibit-11, Filed on Jan. 3, 2023—Cited in IPR2022-01098, challenging U.S. Pat. No. 11,217,237.

Decision Granting Institution of Inter Partes Review 35 U.S.C. sec 314, Exhibit-10, Filed on Dec. 29, 2022—Cited in IPR2022-01078, challenging U.S. Pat. No. 11,057,701.

Declaration of Chris Kyriakakis, Ph.D., Exhibit-1002, Filed on Dec. 21, 2021—Cited in IPR2022-00302, challenging U.S. Pat. No. 9,609,424.

Declaration of Christopher J. Struck in Support of Patent Owner's Preliminary Response, Exhibit-2001, Filed on Oct. 7, 2022—Cited in IPR2022-01078, challenging U.S. Pat. No. 11,057,701.

Declaration of Christopher J. Struck in Support of Patent Owner's Preliminary Response, Exhibit-2001, Filed on Oct. 7, 2022—Cited in IPR2022-01098, challenging U.S. Pat. No. 11,217,237.

Declaration of Christopher J. Struck in Support of Patent Owner's Preliminary Response, Exhibit-2001, Filed on Apr. 13, 2022—Cited in IPR2022-00302, challenging U.S. Pat. No. 9,609,424.

Declaration of Christopher J. Struck in Support of Patent Owner's Preliminary Response, Exhibit-2001, Filed on May 18, 2022—Cited in IPR2022-00410, challenging U.S. Pat. No. 10,979,836.

Declaration of Christopher J. Struck in Support of Patent Owner's Response, Exhibit-2006, Filed on Oct. 17, 2022—Cited in IPR2022-00302, challenging U.S. Pat. No. 9,609,424.

Declaration of Christopher Struck in Support of POR, Exhibit-2013, Filed on Mar. 23, 2023—Cited in IPR2022-01078, challenging U.S. Pat. No. 11,057,701.

Declaration of Daniel P. Anagnos in Support of Patent Owner Response; Exhibit-2006, Filed on Sep. 9, 2022—Cited in IPR2022-00234, challenging U.S. Pat. No. 9,124,982.

Declaration of Daniel P. Anagnos in Support of Patent Owner's Preliminary Response, Exhibit-2001, Filed on Apr. 13, 2022—Cited in IPR2022-00324, challenging U.S. Pat. No. 8,254,591.

Declaration of Daniel P. Anagnos in Support of Patent Owner's Response, Exhibit-2006, Filed on Oct. 17, 2022—Cited in IPR2022-00324, challenging U.S. Pat. No. 8,254,591.

Declaration of Daniel P. Anagnos in Support of Patent Owner's Response, Exhibit-2006, Filed on Sep. 13, 2022—Cited in IPR2022-00242, challenging U.S. Pat. No. 8,111,839.

Declaration of Daniel P. Anagnos in Support of Patent Owner's Response, Exhibit-2006, Filed on Sep. 13, 2022—Cited in IPR2022-00243, challenging U.S. Pat. No. 8,111,839.

Declaration of Daniel P. Anagnos, Exhibit-2001, Filed on Mar. 23, 2022—Cited in IPR2022-00242, challenging U.S. Pat. No. 8,111,839.

Declaration of Daniel P. Anagnos, Exhibit-2001, Filed on Mar. 23, 2022—Cited in IPR2022-00243, challenging U.S. Pat. No. 8,111,839.

Declaration of Daniel P. Anagnos; Exhibit-2001, Filed on Mar. 21, 2022—Cited in IPR2022-00234, challenging U.S. Pat. No. 9,124,982.

Declaration of David Kleinschmidt in Support of Patent Owner's Preliminary Response, Exhibit-2001, Filed on Oct. 11, 2022—Cited in IPR2022-01106, challenging U.S. Pat. No. 11,039,259.

Declaration of David Kleinschmidt in Support of Patent Owner's Preliminary Response, Exhibit-2001, Filed on Oct. 7, 2022—Cited in IPR2022-01099, challenging U.S. Pat. No. 11,244,666.

Declaration of David Kleinschmidt in Support of Patent Owner's Preliminary Response, Exhibit-2001, Filed on Mar. 21, 2022—Cited in IPR2022-00282, challenging U.S. Pat. No. 8,315,400.

Declaration of David Kleinschmidt in Support of Patent Owner's Preliminary Response, Exhibit-2001, Filed on Apr. 18, 2022—Cited in IPR2022-00253, challenging U.S. Pat. No. 9,491,542.

Declaration of David Kleinschmidt in Support of Patent Owner's Preliminary Response, Exhibit-2001, Filed on Apr. 18, 2022—Cited in IPR2022-00281, challenging U.S. Pat. No. 9,270,244.

Declaration of David Kleinschmidt in Support of Patent Owner's Response, Exhibit-2006, Filed on Oct. 19, 2022—Cited in IPR2022-00253, challenging U.S. Pat. No. 9,491,542.

Declaration of David Kleinschmidt in Support of Patent Owner's Response, Exhibit-2006, Filed on Oct. 19, 2022—Cited in IPR2022-00281, challenging U.S. Pat. No. 9,270,244.

Declaration of David Kleinschmidt in Support of Patent Owner's Response, Exhibit-2009, Filed on Sep. 9, 2022—Cited in IPR2022-00282, challenging U.S. Pat. No. 8,315,400.

Declaration of Dr. Chris Kyriakakis, Exhibit-1002, Filed on Jan. 14, 2022—Cited in IPR2022-00410, challenging U.S. Pat. No. 10,979,836.

Declaration of Dr. David Anderson Regarding Claim Construction dated Oct. 21, 2022, Exhibit-2011, Filed on Nov. 8, 2022—Cited in IPR2022-00388, challenging U.S. Pat. No. 10,966,015.

Declaration of Dr. Eric Tarr, Exhibit-2001, Filed on Dec. 6, 2024—Cited in IPR2024-00559, challenging U.S. Pat. No. 11,610,587.

Declaration of Les E. Atlas, Ph.D., Exhibit-1002, Filed on Dec. 13, 2021—Cited in IPR2022-00242, challenging U.S. Pat. No. 8,111,839.

Declaration of Les E. Atlas, Ph.D., Exhibit-1002, Filed on Dec. 20, 2021—Cited in IPR2022-00324, challenging U.S. Pat. No. 8,254,591.

Declaration of Les E. Atlas, Ph.D., Exhibit-1003, Filed on Dec. 13, 2021—Cited in IPR2022-00243, challenging U.S. Pat. No. 8,111,839.

Declaration of Les E. Atlas, Ph.D.; Exhibit-1002, Filed on Dec. 13, 2021—Cited in IPR2022-00234, challenging U.S. Pat. No. 9,124,982.

Declaration of Marshall Buck in Support of Patent Owner's Preliminary Response, Exhibit-2001, Filed on May 18, 2022—Cited in IPR2022-00369, challenging U.S. Pat. No. 10,405,082.

Declaration of Marshall Buck in Support of Patent Owner's Preliminary Response, Exhibit-2001, Filed on May 18, 2022—Cited in IPR2022-00388, challenging U.S. Pat. No. 10,966,015.

Declaration of Marshall D. Buck, Ph.D. in Support of Patent Owner Response, Exhibit-2008, Filed on Nov. 8, 2022—Cited in IPR2022-00369, challenging U.S. Pat. No. 10,405,082.

Declaration of Marshall D. Buck, Ph.D. in Support of Patent Owner's Response, Exhibit-2008, Filed on Nov. 8, 2022—Cited in IPR2022-00388, challenging U.S. Pat. No. 10,966,015.

Declaration of Nathaniel Polish, Ph.D., Exhibit-1002, Filed on Dec. 17, 2021—Cited in IPR2022-00253, challenging U.S. Pat. No. 9,491,542.

Declaration of Nathaniel Polish, Ph.D., Exhibit-1002, Filed on Dec. 21, 2021—Cited in IPR2022-00281, challenging U.S. Pat. No. 9,270,244.

Declaration of Richard Stern, Ph.D., Exhibit-1002, Filed on Dec. 10, 2021—Cited in IPR2022-00282, challenging U.S. Pat. No. 8,315,400.

Declaration of Richard Stern, Ph.D., Exhibit-1002, Filed on Dec. 30, 2021—Cited in IPR2022-00369, challenging U.S. Pat. No. 10,405,082.

Declaration of Roy Falik in Support of Motion for the Pro Hac Vice Admission, Exhibit-2001, Filed on Jul. 5, 2024—Cited in IPR2024-01003, challenging U.S. Pat. No. 9,191,083.

(56) References Cited

OTHER PUBLICATIONS

Declaration of Roy Falik in Support of Motion for the Pro Hac Vice Admission, Exhibit-2001, Filed on Jul. 5, 2024—Cited in IPR2024-01004, challenging U.S. Pat. No. 9,614,943.

Declaration of Roy Falik in Support of Motion for the Pro Hac Vice AdmissionExhibit2001,Jul. 5, 2024—Cited in IPR2024-01033, challenging U.S. Pat. No. 8,434,966.

Declaration of Roy Falik, Exhibit-2001, Filed on Jul. 18, 2024—Cited in IPR2024-01031, challenging U.S. Pat. No. 7,049,850.

Declaration of Roy Falik, Exhibit-2001, Filed on Jul. 18, 2024—Cited in IPR2024-01034, challenging U.S. Pat. No. 9,279,263.

Declaration of Scott Delman with attached exhibit, Exhibit-1024, Filed on Dec. 21, 2021—Cited in IPR2022-00281, challenging U.S. Pat. No. 9,270,244.

Deposition Transcript of David Kleinschmidt, dated Jun. 9, 2023, Exhibit-1034, Filed on Jun. 30, 2023—Cited in IPR2022-01106, challenging U.S. Pat. No. 11,039,259.

Determining All Challenged Claims Unpatentable 35 U.S.C. § 318(a), Exhibit-31, Filed on Aug. 11, 2023—Cited in IPR2022-00388, challenging U.S. Pat. No. 10,966,015.

Determining All Challenged Claims Unpatentable 35 U.S.C. § 318(a), Exhibit-32, Filed on Aug. 11, 2023—Cited in IPR2022-00369, challenging U.S. Pat. No. 10,405,082.

Determining All Challenged Claims Unpatentable 35 U.S.C. § 318(a), Exhibit-26, Filed on Nov. 13, 2023—Cited in IPR2022-01078, challenging U.S. Pat. No. 11,057,701.

Determining Some Challenged Claims Unpatentable 35 U.S.C. § 318(a), Exhibit-37, Filed on Jul. 7, 2023—Cited in IPR2022-00302, challenging U.S. Pat. No. 9,609,424.

Docket Control Order, E.D. Tex., Exhibit-1014, Filed on Apr. 20, 2022—Cited in IPR2022-00282, challenging U.S. Pat. No. 8,315,400.

Docket Control Order, E.D. Tex., Exhibit-1043, Filed on Apr. 20, 2022—Cited in IPR2022-00242, challenging U.S. Pat. No. 8,111,839.

Docket Control Order, E.D. Tex., Exhibit-1043, Filed on Apr. 20, 2022—Cited in IPR2022-00243, challenging U.S. Pat. No. 8,111,839.

Docket Control Order, E.D. Tex.; Exhibit-1033, Filed on Aprl 20, 2022—Cited in IPR2022-00234, challenging U.S. Pat. No. 9,124,982.

Edwards, The Future of Hearing Aid Technology, Exhibit-2008, Filed on Sep. 13, 2022—Cited in IPR2022-00243, challenging U.S. Pat. No. 8,111,839.

Ex 1032—Protective Order (*Staton Techiya, LLC* v. *Samsung Electronics Co., Ltd*, 21-CV-00413-JRG-RSP), Exhibit-1032, Filed on Apr. 13, 2023—Cited in IPR2022-00302, challenging U.S. Pat. No. 9,609,424.

Ex 1045—Nov. 18, 2022, Deposition Transcript of Daniel P Anagnos, Exhibit-1045, Filed on Dec. 6, 2022—Cited in IPR2022-00242, challenging U.S. Pat. No. 8,111,839.

Ex 1045—Nov. 18, 2022, Deposition Transcript of Daniel P Anagnos, Exhibit-1045, Filed on Dec. 6, 2022—Cited in IPR2022-00243, challenging U.S. Pat. No. 8,111,839.

Ex 1046—Patent Owner's Response in IPR2022-00243, Paper 21, Exhibit-1046, Filed on Dec. 6, 2022—Cited in IPR2022-00242, challenging U.S. Pat. No. 8,111,839.

Ex 1047—Patent Owner Response for IPR2022-00234, Paper 17, Exhibit-1047, Filed on Dec. 6, 2022—Cited in IPR2022-00242, challenging U.S. Pat. No. 8,111,839.

Ex 1047—Patent Owner Response for IPR2022-00234, Paper 17, Exhibit-1047, Filed on Dec. 6, 2022—Cited in IPR2022-00243, challenging U.S. Pat. No. 8,111,839.

Ex 1048—Institution Decision for IPR2022-00234, Paper 12, Exhibit-1048, Filed on Dec. 6, 2022—Cited in IPR2022-00242, challenging U.S. Pat. No. 8,111,839.

Ex 1049—File History for 382 Patent, Exhibit-1049, Filed on Dec. 6, 2022—Cited in IPR2022-00242, challenging U.S. Pat. No. 8,111,839.

Ex 1053—Excerpts from the Authoritative Dictionary of IEEE Standards Terms, Exhibit-1053, Filed on Dec. 6, 2022—Cited in IPR2022-00242, challenging U.S. Pat. No. 8,111,839.

Ex 1054—Supplemental Declaration of Les E Atlas PhD (Atlas-Supp), Exhibit-1054, Filed on Dec. 6, 2022—Cited in IPR2022-00243, challenging U.S. Pat. No. 8,111,839.

Ex. 1002—Declaration of Dr. Les Atlas, Ph.D., Exhibit-1002, Filed on Jun. 9, 2022—Cited in IPR2022-01106, challenging U.S. Pat. No. 11,039,259.

Ex. 1002—Declaration of Nathaniel Polish, Ph.D., Exhibit-1002, Filed on Jun. 9, 2022—Cited in IPR2022-01098, challenging U.S. Pat. No. 11,217,237.

Ex. 1002—Declaration of Nathaniel Polish, Ph.D., Exhibit-1002, Filed on Jun. 9, 2022—Cited in IPR2022-01099, challenging U.S. Pat. No. 11,244,666.

Ex. 1002—Kyriakakis DeclarationExhibit1002,Jun. 18, 2024—Cited in IPR2024-01033, challenging U.S. Pat. No. 8,434,966.

Ex. 1002 Declaration of Chris Kyriakakis, Exhibit-1002, Filed on Jul. 1, 2024—Cited in IPR2024-01034, challenging U.S. Pat. No. 9,279,263.

Ex. 1002 Declaration of Dr. Richard M. Stern, Exhibit-1002, Filed on Jun. 9, 2022—Cited in IPR2022-01078, challenging U.S. Pat. No. 11,057,701.

Ex. 1003—CV of Dr. Les Atlas, Ph.D., Exhibit-1003, Filed on Jun. 9, 2022—Cited in IPR2022-01106, challenging U.S. Pat. No. 11,039,259.

Ex. 1003—CV of Nathaniel Polish, Ph.D., Exhibit-1003, Filed on Jun. 9, 2022—Cited in IPR2022-01098, challenging U.S. Pat. No. 11,217,237.

Ex. 1003—CV of Nathaniel Polish, Ph.D., Exhibit-1003, Filed on Jun. 9, 2022—Cited in IPR2022-01099, challenging U.S. Pat. No. 11,244,666.

Ex. 1003—Kyriakakis CVExhibit1003,Jun. 18, 2024—Cited in IPR2024-01033, challenging U.S. Pat. No. 8,434,966.

Ex. 1003 Chris Kyriakakis CV, Exhibit-1003, Filed on Jul. 1, 2024—Cited in IPR2024-01034, challenging U.S. Pat. No. 9,279,263.

Ex. 1003 CV of Dr. Richard M. Stern, Exhibi-1003, Filed on Jun. 9, 2022—Cited in IPR2022-01078, challenging U.S. Pat. No. 11,057,701.

Ex. 1004—U.S. Appl. No. 16/571,973 File History for 259, Exhibit-1004, Filed on Jun. 9, 2022—Cited in IPR2022-01106, challenging U.S. Pat. No. 11,039,259.

Ex. 1004—File History for U.S. Pat. No. 11,750,965Exhibit1004,Jun. 18, 2024—Cited in IPR2024-01033, challenging U.S. Pat. No. 8,434,966.

Ex. 1004—File History of U.S. Appl. No. 11/217,237, Exhibit-1004, Filed on Jun. 9, 2022—Cited in IPR2022-01098, challenging U.S. Pat. No. 11,217,237.

Ex. 1004—File History of U.S. Appl. No. 11/244,666, Exhibit-1004, Filed on Jun. 9, 2022—Cited in IPR2022-01099, challenging U.S. Pat. No. 11,244,666.

Ex. 1004 File History for U.S. Pat. No. 11,665,493, Exhibit-1004, Filed on Jul. 1, 2024—Cited in IPR2024-01034, challenging U.S. Pat. No. 9,279,263.

Ex. 1004 File History of U.S. Pat. No. 11,057,701, Exhibit-1004, Filed on Jun. 9, 2022—Cited in IPR2022-01078, challenging U.S. Pat. No. 11,057,701.

Ex. 1005—U.S. Appl. No. 13/917,079 File History part 1 of 2, Exhibit-1005, Filed on Jun. 9, 2022—Cited in IPR2022-01106, challenging U.S. Pat. No. 11,039,259.

Ex. 1005—U.S. Appl. No. 13/917,079 File History part 2 of 2, Exhibit-1005, Filed on Jun. 9, 2022—Cited in IPR2022-01106, challenging U.S. Pat. No. 11,039,259.

Ex. 1005 U.S. Appl. No. 61/098,250, Exhibit-1005, Filed on Jul. 1, 2024—Cited in IPR2024-01034, challenging U.S. Pat. No. 9,279,263.

Ex. 1006—U.S. Appl. No. 12/555,570 File History, Exhibit-1006, Filed on Jun. 9, 2022—Cited in IPR2022-01106, challenging U.S. Pat. No. 11,039,259.

Ex. 1006 U.S. Appl. No. 12/115,349 File History, Exhibit-1006, Filed on Jun. 9, 2022—Cited in IPR2022-01078, challenging U.S. Pat. No. 11,057,701.

Ex. 1006 Publication of U.S. Appl. No. 12/555,864, Exhibit-1006, Filed on Jul. 1, 2024—Cited in IPR2024-01034, challenging U.S. Pat. No. 9,279,263.

Ex. 1007—U.S. Appl. No. 61/096,128 File History, Exhibit-1007, Filed on Jun. 9, 2022—Cited in IPR2022-01106, challenging U.S. Pat. No. 11,039,259.

(56)     References Cited

OTHER PUBLICATIONS

Ex. 1007 U.S. Appl. No. 60/916,271 File History, Exhibit-1007, Filed on Jun. 9, 2022—Cited in IPR2022-01078, challenging U.S. Pat. No. 11,057,701.

Ex. 1008—JP3353701B2 to Kondo with Translation, Exhibit-1008, Filed on Jun. 9, 2022—Cited in IPR2022-01098, challenging U.S. Pat. No. 11,217,237.

Ex. 1009 Translation of JPA 2002-204500 (Hayashi), Exhibit-1009, Filed on Jul. 1, 2024—Cited in IPR2024-01034, challenging U.S. Pat. No. 9,279,263.

Ex. 1010—Redline—965 versus parentExhibit1010,Jun. 18, 2024—Cited in IPR2024-01033, challenging U.S. Pat. No. 8,434,966.

Ex. 1012—U.S. Appl. No. 60/893,617Exhibit1012,Jun. 18, 2024—Cited in IPR2024-01033, challenging U.S. Pat. No. 8,434,966.

Ex. 1013—150139_U.S. Appl. No. 14/109,987 NOA referred to in 965 NOAExhibit1013,Jun. 18, 2024—Cited in IPR2024-01033, challenging U.S. Pat. No. 8,434,966.

Ex. 1013 Deterministic Broad-Band Signal (Chu), Exhibit-1013, Filed on Jul. 1, 2024—Cited in IPR2024-01034, challenging U.S. Pat. No. 9,279,263.

Ex. 1013 IPR2022-00282 Patent Owner Preliminary Response, Exhibit-1013, Filed on Jun. 9, 2022—Cited in IPR2022-01078, challenging U.S. Pat. No. 11,057,701.

Ex. 1014—Mulgrew 2002, Exhibit-1014, Filed on Jun. 9, 2022—Cited in IPR2022-01099, challenging U.S. Pat. No. 11,244,666.

Ex. 1014—Redline—682 parent versus ultimate parent 812Exhibit1014,Jun. 18, 2024—Cited in IPR2024-01033, challenging U.S. Pat. No. 8,434,966.

Ex. 1014 701 Patent Family Tree, Exhibit-1014, Filed on Jun. 9, 2022—Cited in IPR2022-01078, challenging U.S. Pat. No. 11,057,701.

Ex. 1015—666 Family Tree, Exhibit-1015, Filed on Jun. 9, 2022—Cited in IPR2022-01099, challenging U.S. Pat. No. 11,244,666.

Ex. 1015—Letter re 965 IPR StipulationExhibit1015,Jun. 18, 2024—Cited in IPR2024-01033, challenging U.S. Pat. No. 8,434,966.

Ex. 1015 Complaint, E.D. Tex. 22-53, Exhibit-1015, Filed on Jun. 9, 2022—Cited in IPR2022-01078, challenging U.S. Pat. No. 11,057,701.

Ex. 1016—Complaint, E.D. Tex., 22-53, Exhibit-1016, Filed on Jun. 9, 2022—Cited in IPR2022-01099, challenging U.S. Pat. No. 11,244,666.

Ex. 1016 GSM 6.31, Exhibit-1016, Filed on Jun. 9, 2022—Cited in IPR2022-01078, challenging U.S. Pat. No. 11,057,701.

Ex. 1016 Reply Declaration of Richard Stern, PhD, Exhibit-1016, Filed on Dec. 2, 2022—Cited in IPR2022-00282, challenging U.S. Pat. No. 8,315,400.

Ex. 1017—Amended Complaint, E.D. Tex., 21-413, Exhibit-1017, Filed on Jun. 9, 2022—Cited in IPR2022-01099, challenging U.S. Pat. No. 11,244,666.

Ex. 1017—Rose 2003, Exhibit-1017, Filed on Jun. 9, 2022—Cited in IPR2022-01106, challenging U.S. Pat. No. 11,039,259.

Ex. 1017 David Kleinschmidt Depo Transcript, Exhibit-1017, Filed on Dec. 2, 2022—Cited in IPR2022-00282, challenging U.S. Pat. No. 8,315,400.

Ex. 1017 Final Rejection from Reexam 90_015,146, Exhibit-1017, Filed on Jul. 1, 2024—Cited in IPR2024-01034, challenging U.S. Pat. No. 9,279,263.

Ex. 1017 GSM 6.12, Exhibit-1017, Filed on Jun. 9, 2022—Cited in IPR2022-01078, challenging U.S. Pat. No. 11,057,701.

Ex. 1018—Confidential Settlement Agreement with Exhibits A-IExhibit1018,Dec. 11, 2024—Cited in IPR2024-01033, challenging U.S. Pat. No. 8,434,966. [Document not publicly available at PTAB].

Ex. 1018—Consolidation Order, E.D. Tex., 21-413 & 22-53, Exhibit-1018, Filed on Jun. 9, 2022—Cited in IPR2022-01099, challenging U.S. Pat. No. 11,244,666.

Ex. 1018 Consolidation Order, E.D. Tex. 21-413 & 22-53, Exhibit-1018, Filed on Jun. 9, 2022—Cited in IPR2022-01078, challenging U.S. Pat. No. 11,057,701.

Ex. 1018 Excerpts from Wiley Electrical & Electronics Engineering Dictionary, Exhibit-1018, Filed on Dec. 2, 2022—Cited in IPR2022-00282, challenging U.S. Pat. No. 8,315,400.

Ex. 1019—Docket Control Order, E.D. Tex., 21-413, Exhibit-1019, Filed on Jun. 9, 2022—Cited in IPR2022-01099, challenging U.S. Pat. No. 11,244,666.

Ex. 1019—Duffner 2006, Exhibit-1019, Filed on Jun. 9, 2022—Cited in IPR2022-01098, challenging U.S. Pat. No. 11,217,237.

Ex. 1019 Docket Control Order, E.D. Tex. 21-413, Exhibit-1019, Filed on Jun. 9, 2022—Cited in IPR2022-01078, challenging U.S. Pat. No. 11,057,701.

Ex. 1019 Dual-Channel MLS-Based Test System (Schneider), Exhibit-1019, Filed on Jul. 1, 2024—Cited in IPR2024-01034, challenging U.S. Pat. No. 9,279,263.

Ex. 1020—Letter re IPR Stipulation, Exhibit-1020, Filed on Jun. 9, 2022—Cited in IPR2022-01099, challenging U.S. Pat. No. 11,244,666.

Ex. 1020 Letter re IPR Stipulation, Exhibit-1020, Filed on Jun. 9, 2022—Cited in IPR2022-01078, challenging U.S. Pat. No. 11,057,701.

Ex. 1021—Complaint. E.D. Tex., 22-00053, Exhibit-1021, Filed on Jun. 9, 2022—Cited in IPR2022-01098, challenging U.S. Pat. No. 11,217,237.

Ex. 1021—Hsu 2005, Exhibit-1021, Filed on Jun. 9, 2022—Cited in IPR2022-01106, challenging U.S. Pat. No. 11,039,259.

Ex. 1021—Stipulation Letter, Exhibit-1021, Filed on May 20, 2022—Cited in IPR2022-00253, challenging U.S. Pat. No. 9,491,542.

Ex. 1021 Amended Complaint, E.D. Tex. 21-413, Exhibit-1021, Filed on Jun. 9, 2022—Cited in IPR2022-01078, challenging U.S. Pat. No. 11,057,701.

Ex. 1021 Claim Construction Order, ED Tex, Exhibit-1021, Filed on Jul. 1, 2024—Cited in IPR2024-01034, challenging U.S. Pat. No. 9,279,263.

Ex. 1022—Amended Complaint, E.D.Tex., 21-00413, Exhibit-1022, Filed on Jun. 9, 2022—Cited in IPR2022-01098, challenging U.S. Pat. No. 11,217,237.

Ex. 1022—Complaint, E.D. Tex., Exhibit-1022, Filed on May 20, 2022—Cited in IPR2022-00253, challenging U.S. Pat. No. 9,491,542.

Ex. 1022 Letter to Techiya re 493 IPR Stipulation, Exhibit-1022, Filed on Jul. 1, 2024—Cited in IPR2024-01034, challenging U.S. Pat. No. 9,279,263.

Ex. 1023—Consolidation Order, E.D. Tex., Exhibit-1023, Filed on May 20, 2022—Cited in IPR2022-00253, challenging U.S. Pat. No. 9,491,542.

Ex. 1023—Consolidation Order, E.D.Tex., 21-00413 & 22-00053, Exhibit-1023, Filed on Jun. 9, 2022—Cited in IPR2022-01098, challenging U.S. Pat. No. 11,217,237.

Ex. 1023 Techiya Appeal Brief from Reexam 90_015,146, Exhibit-1023, Filed on Jul. 1, 2024—Cited in IPR2024-01034, challenging U.S. Pat. No. 9,279,263.

Ex. 1024—259 Family Tree, Exhibit-1024, Filed on Jun. 9, 2022—Cited in IPR2022-01106, challenging U.S. Pat. No. 11,039,259.

Ex. 1024—Docket Control Order, E.D. Tex., 21-00413, Exhibit-1024, Filed on Jun. 9, 2022—Cited in IPR2022-01098, challenging U.S. Pat. No. 11,217,237.

Ex. 1024 Judicial Caseload Profile, Exhibit-1024, Filed on Jul. 1, 2024—Cited in IPR2024-01034, challenging U.S. Pat. No. 9,279,263.

Ex. 1025—Complaint, E.D. Tex. 22-53, Exhibit-1025, Filed on Jun. 9, 2022—Cited in IPR2022-01106, challenging U.S. Pat. No. 11,039,259.

Ex. 1025—Letter re IPR Stipulation, Exhibit-1025, Filed on Jun. 9, 2022—Cited in IPR2022-01098, challenging U.S. Pat. No. 11,217,237.

Ex. 1025—Stipulation Letter, Exhibit-1025, Filed on May 27, 2022—Cited in IPR2022-00281, challenging U.S. Pat. No. 9,270,244.

Ex. 1026—237 Family Tree, Exhibit-1026, Filed on Jun. 9, 2022—Cited in IPR2022-01098, challenging U.S. Pat. No. 11,217,237.

Ex. 1026—Amended Complaint, E.D. Tex. 21-413, Exhibit-1026, Filed on Jun. 9, 2022—Cited in IPR2022-01106, challenging U.S. Pat. No. 11,039,259.

Ex. 1026—Complaint, E.D. Tex., Exhibit-1026, Filed on May 27, 2022—Cited in IPR2022-00281, challenging U.S. Pat. No. 9,270,244.

Ex. 1026—Confidential Settlement Agreement, Exhibit-1026, Filed on Dec. 9, 2024—Cited in IPR2024-01034, challenging U.S. Pat. No. 9,279,263. [Document not publicly available at PTAB].

(56) References Cited

OTHER PUBLICATIONS

Ex. 1027—Confidential Settlement Agreement with Exhibits A-I, Exhibit-1027, Filed on Dec. 11, 2024—Cited in IPR2024-01034, challenging U.S. Pat. No. 9,279,263. [Document not publicly available at PTAB].

Ex. 1027—Consolidation Order, E.D. Tex., Exhibit-1027, Filed on May 27, 2022—Cited in IPR2022-00281, challenging U.S. Pat. No. 9,270,244.

Ex. 1027—Docket Control Order, E.D. Tex. 21-413, Exhibit-1027, Filed on Jun. 9, 2022—Cited in IPR2022-01106, challenging U.S. Pat. No. 11,039,259.

Ex. 1027—Transcript of Deposition of Christopher Struck, Exhibit-1027, Filed on Jan. 10, 2023—Cited in IPR2022-00302, challenging U.S. Pat. No. 9,609,424.

Ex. 1028—Consolidation Order, E.D. Tex. 21-413 & 22-53, Exhibit-1028, Filed on Jun. 9, 2022—Cited in IPR2022-01106, challenging U.S. Pat. No. 11,039,259.

Ex. 1028—Errata Sheet for Deposition of Christopher Struck, Exhibit-1028, Filed on Jan. 10, 2023—Cited in IPR2022-00302, challenging U.S. Pat. No. 9,609,424.

Ex. 1029—Letter re IPR Stipulation, Exhibit-1029, Filed on Jun. 9, 2022—Cited in IPR2022-01106, challenging U.S. Pat. No. 11,039,259.

Ex. 1029—Patent Owner's Opening Claim Construction Brief, E.D. Tex., Exhibit-1029, Filed on Jan. 10, 2023—Cited in IPR2022-00302, challenging U.S. Pat. No. 9,609,424.

Ex. 1029 Petitioners' Oral Hearing Demonstratives, Exhibit-1029, Filed on Sep. 26, 2023—Cited in IPR2022-01078, challenging U.S. Pat. No. 11,057,701.

Ex. 1030—Petitioners' Oral Hearing Demonstratives, Exhibit-1030, Filed on Apr. 11, 2023—Cited in IPR2022-00302, challenging U.S. Pat. No. 9,609,424.

Ex. 1033—Confidential Deposition of Christopher Struck, E.D. Tex., Exhibit-1033, Filed on May 15, 2023—Cited in IPR2022-00302, challenging U.S. Pat. No. 9,609,424. [Document not publicly available at PTAB].

Ex. 1034—Redacted Deposition of Christopher Struck, E.D. Tex., Exhibit-1034, Filed on May 15, 2023—Cited in IPR2022-00302, challenging U.S. Pat. No. 9,609,424.

Ex. 1037—Petitioners' Oral Hearing Demonstratives, Exhibit-1037, Filed on Oct. 11, 2023—Cited in IPR2022-01106, challenging U.S. Pat. No. 11,039,259.

Ex. 3001, Exhibit-3001, Filed on Nov. 8, 2024—Cited in IPR2024-01003, challenging U.S. Pat. No. 9,191,083.

Ex. 3001, Exhibit-3001, Filed on Nov. 8, 2024—Cited in IPR2024-01004, challenging U.S. Pat. No. 9,614,943.

Ex. 3001, Exhibit-3001, Filed on Nov. 8, 2024—Cited in IPR2024-01031, challenging U.S. Pat. No. 7,049,850.

Ex. 3001, Exhibit-3001, Filed on Nov. 8, 2024—Cited in IPR2024-01033, challenging U.S. Pat. No. 8,434,966.

Ex. 3001, Exhibit-3001, Filed on Nov. 8, 2024—Cited in IPR2024-01034, challenging U.S. Pat. No. 9,279,263.

Ex. 3001, Exhibit-3001, Filed on Apr. 6, 2023—Cited in IPR2022-00388, challenging U.S. Pat. No. 10,966,015.

Ex1002—Declaration of Christopher Schmandt, Exhibit-1002, Filed on Feb. 9, 2024—Cited in IPR2024-00559, challenging U.S. Pat. No. 11,610,587.

Ex1002—Declaration of Nathaniel Polish, Exhibit-1002, Filed on Jun. 25, 2024—Cited in IPR2024-01031, challenging U.S. Pat. No. 7,049,850.

Ex1002—Kyriakakis Declaration, Exhibit-1002, Filed on Jun. 12, 2024—Cited in IPR2024-01003, challenging U.S. Pat. No. 9,191,083.

Ex1002—Kyriakakis Declaration, Exhibit-1002, Filed on Jun. 12, 2024—Cited in IPR2024-01004, challenging U.S. Pat. No. 9,614,943.

Ex1003—Nathaniel Polish CV, Exhibit-1003, Filed on Jun. 25, 2024—Cited in IPR2024-01031, challenging U.S. Pat. No. 7,049,850.

Ex1003—Kyriakakis CV, Exhibit-1003, Filed on Jun. 12, 2024—Cited in IPR2024-01003, challenging U.S. Pat. No. 9,191,083.

Ex1003—Kyriakakis CV, Exhibit-1003, Filed on Jun. 12, 2024—Cited in IPR2024-01004, challenging U.S. Pat. No. 9,614,943.

Ex1003—Schmandt CV, Exhibit-1003, Filed on Feb. 9, 2024—Cited in IPR2024-00559, challenging U.S. Pat. No. 11,610,587.

Ex1004—File History for U.S. Pat. No. 11,659,315—Part 1 of 2, Exhibit-1004, Filed on Jun. 25, 2024—Cited in IPR2024-01031, challenging U.S. Pat. No. 7,049,850.

Ex1004—File History for U.S. Pat. No. 11,659,315—Part 2 of 2, Exhibit-1004, Filed on Jun. 25, 2024—Cited in IPR2024-01031, challenging U.S. Pat. No. 7,049,850.

Ex1004—File History for U.S. Pat. No. 11,710,473_Part 1 of 3, Exhibit-1004, Filed on Jun. 12, 2024—Cited in IPR2024-01003, challenging U.S. Pat. No. 9,191,083.

Ex1004—File History for U.S. Pat. No. 11,710,473_Part 1 of 3, Exhibit-1004, Filed on Jun. 12, 2024—Cited in IPR2024-01004, challenging U.S. Pat. No. 9,614,943.

Ex1004—File History for U.S. Pat. No. 11,710,473_Part 2 of 3, Exhibit-1004, Filed on Jun. 12, 2024—Cited in IPR2024-01003, challenging U.S. Pat. No. 9,191,083.

Ex1004—File History for U.S. Pat. No. 11,710,473_Part 2 of 3, Exhibit-1004, Filed on Jun. 12, 2024—Cited in IPR2024-01004, challenging U.S. Pat. No. 9,614,943.

Ex1004—File History for U.S. Pat. No. 11,710,473_Part 3 of 3, Exhibit-1004, Filed on Jun. 12, 2024—Cited in IPR2024-01003, challenging U.S. Pat. No. 9,191,083.

Ex1004—File History for U.S. Pat. No. 11,710,473_Part 3 of 3, Exhibit-1004, Filed on Jun. 12, 2024—Cited in IPR2024-01004, challenging U.S. Pat. No. 9,614,943.

Ex1004—USFH11610587 Part 1 of 2, Exhibit-1004, Filed on Feb. 9, 2024—Cited in IPR2024-00559, challenging U.S. Pat. No. 11,610,587.

Ex1004—USFH11610587 Part 2 of 2, Exhibit-1004, Filed on Feb. 9, 2024—Cited in IPR2024-00559, challenging U.S. Pat. No. 11,610,587.

Ex1005—U.S. Appl. No. 60/885,917, Exhibit-1005, Filed on Jun. 12, 2024—Cited in IPR2024-01003, challenging U.S. Pat. No. 9,191,083.

Ex1005—U.S. Appl. No. 60/885,917, Exhibit-1005, Filed on Jun. 12, 2024—Cited in IPR2024-01004, challenging U.S. Pat. No. 9,614,943.

Ex1005—U.S. Appl. No. 61/737,932 Provisional, Exhibit-1005, Filed on Jun. 25, 2024—Cited in IPR2024-01031, challenging U.S. Pat. No. 7,049,850.

Ex1005—U.S. Appl. No. 61/098,914 (Provisional Application), Exhibit-1005, Filed on Feb. 9, 2024—Cited in IPR2024-00559, challenging U.S. Pat. No. 11,610,587.

Ex1006—U.S. Appl. No. 16/266,829 (829 App), Exhibit-1006, Filed on Jun. 25, 2024—Cited in IPR2024-01031, challenging U.S. Pat. No. 7,049,850.

Ex1006—U.S. Appl. No. 17/321,892, Exhibit-1006, Filed on Jun. 12, 2024—Cited in IPR2024-01003, challenging U.S. Pat. No. 9,191,083.

Ex1006—U.S. Appl. No. 17/321,892, Exhibit-1006, Filed on Jun. 12, 2024—Cited in IPR2024-01004, challenging U.S. Pat. No. 9,614,943.

Ex1006—U.S. Appl. No. 17/203,731, Exhibit-1006, Filed on Feb. 9, 2024—Cited in IPR2024-00559, challenging U.S. Pat. No. 11,610,587.

Ex1007—315 Patent Family Tree, Exhibit-1007, Filed on Jun. 25, 2024—Cited in IPR2024-01031, challenging U.S. Pat. No. 7,049,850.

Ex1008—Docket Control Order, Exhibit-1008, Filed on Jun. 25, 2024—Cited in IPR2024-01031, challenging U.S. Pat. No. 7,049,850.

Ex1008—File History for U.S. Pat. No. 11,244,666, Exhibit-1008, Filed on Jun. 12, 2024—Cited in IPR2024-01003, challenging U.S. Pat. No. 9,191,083.

Ex1008—File History for U.S. Pat. No. 11,244,666, Exhibit-1008, Filed on Jun. 12, 2024—Cited in IPR2024-01004, challenging U.S. Pat. No. 9,614,943.

Ex1009—Letter from Nikhil Krishnan to Thomas J. Friel, Jr., Exhibit-1009, Filed on Jun. 25, 2024—Cited in IPR2024-01031, challenging U.S. Pat. No. 7,049,850.

Ex1009—U.S. Appl. No. 90/019,169 Re of U.S. Pat. No. 11,244,666_ Part 1 of 5, Exhibit-1009, Filed on Jun. 12, 2024—Cited in IPR2024-01003, challenging U.S. Pat. No. 9,191,083.

(56)          References Cited

OTHER PUBLICATIONS

Ex1009—U.S. Appl. No. 90/019,169 Re of U.S. Pat. No. 11,244,666_ Part 1 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 2 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 2 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 3 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 3 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 4 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 4 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 5 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 5 of 5, Exhibit-1009, Filed on Jun. 12, 2024—Cited in IPR2024-01004, challenging U.S. Pat. No. 9,614,943.
Ex1010—473 Patent Family Tree, Exhibit-1010, Filed on Jun. 12, 2024—Cited in IPR2024-01003, challenging U.S. Pat. No. 9,191,083.
Ex1010—473 Patent Family Tree, Exhibit-1010, Filed on Jun. 12, 2024—Cited in IPR2024-01004, challenging U.S. Pat. No. 9,614,943.
Ex1011—Claim Construction Order, ED Tex, Exhibit-1011, Filed on Jun. 12, 2024—Cited in IPR2024-01003, challenging U.S. Pat. No. 9,191,083.
Ex1011—Claim Construction Order, ED Tex, Exhibit-1011, Filed on Jun. 12, 2024—Cited in IPR2024-01004, challenging U.S. Pat. No. 9,614,943.
Ex1012—Docket Control Order, ED Tex, Exhibit-1012, Filed on Jun. 12, 2024—Cited in IPR2024-01003, challenging U.S. Pat. No. 9,191,083.
Ex1012—Docket Control Order, ED Tex, Exhibit-1012, Filed on Jun. 12, 2024—Cited in IPR2024-01004, challenging U.S. Pat. No. 9,614,943.
Ex1013—Letter from Nikhil Krishnan to Thomas J Friel, Jr, Exhibit-1013, Filed on Jun. 12, 2024—Cited in IPR2024-01003, challenging U.S. Pat. No. 9,191,083.
Ex1013—Letter from Nikhil Krishnan to Thomas J Friel, Jr, Exhibit-1013, Filed on Jun. 12, 2024—Cited in IPR2024-01004, challenging U.S. Pat. No. 9,614,943.
Ex1016—Stay Order from E.D. Tex.Exhibit1016,Nov. 20, 2024—Cited in IPR2024-01033, challenging U.S. Pat. No. 8,434,966.
Ex1019—U.S. Appl. No. 60/841,990 (Rosenberg Provisional) (annotated), Exhibit-1019, Filed on Jun. 12, 2024—Cited in IPR2024-01003, challenging U.S. Pat. No. 9,191,083.
Ex1023—Preliminary Constructions, E.D. Tex., Exhibit-1023, Filed on Jan. 31, 2023—Cited in IPR2022-00369, challenging U.S. Pat. No. 10,405,082.
Ex1023—Preliminary Constructions, E.D. Tex., Exhibit-1023, Filed on Jan. 31, 2023—Cited in IPR2022-00388, challenging U.S. Pat. No. 10,966,015.
Ex1024—Cohen, Exhibit-1024, Filed on Feb. 9, 2024—Cited in IPR2024-00559, challenging U.S. Pat. No. 11,610,587.
Ex1024—Transcript of Deposition of Marshall Buck, Exhibit-1024, Filed on Jan. 31, 2023—Cited in IPR2022-00369, challenging U.S. Pat. No. 10,405,082.
Ex1024—Transcript of Deposition of Marshall Buck, Exhibit-1024, Filed on Jan. 31, 2023—Cited in IPR2022-00388, challenging U.S. Pat. No. 10,966,015.

Ex1025—Blattner et al, Earcons and Icons, Exhibit-1025, Filed on Jun. 25, 2024—Cited in IPR2024-01031, challenging U.S. Pat. No. 7,049,850.
Ex1025—Deposition Transcript of David Kleinschmidt, Exhibit-1025, Filed on Jan. 11, 2023—Cited in IPR2022-00253, challenging U.S. Pat. No. 9,491,542.
Ex1025—Stay Order from E.D. Tex., Exhibit-1025, Filed on Nov. 20, 2024—Cited in IPR2024-01034, challenging U.S. Pat. No. 9,279,263.
Ex1025—Tanenbaum, Exhibit-1025, Filed on Feb. 9, 2024—Cited in IPR2024-00559, challenging U.S. Pat. No. 11,610,587.
Ex1025 Petitioners' Oral Hearing Demonstratives, Exhibit-1025, Filed on May 9, 2023—Cited in IPR2022-00369, challenging U.S. Pat. No. 10,405,082.
Ex1025 Petitioners' Oral Hearing Demonstratives, Exhibit-1025, Filed on May 9, 2023—Cited in IPR2022-00388, challenging U.S. Pat. No. 10,966,015.
Ex1026—Cessation from Merriam-Webster's Collegiate Dictionary, 10th Ed, Exhibit-1026, Filed on Jan. 11, 2023—Cited in IPR2022-00253, challenging U.S. Pat. No. 9,491,542.
Ex1026—Computer Dictionary 2nd Ed, Exhibit-1026, Filed on Feb. 9, 2024—Cited in IPR2024-00559, challenging U.S. Pat. No. 11,610,587.
Ex1027—Cessation from New World Dictionary, 2d College Ed, Exhibit-1027, Filed on Jan. 11, 2023—Cited in IPR2022-00253, challenging U.S. Pat. No. 9,491,542.
Ex1028—Basu, Exhibit-1028, Filed on Jun. 12, 2024—Cited in IPR2024-01003, challenging U.S. Pat. No. 9,191,083.
Ex1028—Basu, Smart Headphones, Exhibit-1028, Filed on Jun. 12, 2024—Cited in IPR2024-01004, challenging U.S. Pat. No. 9,614,943.
Ex1028—Supplemental Declaration of Nathanial Polish, Ph.D., Exhibit-1028, Filed on Jan. 11, 2023—Cited in IPR2022-00253, challenging U.S. Pat. No. 9,491,542.
Ex1029—Declaration of Nathanial Polish, Exhibit-1029, Filed on Jan. 11, 2023—Cited in IPR2022-00281, challenging U.S. Pat. No. 9,270,244.
Ex1029—Mueller, Transparent Hearing, Exhibit-1029, Filed on Jun. 12, 2024—Cited in IPR2024-01003, challenging U.S. Pat. No. 9,191,083.
Ex1029—Mueller, Transparent Hearing, Exhibit-1029, Filed on Jun. 12, 2024—Cited in IPR2024-01004, challenging U.S. Pat. No. 9,614,943.
Ex1030—Deposition Transcript of David Kleinschmidt, Exhibit-1030, Filed on Jan. 11, 2023—Cited in IPR2022-00281, challenging U.S. Pat. No. 9,270,244.
Ex1031—587 Patent Family Tree, Exhibit-1031, Filed on Feb. 9, 2024—Cited in IPR2024-00559, challenging U.S. Pat. No. 11,610,587.
Ex1031—Basu, et al, Smart Headphones, Exhibit-1031, Filed on Jun. 25, 2024—Cited in IPR2024-01031, challenging U.S. Pat. No. 7,049,850.
Ex1031—Cessation from Merriam-Webster's Collegiate Dictionary, 10th Ed, Exhibit-1031, Filed on Jan. 11, 2023—Cited in IPR2022-00281, challenging U.S. Pat. No. 9,270,244.
Ex1031—Patent Rule 4-3 Joint Claim Construction and Prehearing Statement, E.D. TX, Exhibit-1031, Filed on Mar. 7, 2023—Cited in IPR2022-00253, challenging U.S. Pat. No. 9,491,542.
Ex1032—Cessation from New World Dictionary, 2d College Ed, Exhibit-1032, Filed on Jan. 11, 2023—Cited in IPR2022-00281, challenging U.S. Pat. No. 9,270,244.
Ex1032—Ex. A-01_U.S. Appl. No. 11/610,587 Samsung Infringement Claim Chart, Exhibit-1032, Filed on Feb. 9, 2024—Cited in IPR2024-00559, challenging U.S. Pat. No. 11,610,587.
Ex1032—Excerpts from Microsoft Computer Dictionary, 4th ed, Exhibit-1032, Filed on Jun. 25, 2024—Cited in IPR2024-01031, challenging U.S. Pat. No. 7,049,850.
Ex1032—Petitioners' Oral Hearing Demonstratives, Exhibit-1032, Filed on Apr. 12, 2023—Cited in IPR2022-00253, challenging U.S. Pat. No. 9,491,542.
Ex1033—Order Granting Proposed Docket Control Order, Exhibit-1033, Filed on Feb. 9, 2024—Cited in IPR2024-00559, challenging U.S. Pat. No. 11,610,587.

(56) References Cited

OTHER PUBLICATIONS

Ex1033—Pending from Merriam-Webster's Collegiate Dictionary, 10th Ed, Exhibit-1033, Filed on Jan. 11, 2023—Cited in IPR2022-00281, challenging U.S. Pat. No. 9,270,244.

Ex1034—Computer Dictionary 2nd Ed, Exhibit-1034, Filed on Jun. 12, 2024—Cited in IPR2024-01003, challenging U.S. Pat. No. 9,191,083.

Ex1034—D Del Statistics, Exhibit-1034, Filed on Feb. 9, 2024—Cited in IPR2024-00559, challenging U.S. Pat. No. 11,610,587.

Ex1034—Pause from Merriam-Webster's Collegiate Dictionary, 10th Ed, Exhibit-1034, Filed on Jan. 11, 2023—Cited in IPR2022-00281, challenging U.S. Pat. No. 9,270,244.

Ex1035—Deposition Transcript for Daniel P. Anagnos, Exhibit-1035, Filed on Jan. 10, 2023—Cited in IPR2022-00324, challenging U.S. Pat. No. 8,254,591.

Ex1035—File History of U.S. Pat. No. 10,635,382; Exhibit-1035, Filed on Dec. 2, 2022—Cited in IPR2022-00234, challenging U.S. Pat. No. 9,124,982.

Ex1035—Letter to Techiya re 587 IPR Stipulation, Exhibit-1035, Filed on Feb. 9, 2024—Cited in IPR2024-00559, challenging U.S. Pat. No. 11,610,587.

Ex1035—National Judicial Caseload Profile, Exhibit-1035, Filed on Jun. 25, 2024—Cited in IPR2024-01031, challenging U.S. Pat. No. 7,049,850.

Ex1035—Patent Rule 4-3 Joint Claim Construction and Prehearing Statement, E.D. TX, Exhibit-1035, Filed on Mar. 7, 2023—Cited in IPR2022-00281, challenging U.S. Pat. No. 9,270,244.

Ex1035—Tanenbaum Excerpt, Exhibit-1035, Filed on Jun. 12, 2024—Cited in IPR2024-01003, challenging U.S. Pat. No. 9,191,083.

Ex1036—LinkedIn Profile for Harish Jonnalagadda, Exhibit-1036, Filed on Jan. 10, 2023—Cited in IPR2022-00324, challenging U.S. Pat. No. 8,254,591.

Ex1036—Oshana excerpt, Exhibit-1036, Filed on Jun. 12, 2024—Cited in IPR2024-01003, challenging U.S. Pat. No. 9,191,083.

Ex1036—Oshana excerpt, Exhibit-1036, Filed on Jun. 12, 2024—Cited in IPR2024-01004, challenging U.S. Pat. No. 9,614,943.

Ex1036—Petitioners' Oral Hearing Demonstratives, Exhibit-1036, Filed on Apr. 13, 2023—Cited in IPR2022-00281, challenging U.S. Pat. No. 9,270,244.

Ex1036—Stay Order from E.D. Tex., Exhibit-1036, Filed on Nov. 20, 2024—Cited in IPR2024-01031, challenging U.S. Pat. No. 7,049,850.

Ex1037—Confidential Settlement Agrement with Exhibits A-I, Exhibit-1037, Filed on Dec. 11, 2024—Cited in IPR2024-00559, challenging U.S. Pat. No. 11,610,587. [Document not publicly available at PTAB].

Ex1038—Confidential Settlement Agreement with Exhibits A-I, Exhibit-1038, Filed on Dec. 11, 2024—Cited in IPR2024-01031, challenging U.S. Pat. No. 7,049,850. [Document not publicly available at PTAB].

Ex1038—Handbook for Sound Engineers_Part 1 of 2, Exhibit-1038, Filed on Jun. 12, 2024—Cited in IPR2024-01003, challenging U.S. Pat. No. 9,191,083.

Ex1038—Handbook for Sound Engineers_Part 2 of 2, Exhibit-1038, Filed on Jun. 12, 2024—Cited in IPR2024-01003, challenging U.S. Pat. No. 9,191,083.

Ex1040—IPR2022-00234, Ex 2001, Declaration of Daniel P Anagnos; Exhibit-1040, Filed on Dec. 2, 2022—Cited in IPR2022-00234, challenging U.S. Pat. No. 9,124,982.

Ex1041—Nov. 18, 2022, Deposition Transcript of Daniel P Anagnos; Exhibit-1041, Filed on Dec. 2, 2022—Cited in IPR2022-00234, challenging U.S. Pat. No. 9,124,982.

Ex1041—Supplemental Declaration of Les E. Atlas, Ph.D., Exhibit-1041, Filed on Jan. 10, 2023—Cited in IPR2022-00324, challenging U.S. Pat. No. 8,254,591.

Ex1042—Excerpts from the Authoritative Dictionary of IEEE Standards Terms; Exhibit-1042, Filed on Dec. 2, 2022—Cited in IPR2022-00234, challenging U.S. Pat. No. 9,124,982.

Ex1042—Petitioners' Oral Hearing Demonstratives, Exhibit-1042, Filed on Apr. 4, 2023—Cited in IPR2022-00324, challenging U.S. Pat. No. 8,254,591.

Ex1043—Institution Decision, IPR2022-00234, Paper 16; Exhibit-1043, Filed on Dec. 2, 2022—Cited in IPR2022-00234, challenging U.S. Pat. No. 9,124,982.

Ex1044—Patent Owner Response, IPR2022-00234, Paper 22; Exhibit-1044, Filed on Dec. 2, 2022—Cited in IPR2022-00234, challenging U.S. Pat. No. 9,124,982.

Ex1045—Excerpt of Prosecution History of U.S. Appl. No. 17/483,190, Exhibit-1045, Filed on Jun. 12, 2024—Cited in IPR2024-01003, challenging U.S. Pat. No. 9,191,083.

Ex1056—U.S. Pat. No. 11,710,473 Samsung Infringement Claim Chart, Ex. A-06, Exhibit-1056, Filed on Jun. 12, 2024—Cited in IPR2024-01003, challenging U.S. Pat. No. 9,191,083.

Ex1056—U.S. Pat. No. 11,710,473 Samsung Infringement Claim Chart, Ex. A-06, Exhibit-1056, Filed on Jun. 12, 2024—Cited in IPR2024-01004, challenging U.S. Pat. No. 9,614,943.

Ex1058—Kuo, Active Noise Control, Exhibit-1058, Filed on Jun. 12, 2024—Cited in IPR2024-01004, challenging U.S. Pat. No. 9,614,943.

Ex1058—Petitioners' Oral Hearing Demonstratives, Exhibit-1058, Filed on Mar. 16, 2023—Cited in IPR2022-00242, challenging U.S. Pat. No. 8,111,839.

Ex1058—Petitioners' Oral Hearing Demonstratives, Exhibit-1058, Filed on Mar. 16, 2023—Cited in IPR2022-00243, challenging U.S. Pat. No. 8,111,839.

Ex1059—Stay Order from E.D. Tex., Exhibit-1059, Filed on Nov. 20, 2024—Cited in IPR2024-01003, challenging U.S. Pat. No. 9,191,083.

Ex1059—Stay Order from E.D. Tex., Exhibit-1059, Filed on Nov. 20, 2024—Cited in IPR2024-01004, challenging U.S. Pat. No. 9,614,943.

Ex1061—Confidential Settlement Agreement with Exhibits A-I, Exhibit-1061, Filed on Dec. 11, 2024—Cited in IPR2024-01004, challenging U.S. Pat. No. 9,614,943. [Document not publicly available at PTAB].

Ex1061—Confidential Settlement Agrement with Exhibits A-I, Exhibit-1061, Filed on Dec. 11, 2024—Cited in IPR2024-01003, challenging U.S. Pat. No. 9,191,083. [Document not publicly available at PTAB].

Excerpt from Computer Dictionary, 2d ed., Exhibit-1027, Filed on Dec. 13, 2021—Cited in IPR2022-00242, challenging U.S. Pat. No. 8,111,839.

Excerpt from Computer Dictionary, 2d ed., Exhibit-1027, Filed on Dec. 13, 2021—Cited in IPR2022-00243, challenging U.S. Pat. No. 8,111,839.

Excerpt from Computer Dictionary, 2d ed.; Exhibit-1029, Filed on Dec. 13, 2021—Cited in IPR2022-00234, challenging U.S. Pat. No. 9,124,982.

Excerpt from Dictionary of Scientific and Technical Terms, 5th ed., Exhibit-1026, Filed on Dec. 20, 2021—Cited in IPR2022-00324, challenging U.S. Pat. No. 8,254,591.

Excerpt from McGraw Hill Dictionary of Scientific and Technical Terms, 5th ed., Exhibit-1025, Filed on Dec. 13, 2021—Cited in IPR2022-00242, challenging U.S. Pat. No. 8,111,839.

Excerpt from McGraw-Hill Dictionary of Scientific and Technical Terms, 5th ed., Exhibit-1025, Filed on Dec. 13, 2021—Cited in IPR2022-00243, challenging U.S. Pat. No. 8,111,839.

Excerpt from Oshana; Exhibit-1030, Filed on Dec. 13, 2021—Cited in IPR2022-00234, challenging U.S. Pat. No. 9,124,982.

Excerpt of File History of U.S. Appl. No. 12/100,281; Exhibit-1006, Filed on Dec. 13, 2021—Cited in IPR2022-00234, challenging U.S. Pat. No. 9,124,982.

Excerpt of File History of U.S. Appl. No. 13/352,694; Exhibit-1007, Filed on Dec. 13, 2021—Cited in IPR2022-00234, challenging U.S. Pat. No. 9,124,982.

Excerpts from Federal Court Management Statistics, Exhibit-1022, Filed on Jul. 1, 2022—Cited in IPR2022-00369, challenging U.S. Pat. No. 10,405,082.

Excerpts from Federal Court Management Statistics, Exhibit-1022, Filed on Jul. 1, 2022—Cited in IPR2022-00388, challenging U.S. Pat. No. 10,966,015.

(56) References Cited

OTHER PUBLICATIONS

Excerpts from Federal Court Management Statistics, Exhibit-1023, Filed on Jul. 1, 2022—Cited in IPR2022-00410, challenging U.S. Pat. No. 10,979,836.

Excerpts from Federal Court Management Statistics, Exhibit-1024, Filed on Jul. 1, 2022—Cited in IPR2022-00253, challenging U.S. Pat. No. 9,491,542.

Excerpts from Federal Court Management Statistics, Exhibit-1026, Filed on Jul. 1, 2022—Cited in IPR2022-00302, challenging U.S. Pat. No. 9,609,424.

Excerpts from Federal Court Management Statistics, Exhibit-1028, Filed on Jul. 1, 2022—Cited in IPR2022-00281, challenging U.S. Pat. No. 9,270,244.

Excerpts from Federal Court Management Statistics, Exhibit-1034, Filed on Jul. 1, 2022—Cited in IPR2022-00324, challenging U.S. Pat. No. 8,254,591.

Excerpts from McGraw-Hill Dictionary of Scientific and Technical Terms, 5th ed.; Exhibit-1021, Filed on Dec. 13, 2021—Cited in IPR2022-00234, challenging U.S. Pat. No. 9,124,982.

Excerpts from Openheim, Exhibit-1016, Filed on Jan. 4, 2022—Cited in IPR2022-00388, challenging U.S. Pat. No. 10,966,015.

Excerpts from Oppenheim & Schafer, 3rd ed., Exhibit-1016, Filed on Dec. 30, 2021—Cited in IPR2022-00369, challenging U.S. Pat. No. 10,405,082.

Excerpts from Oshana, Exhibit-1027, Filed on Dec. 20, 2021—Cited in IPR2022-00324, challenging U.S. Pat. No. 8,254,591.

Excerpts from Oshana, Exhibit-1028, Filed on Dec. 13, 2021—Cited in IPR2022-00242, challenging U.S. Pat. No. 8,111,839.

Excerpts from Oshana, Exhibit-1028, Filed on Dec. 13, 2021—Cited in IPR2022-00243, challenging U.S. Pat. No. 8,111,839.

Exhibit 3001, Exhibit-3001, Filed on Jan. 5, 2023—Cited in IPR2022-00282, challenging U.S. Pat. No. 8,315,400.

Exhibit 3001, Exhibit-3001, Filed on Nov. 3, 2022—Cited in IPR2022-01078, challenging U.S. Pat. No. 11,057,701.

Exhibit 3001, Exhibit-3001, Filed on Nov. 3, 2022—Cited in IPR2022-01106, challenging U.S. Pat. No. 11,039,259.

Exhibit 3001, Exhibit-3001, Filed on Apr. 6, 2023—Cited in IPR2022-00369, challenging U.S. Pat. No. 10,405,082.

Expunged, Exhibit-1002, Filed on Jan. 4, 2022—Cited in IPR2022-00388, challenging U.S. Pat. No. 10,966,015. [Document expunged from PTAB record].

Expunged, Exhibit-1006, Filed on Dec. 13, 2021—Cited in IPR2022-00242, challenging U.S. Pat. No. 8,111,839.

Expunged, Exhibit-1006, Filed on Dec. 13, 2021—Cited in IPR2022-00243, challenging U.S. Pat. No. 8,111,839.

Expunged, Exhibit-1031, Filed on Apr. 13, 2023—Cited in IPR2022-00302, challenging U.S. Pat. No. 9,609,424.

Expunged, Exhibit-1036, Filed on Dec. 9, 2024—Cited in IPR2024-00559, challenging U.S. Pat. No. 11,610,587. [Document expunged from PTAB record].

Expunged, Exhibit-1037, Filed on Dec. 9, 2024—Cited in IPR2024-01031, challenging U.S. Pat. No. 7,049,850. [Document expunged from PTAB record].

Expunged, Exhibit-1060, Filed on Dec. 9, 2024—Cited in IPR2024-01003, challenging U.S. Pat. No. 9,191,083. [Document expunged from PTAB record].

Expunged, Exhibit-1060, Filed on Dec. 9, 2024—Cited in IPR2024-01004, challenging U.S. Pat. No. 9,614,943. [Document expunged from PTAB record].

Expunged, Exhibit-11, Filed on Jan. 18,2023—Cited in IPR2022-01099, challenging U.S. Pat. No. 11,244,666. [Document expunged from PTAB record].

Expunged, Exhibit-12, Filed on Jan. 18, 2023—Cited in IPR2022-01098, challenging U.S. Pat. No. 11,217,237. [Document expunged from PTAB record].

Expunged, Exhibit-2008, Filed on Feb. 22, 2023—Cited in IPR2022-00281, challenging U.S. Pat. No. 9,270,244.

Expunged, Exhibit-3, Filed on Dec. 10, 2021—Cited in IPR2022-00282, challenging U.S. Pat. No. 8,315,400. [Document expunged from PTAB record].

Expunged, Exhibit-3, Filed on Jun. 9, 2022—Cited in IPR2022-01098, challenging U.S. Pat. No. 11,217,237. [Document expunged from PTAB record].

Expunged, Exhibit-3002, Filed on Apr. 6, 2023—Cited in IPR2022-00388, challenging U.S. Pat. No. 10,966,015. [Document expunged from PTAB record].

Expunged, Exhibit-37, Filed on Aug. 15, 2023—Cited in IPR2022-00243, challenging U.S. Pat. No. 8,111,839.

ExpungedExhibit1017, Dec. 9, 2024—Cited in IPR2024-01033, challenging U.S. Pat. No. 8,434,966. [Document expunged from PTAB record].

Extract from Federal Court Management Statistics, Exhibit-1021, Filed on Nov. 10, 2022—Cited in IPR2022-01099, challenging U.S. Pat. No. 11,244,666.

Extract from Federal Court Management Statistics, Exhibit-1024, Filed on Nov. 10, 2022—Cited in IPR2022-01078, challenging U.S. Pat. No. 11,057,701.

Extract from Federal Court Management Statistics, Exhibit-1027, Filed on Nov. 15, 2022—Cited in IPR2022-01098, challenging U.S. Pat. No. 11,217,237.

Extract from Federal Court Management Statistics, Exhibit-1030, Filed on Nov. 10, 2022—Cited in IPR2022-01106, challenging U.S. Pat. No. 11,039,259.

Federal Court Management Statistics (excerpt), Exhibit-2004, Filed on Jul. 1, 2022—Cited in IPR2022-00253, challenging U.S. Pat. No. 9,491,542.

Federal Court Management Statistics (excerpt), Exhibit-2004, Filed on Jul. 1, 2022—Cited in IPR2022-00281, challenging U.S. Pat. No. 9,270,244.

Federal Court Management Statistics (excerpt), Exhibit-2004, Filed on Jul. 1, 2022—Cited in IPR2022-00302, challenging U.S. Pat. No. 9,609,424.

Federal Court Management Statistics (excerpt), Exhibit-2004, Filed on Jul. 1, 2022—Cited in IPR2022-00324, challenging U.S. Pat. No. 8,254,591.

Federal Court Management Statistics (excerpt), Exhibit-2005, Filed on Jul. 1, 2022—Cited in IPR2022-00369, challenging U.S. Pat. No. 10,405,082.

Federal Court Management Statistics (excerpt), Exhibit-2005, Filed on Jul. 1, 2022—Cited in IPR2022-00410, challenging U.S. Pat. No. 10,979,836.

Federal Court Management Statistics (excerpt), Exhibit-2006, Filed on Jul. 1, 2022—Cited in IPR2022-00388, challenging U.S. Pat. No. 10,966,015.

File History for U.S. Pat. No. 9,491,542, Exhibit-1004, Filed on 12/17/2021—Cited in IPR2022-00253, challenging U.S. Pat. No. 9,491,542.

File History of U.S. Appl. No. 16/168,752, Exhibit-2005, Filed on May 18, 2022—Cited in IPR2022-00388, challenging U.S. Pat. No. 10,966,015.

File History of U.S. Appl. No. 12/555,864, Exhibit-1012, Filed on Jan. 14, 2022—Cited in IPR2022-00410, challenging U.S. Pat. No. 10,979,836.

File History of U.S. Appl. No. 14/054,015, Exhibit-1011, Filed on Jan. 14, 2022—Cited in IPR2022-00410, challenging U.S. Pat. No. 10,979,836.

File History of U.S. Appl. No. 14/827,332, Exhibit-1010, Filed on Jan. 14, 2022—Cited in IPR2022-00410, challenging U.S. Pat. No. 10,979,836.

File History of U.S. Appl. No. 15/700,511, Exhibit-1009, Filed on Jan. 14, 2022—Cited in IPR2022-00410, challenging U.S. Pat. No. 10,979,836.

File History of U.S. Appl. No. 16/414,136, Exhibit-1013, Filed on Jan. 14, 2022—Cited in IPR2022-00410, challenging U.S. Pat. No. 10,979,836.

File History of U.S. Pat. No. 8,111,839, Exhibit-1005, Filed on Dec. 13, 2021—Cited in IPR2022-00242, challenging U.S. Pat. No. 8,111,839.

File History of U.S. Pat. No. 8,111,839, Exhibit-1005, Filed on Dec. 13, 2021—Cited in IPR2022-00243, challenging U.S. Pat. No. 8,111,839.

(56) References Cited

OTHER PUBLICATIONS

File History of U.S. Pat. No. 8,254,591, Exhibit-1004, Filed on Dec. 20, 2021—Cited in IPR2022-00324, challenging U.S. Pat. No. 8,254,591.

File History of U.S. Pat. No. 9,124,982; Exhibit-1004, Filed on Dec. 13, 2021—Cited in IPR2022-00234, challenging U.S. Pat. No. 9,124,982.

File History of U.S. Pat. No. 10,405,082, Exhibit-1004, Filed on Dec. 30, 2021—Cited in IPR2022-00369, challenging U.S. Pat. No. 10,405,082.

File History of U.S. Pat. No. 10,966,015, Exhibit-1005, Filed on Jan. 4, 2022—Cited in IPR2022-00388, challenging U.S. Pat. No. 10,966,015.

File History of U.S. Pat. No. 10,979,836,, U.S. Appl. No. 16/838,277, Exhibit-1004, Filed on Jan. 14, 2022—Cited in IPR2022-00410, challenging U.S. Pat. No. 10,979,836.

File History of U.S. Pat. No. 8,315,400, Exhibit-1004, Filed on Dec. 10, 2021—Cited in IPR2022-00282, challenging U.S. Pat. No. 8,315,400.

File History of U.S. Pat. No. 8,774,433, Exhibit-1009, Filed on Dec. 21, 2021—Cited in IPR2022-00302, challenging U.S. Pat. No. 9,609,424.

File History of U.S. Pat. No. 9,270,244, Exhibit-1004, Filed on Dec. 21, 2021—Cited in IPR2022-00281, challenging U.S. Pat. No. 9,270,244.

File History of U.S. Pat. No. 9,332,364, Exhibit-1005, Filed on Dec. 21, 2021—Cited in IPR2022-00302, challenging U.S. Pat. No. 9,609,424.

File History of U.S. Pat. No. 9,609,424, Exhibit-1004, Filed on Dec. 21, 2021—Cited in IPR2022-00302, challenging U.S. Pat. No. 9,609,424.

File History of U.S. Appl. No. 60/910,808; Exhibit-1005, Filed on Dec. 13, 2021—Cited in IPR2022-00234, challenging U.S. Pat. No. 9,124,982.

File History of U.S. Appl. No. 61/098,250, Exhibit-1005, Filed on Jan. 14, 2022—Cited in IPR2022-00410, challenging U.S. Pat. No. 10,979,836.

File History of U.S. Appl. No. 60/619,517 (Allen Provisional), Exhibit-1020, Filed on Dec. 21, 202113 Cited in IPR2022-00302, challenging U.S. Pat. No. 9,609,424.

File History of U.S. Appl. No. 60/866,420, Exhibit-1010, Filed on Dec. 21, 2021—Cited in IPR2022-00302, challenging U.S. Pat. No. 9,609,424.

Final Written Decision, IPR2022-00282 (Paper No. 28, Jun. 14, 2023), Exhibit-1035, Filed on Jun. 30, 2023—Cited in IPR2022-01106, challenging U.S. Pat. No. 11,039,259.

Final Written Decision: Final Written Decision Determining All Challenged Claims Unpatentable 35 U.S.C. sec. 318a, Exhibit-32, Filed on Jan. 5, 2024—Cited in IPR2022-01106, challenging U.S. Pat. No. 11,039,259.

Final Written Decision: original, Exhibit-28, Filed on Jun. 24, 2023—Cited in IPR2022-00282, challenging U.S. Pat. No. 8,315,400.

Final Written Decision: original, Exhibit-31, Filed on Jul. 13, 2023—Cited in IPR2022-00281, challenging U.S. Pat. No. 9,270,244.

Final Written Decision: original, Exhibit-33, Filed on Jul. 10, 2023—Cited in IPR2022-00324, challenging U.S. Pat. No. 8,254,591.

Final Written Decision: original, Exhibit-33, Filed on Jul. 14, 2023—Cited in IPR2022-00253, challenging U.S. Pat. No. 9,491,542.

Final Written Decision: original, Exhibit-36, Filed on Jun. 16, 2023—Cited in IPR2022-00242, challenging U.S. Pat. No. 8,111,839.

Final Written Decision: original; Exhibit-29, Filed on Jun. 14, 2023—Cited in IPR2022-00234, challenging U.S. Pat. No. 9,124,982.

Final Written Decision: Judgment Final Written Decision Determining All Challenged Claims Unpatentable 35 U.S.C. § 318(a), Exhibit-35, Filed on Jun. 23, 2023—Cited in IPR2022-00243, challenging U.S. Pat. No. 8,111,839.

First Amended Complaint, *Staton Techiya* v. *Samsung*, E.D. Tex., Exhibit-1008, Filed on Dec. 10, 2021—Cited in IPR2022-00282, challenging U.S. Pat. No. 8,315,400.

First Amended Complaint, *Techiya* v. *Samsung*, E.D. Tex., Exhibit-1018, Filed on Dec. 21, 2021—Cited in IPR2022-00281, challenging U.S. Pat. No. 9,270,244.

First Amended Complaint, *Techiya* v. *Samsung*, E.D. Tex., Exhibit-1020, Filed on Dec. 17, 2021—Cited in IPR2022-00253, challenging U.S. Pat. No. 9,491,542.

First Amended Complaint, *Techiya* v. *Samsung*, E.D. Tex., Exhibit-1029, Filed on Dec. 20, 2021—Cited in IPR2022-00324, challenging U.S. Pat. No. 8,254,591.

First Amended Complaint, *Techiya* v. *Samsung*, E.D. Tex., Exhibit-1040, Filed on Dec. 13, 2021—Cited in IPR2022-00242, challenging U.S. Pat. No. 8,111,839.

First Amended Complaint, *Techiya* v. *Samsung*, E.D. Tex., Exhibit-1040, Filed on Dec. 13, 2021—Cited in IPR2022-00243, challenging U.S. Pat. No. 8,111,839.

First Amended Complaint, *Techiya* v. *Samsung*, E.D. Tex.; Exhibit-1031, Filed on Dec. 13, 2021—Cited in IPR2022-00234, challenging U.S. Pat. No. 9,124,982.

Granting Institution of Inter Partes Review 35 U.S.C. § 314, Exhibit-13, Filed on Jul. 15, 2022—Cited in IPR2022-00253, challenging U.S. Pat. No. 9,491,542.

Granting Institution of Inter Partes Review 35 U.S.C. § 314, Exhibit-13, Filed on Jul. 15, 2022—Cited in IPR2022-00281, challenging U.S. Pat. No. 9,270,244.

Granting Institution of Inter Partes Review 35 U.S.C. § 314, Exhibit-13, Filed on Aug. 16, 2022—Cited in IPR2022-00388, challenging U.S. Pat. No. 10,966,015.

Granting Institution of Inter Partes Review 35 U.S.C. § 314, Exhibit-14, Filed on Aug. 16, 2022—Cited in IPR2022-00369, challenging U.S. Pat. No. 10,405,082.

Harman Q&As about Microphone Windscreens, Exhibit-2013, Filed on Sep. 13, 2022—Cited in IPR2022-00242, challenging U.S. Pat. No. 8,111,839.

Harman, Q&As about Microphone Screens; Exhibit-2012, Filed on Sep. 9, 2022—Cited in IPR2022-00234, challenging U.S. Pat. No. 9,124,982.

IEEE Dictionary of Standards Terms (excerpts), Exhibit-2006, Filed on Mar. 21, 2022—Cited in IPR2022-00282, challenging U.S. Pat. No. 8,315,400.

Institution Decision: Deny, Exhibit-12, Filed on Aug. 12, 2022—Cited in IPR2022-00410, challenging U.S. Pat. No. 10,979,836.

Institution Decision: Grant, Exhibit-10, Filed on Jan. 9, 2023—Cited in IPR2022-01106, challenging U.S. Pat. No. 11,039,259.

Institution Decision: Grant, Exhibit-12, Filed on Jun. 17, 2022—Cited in IPR2022-00282, challenging U.S. Pat. No. 8,315,400.

Institution Decision: Grant, Exhibit-13, Filed on Jul. 11, 2022—Cited in IPR2022-00302, challenging U.S. Pat. No. 9,609,424.

Institution Decision: Grant, Exhibit-13, Filed on Jul. 11, 2022—Cited in IPR2022-00324, challenging U.S. Pat. No. 8,254,591.

Institution Decision: Grant, Exhibit-15, Filed on Jun. 21, 2022—Cited in IPR2022-00243, challenging U.S. Pat. No. 8,111,839.

Institution Decision: Grant, Exhibit-16, Filed on Jun. 21, 2022—Cited in IPR2022-00242, challenging U.S. Pat. No. 8,111,839.

Institution Decision: Grant, Exhibit-8, Filed on Aug. 16, 2024—Cited in IPR2024-00559, challenging U.S. Pat. No. 11,610,587.

Institution Decision: Grant; Exhibit-12, Filed on Jun. 17, 2022—Cited in IPR2022-00234, challenging U.S. Pat. No. 9,124,982.

Joint Motion to Consolidate; Exhibit-2005, Filed on Apr. 29, 2022—Cited in IPR2022-00234, challenging U.S. Pat. No. 9,124,982.

Joint Motion to Terminate Proceeding, Exhibit-17, Filed on Dec. 9, 2024—Cited in IPR2024-00559, challenging U.S. Pat. No. 11,610,587.

Joint Request to Treat Settlement Agreement as Business Confidential Information, Exhibit-14, Filed on Dec. 9, 2024—Cited in IPR2024-01003, challenging U.S. Pat. No. 9,191,083.

Joint Request to Treat Settlement Agreement as Business Confidential Information, Exhibit-14, Filed on Dec. 9, 2024—Cited in IPR2024-01004, challenging U.S. Pat. No. 9,614,943.

Joint Request to Treat Settlement Agreement as Business Confidential Information, Exhibit-14, Filed on Dec. 9, 2024—Cited in IPR2024-01031, challenging U.S. Pat. No. 7,049,850.

Joint Request to Treat Settlement Agreement as Business Confidential Information, Exhibit-15, Filed on Dec. 9, 2024—Cited in IPR2024-01034, challenging U.S. Pat. No. 9,279,263.

(56) References Cited

OTHER PUBLICATIONS

Joint Request to Treat Settlement Agreement as Business Confidential Information, Exhibit-18, Filed on Dec. 9, 2024—Cited in IPR2024-00559, challenging U.S. Pat. No. 11,610,587.

Joint Request to Treat Settlement Agreement as Business Confidential InformationPaper13, Dec. 9, 2024—Cited in IPR2024-01033, challenging U.S. Pat. No. 8,434,966.

Joint Statement Regarding Oral Argument, Exhibit-15, Filed on Jul. 29, 2022—Cited in IPR2022-00253, challenging U.S. Pat. No. 9,491,542.

Joint Statement Regarding Oral Argument, Exhibit-15, Filed on Jul. 29, 2022—Cited in IPR2022-00281, challenging U.S. Pat. No. 9,270,244.

Joint Statement Regarding Oral Argument, Exhibit-15, Filed on Jul. 29, 2022—Cited in IPR2022-00302, challenging U.S. Pat. No. 9,609,424.

Joint Statement Regarding Oral Argument, Exhibit-15, Filed on Aug. 24, 2022—Cited in IPR2022-00388, challenging U.S. Pat. No. 10,966,015.

Joint Statement Regarding Oral Argument, Exhibit-16, Filed on Jul. 29, 2022—Cited in IPR2022-00324, challenging U.S. Pat. No. 8,254,591.

Joint Statement Regarding Oral Argument, Exhibit-16, Filed on Aug. 24, 2022—Cited in IPR2022-00369, challenging U.S. Pat. No. 10,405,082.

Joint Statement Regarding Oral Argument, Exhibit-18, Filed on Jul. 29, 2022—Cited in IPR2022-00243, challenging U.S. Pat. No. 8,111,839.

Joint Statement Regarding Oral Argument, Exhibit—19, Filed on Jul. 29, 2022—Cited in IPR2022-00242, challenging U.S. Pat. No. 8,111,839.

Joint Stipulation to Modify Due Dates 1-3, Exhibit-10, Filed on Oct. 25, 2024—Cited in IPR2024-00559, challenging U.S. Pat. No. 11,610,587.

Joint Stipulation to Modify Due Dates 1-3, Exhibit-12, Filed on Nov. 22, 2024—Cited in IPR2024-00559, challenging U.S. Pat. No. 11,610,587.

Joint Stipulation to Modify Scheduling Order, Exhibit-14, Filed on Mar. 14, 2023—Cited in IPR2022-01106, challenging U.S. Pat. No. 11,039,259.

Joint Stipulation to Modify the Scheduling Order, Exhibit-16, Filed on Aug. 16, 2022—Cited in IPR2022-00253, challenging U.S. Pat. No. 9,491,542.

Joint Stipulation to Modify the Scheduling Order, Exhibit-16, Filed on Aug. 16, 2022—Cited in IPR2022-00281, challenging U.S. Pat. No. 9,270,244.

Joint Stipulation to Modify the Scheduling Order, Exhibit-16, Filed on Aug. 16, 2022—Cited in IPR2022-00302, challenging U.S. Pat. No. 9,609,424.

Joint Stipulation to Modify the Scheduling Order, Exhibit-19, Filed on Aug. 16, 2022—Cited in IPR2022-00324, challenging U.S. Pat. No. 8,254,591.

Kleinschmidt Declaration in Support of Patent Owner Response, Exhibit-2018, Filed on Apr. 10, 2023—Cited in IPR2022-01106, challenging U.S. Pat. No. 11,039,259.

LEAP Practitioner Request and Verification Form (Patent Owner), Exhibit-29, Filed on Feb. 28, 2023—Cited in IPR2022-00243, challenging U.S. Pat. No. 8,111,839.

LEAP Practitioner Request and Verification Form (Patent Owner), Exhibit-30, Filed on Feb. 28, 2023—Cited in IPR2022-00242, challenging U.S. Pat. No. 8,111,839.

LEAP Practitioner Request and Verification Form (Petitioner), Exhibit-30, Filed on Mar. 13, 2023—Cited in IPR2022-00243, challenging U.S. Pat. No. 8,111,839.

LEAP Practitioner Request and Verification Form (Petitioner), Exhibit-31, Filed on Mar. 13, 2023—Cited in IPR2022-00242, challenging U.S. Pat. No. 8,111,839.

Letter from Petitioners' Counsel to PO's Counsel Apr. 20, 2022, Exhibit-2004, Filed on May 18, 2022—Cited in IPR2022-00369, challenging U.S. Pat. No. 10,405,082.

Letter from Petitioners' Counsel to PO's Counsel Apr. 20, 2022, Exhibit-2004, Filed on May 18, 2022—Cited in IPR2022-00388, challenging U.S. Pat. No. 10,966,015.

Letter from Petitioners' Counsel to PO's Counsel Apr. 20, 2022, Exhibit-2004, Filed on May 18, 2022—Cited in IPR2022-00410, challenging U.S. Pat. No. 10,979,836.

Markman Hearing Transcript (excerpts), Exhibit-2022, Filed on Oct. 19, 2023—Cited in IPR2022-01106, challenging U.S. Pat. No. 11,039,259.

Mauer, Embedded Indexing, Exhibit-2008, Filed on Sep. 13, 2022—Cited in IPR2022-00242, challenging U.S. Pat. No. 8,111,839.

Mauer, Embedded Indexing: Pros and Cons for the Indexer; Exhibit-2008, Filed on Sep. 9, 2022—Cited in IPR2022-00234, challenging U.S. Pat. No. 9,124,982.

McGraw-Hill Dictionary of Scientific and Technical Terms, Exhibit-2010, Filed on Sep. 13, 2022—Cited in IPR2022-00242, challenging U.S. Pat. No. 8,111,839.

McGraw-Hill Dictionary of Scientific and Technical Terms; Exhibit-2009, Filed on Sep. 9, 2022—Cited in IPR2022-00234, challenging U.S. Pat. No. 9,124,982.

Merriam-Webster's Collegiate Dictionary (excerpt), Exhibit-2010, Filed on Oct. 11, 2022—Cited in IPR2022-01106, challenging U.S. Pat. No. 11,039,259.

Montgomery Declaration with Exhibit A, Exhibit-1018, Filed on Jan. 14, 2022—Cited in IPR2022-00410, challenging U.S. Pat. No. 10,979,836.

Motion for Leave to File Corrected Petition, Exhibit-10, Filed on Jan. 31, 2022—Cited in IPR2022-00242, challenging U.S. Pat. No. 8,111,839.

Motion: Motion to dismiss due to settlement (pre-DI), Exhibit-13, Filed on Dec. 9, 2024—Cited in IPR2024-01003, challenging U.S. Pat. No. 9,191,083.

Motion: Motion to dismiss due to settlement (pre-DI), Exhibit-13, Filed on Dec. 9, 2024—Cited in IPR2024-01004, challenging U.S. Pat. No. 9,614,943.

Motion: Motion to dismiss due to settlement (pre-DI), Exhibit-13, Filed on Dec. 9, 2024—Cited in IPR2024-01031, challenging U.S. Pat. No. 7,049,850.

Motion: Motion to dismiss due to settlement (pre-DI), Exhibit-14, Filed on Dec. 9, 2024—Cited in IPR2024-01034, challenging U.S. Pat. No. 9,279,263.

Motion: Motion to dismiss due to settlement (pre-DI)Paper12,Dec. 9, 2024—Cited in IPR2024-01033, challenging U.S. Pat. No. 8,434,966.

Notice : Mandatory Notice, Exhibit-5, Filed on Jul. 16, 2024—Cited in IPR2024-01031, challenging U.S. Pat. No. 7,049,850.

Notice : Mandatory Notice, Exhibit-6, Filed on Jul. 16, 2024—Cited in IPR2024-01034, challenging U.S. Pat. No. 9,279,263.

Notice : Mandatory Notice, Exhibit-7, Filed on Mar. 1, 2024—Cited in IPR2024-00559, challenging U.S. Pat. No. 11,610,587.

Notice : Other—Notice of Ranking, Exhibit-4, Filed on Jul. 1, 2024—Cited in IPR2024-01034, challenging U.S. Pat. No. 9,279,263.

Notice : Power of Attorney for Harman International Industries, Exhibit-3, Filed on Feb. 9, 2024—Cited in IPR2024-00559, challenging U.S. Pat. No. 11,610,587.

Notice : Power of Attorney for Harman International Industries, Inc., Exhibit-3, Filed on Jun. 25, 2024—Cited in IPR2024-01031, challenging U.S. Pat. No. 7,049,850.

Notice : Power of Attorney for Harman International Industries, Inc., Exhibit-3, Filed on Jul. 1, 2024—Cited in IPR2024-01034, challenging U.S. Pat. No. 9,279,263.

Notice : Power of Attorney for Samsung Electronics America, Exhibit-2, Filed on Feb. 9, 2024—Cited in IPR2024-00559, challenging U.S. Pat. No. 11,610,587.

Notice : Power of Attorney for Samsung Electronics America, Inc., Exhibit-2, Filed on Jun. 12, 2024—Cited in IPR2024-01003, challenging U.S. Pat. No. 9,191,083.

Notice : Power of Attorney for Samsung Electronics America, Inc., Exhibit-2, Filed on Jun. 12, 2024—Cited in IPR2024-01004, challenging U.S. Pat. No. 9,614,943.

Notice : Power of Attorney for Samsung Electronics America, Inc., Exhibit-2, Filed on Jun. 25, 2024—Cited in IPR2024-01031, challenging U.S. Pat. No. 7,049,850.

(56) References Cited

OTHER PUBLICATIONS

Notice : Power of Attorney for Samsung Electronics America, Inc., Exhibit-2, Filed on Jul. 1, 2024—Cited in IPR2024-01034, challenging U.S. Pat. No. 9,279,263.

Notice : Power of Attorney for Samsung Electronics America, Inc.Paper2,Jun. 18, 2024—Cited in IPR2024-01033, challenging U.S. Pat. No. 8,434,966.

Notice : Power of Attorney for Samsung Electronics Co., Ltd., Exhibit-1, Filed on Feb. 9, 2024—Cited in IPR2024-00559, challenging U.S. Pat. No. 11,610,587.

Notice : Power of Attorney for Samsung Electronics Co., Ltd., Exhibit-1, Filed on Jun. 12, 2024—Cited in IPR2024-01003, challenging U.S. Pat. No. 9,191,083.

Notice : Power of Attorney for Samsung Electronics Co., Ltd., Exhibit-1, Filed on Jun. 12, 2024—Cited in IPR2024-01004, challenging U.S. Pat. No. 9,614,943.

Notice : Power of Attorney for Samsung Electronics Co., Ltd., Exhibit-1, Filed on Jul. 1, 2024—Cited in IPR2024-01034, challenging U.S. Pat. No. 9,279,263.

Notice : Power of Attorney for Samsung Electronics Co., Ltd. Paper1,Jun. 18, 2024—Cited in IPR2024-01033, challenging U.S. Pat. No. 8,434,966.

Notice : Power of Attorney for Samsung Electronics Corp., Exhibit-1, Filed on Jun. 25, 2024—Cited in IPR2024-01031, challenging U.S. Pat. No. 7,049,850.

Notice : Power of Attorney, Exhibit-6, Filed on Mar. 1, 2024—Cited in IPR2024-00559, challenging U.S. Pat. No. 11,610,587.

Notice : Power of Attorney, Exhibit-6, Filed on Jul. 16, 2024—Cited in IPR2024-01031, challenging U.S. Pat. No. 7,049,850.

Notice : Power of Attorney, Exhibit-7, Filed on Jul. 16, 2024—Cited in IPR2024-01034, challenging U.S. Pat. No. 9,279,263.

Notice of Deposition of Chris Kyriakakis, Ph.D., Exhibit-17, Filed on Sep. 13, 2022—Cited in IPR2022-00302, challenging U.S. Pat. No. 9,609,424.

Notice of Deposition of Daniel P Anagnos, Exhibit-21, Filed on Dec. 14, 2022—Cited in IPR2022-00324, challenging U.S. Pat. No. 8,254,591.

Notice of Deposition of David Kleinschmidt, Exhibit-20, Filed on Dec. 2, 2022—Cited in IPR2022-00253, challenging U.S. Pat. No. 9,491,542.

Notice of Deposition of David Kleinschmidt, Exhibit-20, Filed on Dec. 2, 2022—Cited in IPR2022-00281, challenging U.S. Pat. No. 9,270,244.

Notice of Deposition of Les E. Atlas, Ph.D., Exhibit-13, Filed on Mar. 9, 2023—Cited in IPR2022-01106, challenging U.S. Pat. No. 11,039,259.

Notice of Deposition of Les E. Atlas, Ph.D., Exhibit-17, Filed on Aug. 8, 2022—Cited in IPR2022-00324, challenging U.S. Pat. No. 8,254,591.

Notice of Deposition of Les E. Atlas, Ph.D., Exhibit-19, Filed on Aug. 4, 2022—Cited in IPR2022-00243, challenging U.S. Pat. No. 8,111,839.

Notice of Deposition of Les E. Atlas, Ph.D., Exhibit-20, Filed on Aug. 4, 2022—Cited in IPR2022-00242, challenging U.S. Pat. No. 8,111,839.

Notice of Deposition of Les E. Atlas, Ph.D.; Exhibit-15, Filed on Aug. 4, 2022—Cited in IPR2022-00234, challenging U.S. Pat. No. 9,124,982.

Notice of Deposition of Marshall Buck, Exhibit-19, Filed on Dec. 16, 2022—Cited in IPR2022-00388, challenging U.S. Pat. No. 10,966,015.

Notice of Deposition of Marshall Buck, Exhibit-20, Filed on Dec. 16, 2022—Cited in IPR2022-00369, challenging U.S. Pat. No. 10,405,082.

Notice of Deposition of Nathaniel Polish, Ph.D., Exhibit-18, Filed on Sep. 13, 2022—Cited in IPR2022-00253, challenging U.S. Pat. No. 9,491,542.

Notice of Deposition of Nathaniel Polish, Ph.D., Exhibit-18, Filed on Sep. 13, 2022—Cited in IPR2022-00281, challenging U.S. Pat. No. 9,270,244.

Notice of Deposition of Richard M. Stern, Ph.D., Exhibit-13, Filed on Feb. 28, 2023—Cited in IPR2022-01078, challenging U.S. Pat. No. 11,057,701.

Notice of Deposition of Richard M. Stern, Ph.D., Exhibit-14, Filed on Aug. 5, 2022—Cited in IPR2022-00282, challenging U.S. Pat. No. 8,315,400.

Notice of Deposition of Richard M. Stern, Ph.D., Exhibit-17, Filed on Oct. 14, 2022—Cited in IPR2022-00388, challenging U.S. Pat. No. 10,966,015.

Notice of Deposition of Richard M. Stern, Ph.D., Exhibit-18, Filed on Oct. 14, 2022—Cited in IPR2022-00369, challenging U.S. Pat. No. 10,405,082.

Notice of Filing Date Accorded to Petition, Exhibit-5, Filed on 12/23/2021—Cited in IPR2022-00242, challenging U.S. Pat. No. 8,111,839.

Notice of Filing Date Accorded to Petition, Exhibit-5, Filed on Dec. 23, 2021—Cited in IPR2022-00243, challenging U.S. Pat. No. 8,111,839.

Notice of Ranking, Exhibit-4, Filed on Dec. 31, 2021—Cited in IPR2022-00242, challenging U.S. Pat. No. 8,111,839.

Notice of Ranking, Exhibit-4, Filed on Dec. 13, 2021—Cited in IPR2022-00243, challenging U.S. Pat. No. 8,111,839.

Notice of Ranking, Exhibit-4, Filed on Jun. 12, 2024—Cited in IPR2024-01003, challenging U.S. Pat. No. 9,191,083.

Notice of Ranking, Exhibit-4, Filed on Jun. 12, 2024—Cited in IPR2024-01004, challenging U.S. Pat. No. 9,614,943.

Notice Regarding Transcript of Markman Hearing, Exhibit-29, Filed on Oct. 19, 2023—Cited in IPR2022-01106, challenging U.S. Pat. No. 11,039,259.

Notice: Notice filing date accorded, Exhibit-5, Filed on Dec. 21, 2021—Cited in IPR2022-00282, challenging U.S. Pat. No. 8,315,400.

Notice: Notice filing date accorded, Exhibit-5, Filed on Feb. 27, 2024—Cited in IPR2024-00559, challenging U.S. Pat. No. 11,610,587.

Notice: Notice filing date accorded, Exhibit-5, Filed on Jun. 17, 2024—Cited in IPR2024-01003, challenging U.S. Pat. No. 9,191,083.

Notice: Notice filing date accorded, Exhibit-5, Filed on Jun. 18, 2024—Cited in IPR2024-01004, challenging U.S. Pat. No. 9,614,943.

Notice: Notice filing date accorded, Exhibit-6, Filed on Jan. 13, 2022—Cited in IPR2022-00302, challenging U.S. Pat. No. 9,609,424.

Notice: Notice filing date accorded, Exhibit-6, Filed on Jan. 13, 2022—Cited in IPR2022-00324, challenging U.S. Pat. No. 8,254,591.

Notice: Notice filing date accorded, Exhibit-6, Filed on Jan. 18, 2022—Cited in IPR2022-00253, challenging U.S. Pat. No. 9,491,542.

Notice: Notice filing date accorded, Exhibit-6, Filed on Jan. 18, 2022—Cited in IPR2022-00281, challenging U.S. Pat. No. 9,270,244.

Notice: Notice filing date accorded, Exhibit-6, Filed on Feb. 18, 2022—Cited in IPR2022-00410, challenging U.S. Pat. No. 10,979,836.

Notice: Notice filing date accorded, Exhibit-6, Filed on Jul. 7, 2022—Cited in IPR2022-01078, challenging U.S. Pat. No. 11,057,701.

Notice: Notice filing date accorded, Exhibit-6, Filed on Jul. 7, 2022—Cited in IPR2022-01099, challenging U.S. Pat. No. 11,244,666.

Notice: Notice filing date accorded, Exhibit-6, Filed on Jul. 8, 2022—Cited in IPR2022-01106, challenging U.S. Pat. No. 11,039,259.

Notice: Notice filing date accorded, Exhibit-7, Filed on Feb. 18, 2022—Cited in IPR2022-00388, challenging U.S. Pat. No. 10,966,015.

Notice: Notice filing date accorded, Exhibit-7, Filed on Jul. 7, 2022—Cited in IPR2022-01098, challenging U.S. Pat. No. 11,217,237.

Notice: Notice filing date accorded, Exhibit-8, Filed on Feb. 18, 2022—Cited in IPR2022-00369, challenging U.S. Pat. No. 10,405,082.

Notice: Notice filing date accorded, Exhibit-8, Filed on Jul. 24, 2024—Cited in IPR2024-01031, challenging U.S. Pat. No. 7,049,850.

Notice: Notice filing date accorded, Exhibit-9, Filed on Aug. 16, 2024—Cited in IPR2024-01034, challenging U.S. Pat. No. 9,279,263.

Notice: Notice filing date accorded; Exhibit-4, Filed on Dec. 21, 2021—Cited in IPR2022-00234, challenging U.S. Pat. No. 9,124,982.

Notice: Notice filing date accordedPaper4,Jun. 20, 2024—Cited in IPR2024-01033, challenging U.S. Pat. No. 8,434,966.

Notice: refund approved, Exhibit-13, Filed on Mar. 7, 2023—Cited in IPR2022-01099, challenging U.S. Pat. No. 11,244,666.

Notice: refund approved, Exhibit-14, Filed on Jan. 20, 2023—Cited in IPR2022-00410, challenging U.S. Pat. No. 10,979,836.

Notice: refund approved, Exhibit-14, Filed on Mar. 7, 2023—Cited in IPR2022-01098, challenging U.S. Pat. No. 11,217,237.

(56) References Cited

OTHER PUBLICATIONS

Notice: refund approved, Exhibit-18, Filed on Dec. 17, 2024—Cited in IPR2024-01003, challenging U.S. Pat. No. 9,191,083.
Notice: refund approved, Exhibit-18, Filed on Dec. 17, 2024—Cited in IPR2024-01004, challenging U.S. Pat. No. 9,614,943.
Notice: refund approved, Exhibit-18, Filed on Dec. 17, 2024—Cited in IPR2024-01031, challenging U.S. Pat. No. 7,049,850.
Notice: refund approved, Exhibit-19, Filed on Dec. 17, 2024—Cited in IPR2024-01034, challenging U.S. Pat. No. 9,279,263.
Notice: refund approvedPaper17,Dec. 17, 2024—Cited in IPR2024-01033, challenging U.S. Pat. No. 8,434,966.
Olwal 2005, Exhibit-1023, Filed on Dec. 21, 2021—Cited in IPR2022-00281, challenging U.S. Pat. No. 9,270,244.
Order Adopting Claim Construction Order, Exhibit-2015, Filed on Apr. 10, 2023—Cited in IPR2022-01106, challenging U.S. Pat. No. 11,039,259.
Order Clarifying Claim Construction Order, Exhibit-2014, Filed on Apr. 10, 2023—Cited in IPR2022-01106, challenging U.S. Pat. No. 11,039,259.
Order Conditionally Granting Patent Owner's Motion to Withdraw and Substitute Counsel 37 C.F.R. § 42.10, Exhibit-12, Filed on Dec. 9, 2024—Cited in IPR2024-01003, challenging U.S. Pat. No. 9,191,083.
Order Conditionally Granting Patent Owner's Motion to Withdraw and Substitute Counsel 37 C.F.R. § 42.10, Exhibit-12, Filed on Dec. 9, 2024—Cited in IPR2024-01004, challenging U.S. Pat. No. 9,614,943.
Order Conditionally Granting Patent Owner's Motion to Withdraw and Substitute Counsel 37 C.F.R. § 42.10, Exhibit-12, Filed on Dec. 9, 2024—Cited in IPR2024-01031, challenging U.S. Pat. No. 7,049,850.
Order Conditionally Granting Patent Owner's Motion to Withdraw and Substitute Counsel 37 C.F.R. § 42.10, Exhibit-13, Filed on Dec. 9, 2024—Cited in IPR2024-01034, challenging U.S. Pat. No. 9,279,263.
Order Conditionally Granting Patent Owner's Motion to Withdraw and Substitute Counsel 37 C.F.R. § 42.10Paper11,Dec. 9, 2024—Cited in IPR2024-01033, challenging U.S. Pat. No. 8,434,966.
Order Conditionally Granting Patent Owner's Motion to Withdraw and Substitute Counsel, Exhibit-13, Filed on Dec. 5, 2024—Cited in IPR2024-00559, challenging U.S. Pat. No. 11,610,587.
Order Granting Patent Owner's Motions for Pro Hac Vice Admission of Roy Falik 37 C.F.R. § 42.10(c), Exhibit-9, Filed on Sep. 23, 2024—Cited in IPR2024-01031, challenging U.S. Pat. No. 7,049,850.
Order Trial Hearing 37 C.F.R. 42.70, Exhibit-23, Filed on Feb. 6, 2023—Cited in IPR2022-00282, challenging U.S. Pat. No. 8,315,400.
Order Trial Hearing 37 C.F.R. 42.70; Exhibit-24, Filed on Feb. 6, 2023—Cited in IPR2022-00234, challenging U.S. Pat. No. 9,124,982.
Order Trial Hearing 37 C.F.R. § 42.70, Exhibit-24, Filed on Mar. 1, 2023—Cited in IPR2022-00302, challenging U.S. Pat. No. 9,609,424.
Order Trial Hearing 37 C.F.R. § 42.70, Exhibit-26, Filed on Oct. 10, 2023—Cited in IPR2022-01106, challenging U.S. Pat. No. 11,039,259.
Order Trial Hearing 37 C.F.R. § 42.70, Exhibit-26, Filed on Mar. 1, 2023—Cited in IPR2022-00324, challenging U.S. Pat. No. 8,254,591.
Order Trial Hearing 37 C.F.R. sec 42.70, Exhibit-28, Filed on Feb. 8, 2023—Cited in IPR2022-00243, challenging U.S. Pat. No. 8,111,839.
Order Trial Hearing 37 C.F.R. sec 42.70, Exhibit-29, Filed on Feb. 8, 2023—Cited in IPR2022-00242, challenging U.S. Pat. No. 8,111,839.
Order Trial Hearing, Exhibit-25, Filed on Mar. 1, 2023—Cited in IPR2022-00281, challenging U.S. Pat. No. 9,270,244.
Order Vacating Standing Orders, Exhibit-2005, Filed on Jul. 1, 2022—Cited in IPR2022-00253, challenging U.S. Pat. No. 9,491,542.
Order Vacating Standing Orders, Exhibit-2005, Filed on Jul. 1, 2022—Cited in IPR2022-00281, challenging U.S. Pat. No. 9,270,244.
Order Vacating Standing Orders, Exhibit-2005, Filed on Jul. 1, 2022—Cited in IPR2022-00302, challenging U.S. Pat. No. 9,609,424.
Order Vacating Standing Orders, Exhibit-2005, Filed on Jul. 1, 2022—Cited in IPR2022-00324, challenging U.S. Pat. No. 8,254,591.
Order Vacating Standing Orders, Exhibit-2006, Filed on Jul. 1, 2022—Cited in IPR2022-00369, challenging U.S. Pat. No. 10,405,082.
Order Vacating Standing Orders, Exhibit-2006, Filed on Jul. 1, 2022—Cited in IPR2022-00410, challenging U.S. Pat. No. 10,979,836.
Order Vacating Standing Orders, Exhibit-2007, Filed on Jul. 1, 2022—Cited in IPR2022-00388, challenging U.S. Pat. No. 10,966,015.

Order: Conduct of the Proceeding 37 C.F.R. sec. 42.5, Exhibit-18, Filed on Jan. 5, 2023—Cited in IPR2022-00282, challenging U.S. Pat. No. 8,315,400.
Order: Granting Patent Owner's Motion for Pro Hac Vice Admission of Roy Falik 37 C.F.R. § 42.10, Exhibit-10, Filed on Oct. 4, 2024—Cited in IPR2024-01034, challenging U.S. Pat. No. 9,279,263.
Order: Granting Patent Owner's Motions for Admission Pro Hac Vice of Roy Falik 37 C.F.R. § 42.10, Exhibit-9, Filed on Oct. 4, 2024—Cited in IPR2024-01004, challenging U.S. Pat. No. 9,614,943.
Order: Granting Patent Owner's Motions for Admission Pro Hac Vice of Roy Falik 37 C.F.R. § 42.10Paper8,Oct. 4, 2024—Cited in IPR2024-01033, challenging U.S. Pat. No. 8,434,966.
Order: on Motion, Exhibit-9, Filed on Oct. 4, 2024—Cited in IPR2024-01003, challenging U.S. Pat. No. 9,191,083.
Order: Order Setting Oral Argument 37 C.F.R. § 42.70, Exhibit-22, Filed on Aug. 21, 2023—Cited in IPR2022-01078, challenging U.S. Pat. No. 11,057,701.
Order: Other, Exhibit-12, Filed on Feb. 22, 2023—Cited in IPR2022-01078, challenging U.S. Pat. No. 11,057,701.
Order: Panel Change Order, Exhibit-22, Filed on Feb. 10, 2023—Cited in IPR2022-00253, challenging U.S. Pat. No. 9,491,542.
Order: Scheduling Order, Exhibit-13, Filed on Jun. 17, 2022—Cited in IPR2022-00282, challenging U.S. Pat. No. 8,315,400.
Order: Scheduling Order; Exhibit-13, Filed on Jun. 17, 2022—Cited in IPR2022-00234, challenging U.S. Pat. No. 9,124,982.
Order: Trial Hearing (Revised), Exhibit-27, Filed on Mar. 3, 2023—Cited in IPR2022-00324, challenging U.S. Pat. No. 8,254,591.
Order: Trial Hearing—37 CFR 42.70, Exhibit-26, Filed on Mar. 2, 2023—Cited in IPR2022-00253, challenging U.S. Pat. No. 9,491,542.
Order: Hearing Order, Exhibit-26, Filed on Apr. 7, 2023—Cited in IPR2022-00388, challenging U.S. Pat. No. 10,966,015.
Order: Hearing Order, Exhibit-27, Filed on Apr. 7, 2023—Cited in IPR2022-00369, challenging U.S. Pat. No. 10,405,082.
Order: Trial Hearing (Revised), Exhibit-25, Filed on Mar. 3, 2023—Cited in IPR2022-00302, challenging U.S. Pat. No. 9,609,424.
OSHA, Appx A to 1910.95—Noise Exposure Computation, Exhibit-2014, Filed on Sep. 13, 2022—Cited in IPR2022-00242, challenging U.S. Pat. No. 8,111,839.
OSHA, Appx A to 1910.95—Noise Exposure Computation; Exhibit-2013, Filed on Sep. 9, 2022—Cited in IPR2022-00234, challenging U.S. Pat. No. 9,124,982.
Oshana, Chapters 3-4, Exhibit-1017, Filed on Jan. 14, 2022—Cited in IPR2022-00410, challenging U.S. Pat. No. 10,979,836.
Other: Hearing transcript, Exhibit-25, Filed on Oct. 16, 2023—Cited in IPR2022-01078, challenging U.S. Pat. No. 11,057,701.
Other: Hearing transcript, Exhibit-27, Filed on Apr. 18, 2023—Cited in IPR2022-00282, challenging U.S. Pat. No. 8,315,400.
Other: Hearing transcript, Exhibit-30, Filed on Jul. 25, 2023—Cited in IPR2022-00388, challenging U.S. Pat. No. 10,966,015.
Other: Hearing transcript, Exhibit-31, Filed on Dec. 13, 2023—Cited in IPR2022-01106, challenging U.S. Pat. No. 11,039,259.
Other: Hearing transcript, Exhibit-31, Filed on Jul. 25, 2023—Cited in IPR2022-00369, challenging U.S. Pat. No. 10,405,082.
Other: Hearing transcript, Exhibit-32, Filed on Jul. 3, 2023—Cited in IPR2022-00324, challenging U.S. Pat. No. 8,254,591.
Other: Hearing transcript, Exhibit-32, Filed on Jul. 31, 2023—Cited in IPR2022-00281, challenging U.S. Pat. No. 9,270,244.
Other: Hearing transcript, Exhibit-32, Filed on Jul. 6, 2023—Cited in IPR2022-00253, challenging U.S. Pat. No. 9,491,542.
Other: Hearing transcript, Exhibit-34, Filed on Jun. 1, 2023—Cited in IPR2022-00243, challenging U.S. Pat. No. 8,111,839.
Other: Hearing transcript, Exhibit-34, Filed on Jun. 22, 2023—Cited in IPR2022-00302, challenging U.S. Pat. No. 9,609,424.
Other: Hearing transcript, Exhibit-35, Filed on Jun. 1, 2023—Cited in IPR2022-00242, challenging U.S. Pat. No. 8,111,839.
Other: Hearing transcript, Exhibit-36, Filed on Jul. 6, 2023—Cited in IPR2022-00302, challenging U.S. Pat. No. 9,609,424.
Other: Hearing transcript; Exhibit-28, Filed on Apr. 18, 2023—Cited in IPR2022-00234, challenging U.S. Pat. No. 9,124,982.
Other: Order Granting Motion for Leave to File Corrected Petition, Exhibit-10, Filed on Feb. 2, 2022—Cited in IPR2022-00243, challenging U.S. Pat. No. 8,111,839.

(56) References Cited

OTHER PUBLICATIONS

Other: Order Granting Motion for Leave to File Corrected Petition, Exhibit-11, Filed on Feb. 2, 2022—Cited in IPR2022-00242, challenging U.S. Pat. No. 8,111,839.

Other: Fed Circuit mandate, Exhibit-34, Filed on Jun. 27, 2024—Cited in IPR2022-01106, challenging U.S. Pat. No. 11,039,259.

Other: Fed Circuit mandate, Exhibit-36, Filed on Jun. 27, 2024—Cited in IPR2022-00324, challenging U.S. Pat. No. 8,254,591.

Oxford Dictionary of Elecs and Electrical Eng (excerpts), Exhibit-2005, Filed on Mar. 21, 2022—Cited in IPR2022-00282, challenging U.S. Pat. No. 8,315,400.

P.R. 4-5(d) Joint Claim Construction Chart, Exhibit-2009, Filed on Feb. 22, 2023—Cited in IPR2022-00253, challenging U.S. Pat. No. 9,491,542.

P.R. 4-5(d) Joint Claim Construction Chart, Exhibit-2009, Filed on Feb. 22, 2023—Cited in IPR2022-00281, challenging U.S. Pat. No. 9,270,244.

Panel Change Order, Exhibit-12, Filed on Feb. 3, 2023—Cited in IPR2022-01106, challenging U.S. Pat. No. 11,039,259.

Patent Owner Brief Regarding Interim Procedure for Discretionary Denials, Exhibit-12, Filed on Jul. 1, 2022—Cited in IPR2022-00253, challenging U.S. Pat. No. 9,491,542.

Patent Owner Response; Exhibit-17, Filed on Sep. 9, 2022—Cited in IPR2022-00234, challenging U.S. Pat. No. 9,124,982.

Patent Owner Stanton Techiya LLC's Mandatory NoticePaper6,Jul. 3, 2024—Cited in IPR2024-01033, challenging U.S. Pat. No. 8,434,966.

Patent Owner Staton Techiya, LLC's Mandatory Notice, Exhibit-7, Filed on Jul. 3, 2024—Cited in IPR2024-01004, challenging U.S. Pat. No. 9,614,943.

Patent Owner Staton Techiya, LLC's Mandatory Notices, Exhibit-7, Filed on Jul. 3, 2024—Cited in IPR2024-01003, challenging U.S. Pat. No. 9,191,083.

Patent Owner Staton Techiya, LLC's Motion for the Pro Hac Vice Admission of Roy Falik, Exhibit-8, Filed on Jul. 5, 2024—Cited in IPR2024-01003, challenging U.S. Pat. No. 9,191,083.

Patent Owner Staton Techiya, LLC's Motion for the Pro Hac Vice Admission of Roy Falik, Exhibit-8, Filed on Jul. 5, 2024—Cited in IPR2024-01004, challenging U.S. Pat. No. 9,614,943.

Patent Owner Staton Techiya, LLC's Motion for the Pro Hac Vice Admission of Roy FalikPaper7,Jul. 5, 2024—Cited in IPR2024-01033, challenging U.S. Pat. No. 8,434,966.

Patent Owner Staton Techiya, LLC's Power of Attorney, Exhibit-6, Filed on Jul. 3, 2024—Cited in IPR2024-01003, challenging U.S. Pat. No. 9,191,083.

Patent Owner Staton Techiya, LLC's Power of Attorney, Exhibit-6, Filed on Jul. 3, 2024—Cited in IPR2024-01004, challenging U.S. Pat. No. 9,614,943.

Patent Owner Staton Techiya, LLC's Power of AttorneyPaper5,Jul. 3, 2024—Cited in IPR2024-01033, challenging U.S. Pat. No. 8,434,966.

Patent Owner's Brief Regarding Interim Procedure for Discretionary Denials, Exhibit-11, Filed on Jul. 1, 2022—Cited in IPR2022-00410, challenging U.S. Pat. No. 10,979,836.

Patent Owner's Brief Regarding Interim Procedure for Discretionary Denials, Exhibit-12, Filed on Jul. 1, 2022—Cited in IPR2022-00281, challenging U.S. Pat. No. 9,270,244.

Patent Owner's Brief Regarding Interim Procedure for Discretionary Denials, Exhibit-12, Filed on Jul. 1, 2022—Cited in IPR2022-00302, challenging U.S. Pat. No. 9,609,424.

Patent Owner's Brief Regarding Interim Procedure for Discretionary Denials, Exhibit-12, Filed on Jul. 1, 2022—Cited in IPR2022-00324, challenging U.S. Pat. No. 8,254,591.

Patent Owner's Brief Regarding Interim Procedure for Discretionary Denials, Exhibit-12, Filed on Jul. 1, 2022—Cited in IPR2022-00388, challenging U.S. Pat. No. 10,966,015.

Patent Owner's Brief Regarding Interim Procedure for Discretionary Denials, Exhibit-13, Filed on Jul. 1, 2022—Cited in IPR2022-00369, challenging U.S. Pat. No. 10,405,082.

Patent Owner's Corrected Notice of Appeal, Exhibit-38, Filed on Aug. 15, 2023—Cited in IPR2022-00243, challenging U.S. Pat. No. 8,111,839.

Patent Owner's Demonstratives, Exhibit-2008, Filed on Apr. 11, 2023—Cited in IPR2022-00302, challenging U.S. Pat. No. 9,609,424.

Patent Owner's Demonstratives, Exhibit-2010, Filed on Apr. 12, 2023—Cited in IPR2022-00253, challenging U.S. Pat. No. 9,491,542.

Patent Owner's Demonstratives, Exhibit-2010, Filed on Apr. 13, 2023—Cited in IPR2022-00281, challenging U.S. Pat. No. 9,270,244.

Patent Owner's Demonstratives, Exhibit-2010, Filed on Apr. 4, 2023—Cited in IPR2022-00324, challenging U.S. Pat. No. 8,254,591.

Patent Owner's Demonstratives, Exhibit-2012, Filed on May 9, 2023—Cited in IPR2022-00369, challenging U.S. Pat. No. 10,405,082.

Patent Owner's Demonstratives, Exhibit-2012, Filed on May 9, 2023—Cited in IPR2022-00388, challenging U.S. Pat. No. 10,966,015.

Patent Owner's Demonstratives, Exhibit-2014, Filed on Mar. 14, 2023—Cited in IPR2022-00282, challenging U.S. Pat. No. 8,315,400.

Patent Owner's Demonstratives, Exhibit-2014, Filed on Sep. 25, 2023—Cited in IPR2022-01078, challenging U.S. Pat. No. 11,057,701.

Patent Owner's Demonstratives, Exhibit-2015, Filed on Mar. 16, 2023—Cited in IPR2022-00242, challenging U.S. Pat. No. 8,111,839.

Patent Owner's Demonstratives, Exhibit-2015, Filed on Mar. 16, 2023—Cited in IPR2022-00243, challenging U.S. Pat. No. 8,111,839.

Patent Owner's Demonstratives, Exhibit-2021, Filed on Oct. 11, 2023—Cited in IPR2022-01106, challenging U.S. Pat. No. 11,039,259.

Patent Owner's Demonstratives; Exhibit-2014, Filed on Mar. 14, 2023—Cited in IPR2022-00234, challenging U.S. Pat. No. 9,124,982.

Patent Owner's Mandatory Notice under 37 C.F.R. 42.8, Exhibit-5, Filed on Jan. 19, 2022—Cited in IPR2022-00388, challenging U.S. Pat. No. 10,966,015.

Patent Owner's Mandatory Notice under 37 C.F.R. 42.8, Exhibit-5, Filed on Jan. 19, 2022—Cited in IPR2022-00410, challenging U.S. Pat. No. 10,979,836.

Patent Owner's Mandatory Notice under 37 C.F.R. 42.8, Exhibit-5, Filed on Dec. 28, 2021—Cited in IPR2022-00253, challenging U.S. Pat. No. 9,491,542.

Patent Owner's Mandatory Notice under 37 C.F.R. 42.8, Exhibit-5, Filed on Dec. 28, 2021—Cited in IPR2022-00281, challenging U.S. Pat. No. 9,270,244.

Patent Owner's Mandatory Notice under 37 C.F.R. 42.8, Exhibit-5, Filed on Dec. 28, 2021—Cited in IPR2022-00302, challenging U.S. Pat. No. 9,609,424.

Patent Owner's Mandatory Notice under 37 C.F.R. 42.8, Exhibit-5, Filed on Dec. 28, 2021—Cited in IPR2022-00324, challenging U.S. Pat. No. 8,254,591.

Patent Owner's Mandatory Notice under 37 C.F.R. 42.8, Exhibit-5, Filed on Jun. 22, 2022—Cited in IPR2022-01078, challenging U.S. Pat. No. 11,057,701.

Patent Owner's Mandatory Notice under 37 C.F.R. 42.8, Exhibit-5, Filed on Jun. 22, 2022—Cited in IPR2022-01099, challenging U.S. Pat. No. 11,244,666.

Patent Owner's Mandatory Notice under 37 C.F.R. 42.8, Exhibit-5, Filed on Jun. 22, 2022—Cited in IPR2022-01106, challenging U.S. Pat. No. 11,039,259.

Patent Owner's Mandatory Notice under 37 C.F.R. 42.8, Exhibit-6, Filed on Jun. 22, 2022—Cited in IPR2022-01098, challenging U.S. Pat. No. 11,217,237.

Patent Owner's Mandatory Notice under 37 C.F.R. 42.8, Exhibit-7, Filed on Dec. 28, 2021—Cited in IPR2022-00242, challenging U.S. Pat. No. 8,111,839.

Patent Owner's Mandatory Notice under 37 C.F.R. 42.8, Exhibit-7, Filed on Dec. 28, 2021—Cited in IPR2022-00243, challenging U.S. Pat. No. 8,111,839.

Patent Owner's Mandatory Notice under 37 C.F.R. 42.8, Exhibit-7, Filed on Dec. 28, 2021—Cited in IPR2022-00282, challenging U.S. Pat. No. 8,315,400.

Patent Owner's Mandatory Notice under 37 C.F.R. 42.8; Exhibit-6, Filed on Dec. 28, 2021—Cited in IPR2022-00234, challenging U.S. Pat. No. 9,124,982.

Patent Owner's Mandatory Notice under 37 CFR 42.8, Exhibit-6, Filed on Jan. 19, 2022—Cited in IPR2022-00369, challenging U.S. Pat. No. 10,405,082.

Patent Owner's Notice of Appeal, Exhibit-30, Filed on Aug. 11, 2023—Cited in IPR2022-00282, challenging U.S. Pat. No. 8,315,400.

Patent Owner's Notice of Appeal, Exhibit-33, Filed on Mar. 25, 2024—Cited in IPR2022-01106, challenging U.S. Pat. No. 11,039,259.

(56) References Cited

OTHER PUBLICATIONS

Patent Owner's Notice of Appeal, Exhibit-33, Filed on Sep. 8, 2023—Cited in IPR2022-00281, challenging U.S. Pat. No. 9,270,244.
Patent Owner's Notice of Appeal, Exhibit-34, Filed on Sep. 8, 2023—Cited in IPR2022-00253, challenging U.S. Pat. No. 9,491,542.
Patent Owner's Notice of Appeal, Exhibit-34, Filed on Sep. 8, 2023—Cited in IPR2022-00324, challenging U.S. Pat. No. 8,254,591.
Patent Owner's Notice of Appeal, Exhibit-38, Filed on Aug. 15, 2023—Cited in IPR2022-00242, challenging U.S. Pat. No. 8,111,839.
Patent Owner's Notice of Appeal; Exhibit-31, Filed on Aug. 11, 2023—Cited in IPR2022-00234, challenging U.S. Pat. No. 9,124,982.
Patent Owner's Notice of Cross-Appeal, Exhibit-39, Filed on Aug. 23, 2023—Cited in IPR2022-00302, challenging U.S. Pat. No. 9,609,424.
Patent Owner's Power of Attorney, Exhibit-4, Filed on Jan. 19, 2022—Cited in IPR2022-00388, challenging U.S. Pat. No. 10,966,015.
Patent Owner's Power of Attorney, Exhibit-4, Filed on Jan. 19, 2022—Cited in IPR2022-00410, challenging U.S. Pat. No. 10,979,836.
Patent Owner's Power of Attorney, Exhibit-4, Filed on Dec. 28, 2021—Cited in IPR2022-00253, challenging U.S. Pat. No. 9,491,542.
Patent Owner's Power of Attorney, Exhibit-4, Filed on Dec. 28, 2021—Cited in IPR2022-00281, challenging U.S. Pat. No. 9,270,244.
Patent Owner's Power of Attorney, Exhibit-4, Filed on Dec. 28, 2021—Cited in IPR2022-00302, challenging U.S. Pat. No. 9,609,424.
Patent Owner's Power of Attorney, Exhibit-4, Filed on Dec. 28, 2021—Cited in IPR2022-00324, challenging U.S. Pat. No. 8,254,591.
Patent Owner's Power of Attorney, Exhibit-4, Filed on Jun. 22, 2022—Cited in IPR2022-01078, challenging U.S. Pat. No. 11,057,701.
Patent Owner's Power of Attorney, Exhibit-4, Filed on Jun. 22, 2022—Cited in IPR2022-01099, challenging U.S. Pat. No. 11,244,666.
Patent Owner's Power of Attorney, Exhibit-4, Filed on Jun. 22, 2022—Cited in IPR2022-01106, challenging U.S. Pat. No. 11,039,259.
Patent Owner's Power of Attorney, Exhibit-5, Filed on Jan. 19, 2022—Cited in IPR2022-00369, challenging U.S. Pat. No. 10,405,082.
Patent Owner's Power of Attorney, Exhibit-5, Filed on Jun. 22, 2022—Cited in IPR2022-01098, challenging U.S. Pat. No. 11,217,237.
Patent Owner's Power of Attorney, Exhibit-6, Filed on Dec. 28, 2021—Cited in IPR2022-00242, challenging U.S. Pat. No. 8,111,839.
Patent Owner's Power of Attorney, Exhibit-6, Filed on Dec. 28, 2021—Cited in IPR2022-00243, challenging U.S. Pat. No. 8,111,839.
Patent Owner's Power of Attorney, Exhibit-6, Filed on Dec. 28, 2021—Cited in IPR2022-00282, challenging U.S. Pat. No. 8,315,400.
Patent Owner's Power of Attorney; Exhibit-5, Filed on Dec. 28, 2021—Cited in IPR2022-00234, challenging U.S. Pat. No. 9,124,982.
Patent Owner's Preliminary Response, Exhibit-12, Filed on Mar. 23, 2022—Cited in IPR2022-00243, challenging U.S. Pat. No. 8,111,839.
Patent Owner's Preliminary Response, Exhibit-13, Filed on Mar. 23, 2022—Cited in IPR2022-00242, challenging U.S. Pat. No. 8,111,839.
Patent Owner's Preliminary Response, Exhibit-7, Filed on Oct. 11, 2022—Cited in IPR2022-01106, challenging U.S. Pat. No. 11,039,259.
Patent Owner's Preliminary Response, Exhibit-7, Filed on Oct. 7, 2022—Cited in IPR2022-01078, challenging U.S. Pat. No. 11,057,701.
Patent Owner's Preliminary Response, Exhibit-7, Filed on Oct. 7, 2022—Cited in IPR2022-01099, challenging U.S. Pat. No. 11,244,666.
Patent Owner's Preliminary Response, Exhibit-7, Filed on May 18, 2022—Cited in IPR2022-00410, challenging U.S. Pat. No. 10,979,836.
Patent Owner's Preliminary Response, Exhibit-8, Filed on Oct. 7, 2022—Cited in IPR2022-01098, challenging U.S. Pat. No. 11,217,237.
Patent Owner's Preliminary Response, Exhibit-8, Filed on Apr. 13, 2022—Cited in IPR2022-00302, challenging U.S. Pat. No. 9,609,424.
Patent Owner's Preliminary Response, Exhibit-8, Filed on Apr. 13, 2022—Cited in IPR2022-00324, challenging U.S. Pat. No. 8,254,591.
Patent Owner's Preliminary Response, Exhibit-8, Filed on Apr. 18, 2022—Cited in IPR2022-00253, challenging U.S. Pat. No. 9,491,542.
Patent Owner's Preliminary Response, Exhibit-8, Filed on Apr. 18, 2022—Cited in IPR2022-00281, challenging U.S. Pat. No. 9,270,244.
Patent Owner's Preliminary Response, Exhibit-8, Filed on May 18, 2022—Cited in IPR2022-00388, challenging U.S. Pat. No. 10,966,015.

Patent Owner's Preliminary Response, Exhibit-9, Filed on Mar. 21, 2022—Cited in IPR2022-00282, challenging U.S. Pat. No. 8,315,400.
Patent Owner's Preliminary Response, Exhibit-9, Filed on May 18, 2022—Cited in IPR2022-00369, challenging U.S. Pat. No. 10,405,082.
Patent Owner's Preliminary Response; Exhibit-9, Filed on Mar. 21, 2022—Cited in IPR2022-00234, challenging U.S. Pat. No. 9,124,982.
Patent Owner's Preliminary Sur-Reply, Exhibit-10, Filed on Nov. 22, 2022—Cited in IPR2022-01098, challenging U.S. Pat. No. 11,217,237.
Patent Owner's Preliminary Sur-Reply, Exhibit-10, Filed on May 19, 2022—Cited in IPR2022-00302, challenging U.S. Pat. No. 9,609,424.
Patent Owner's Preliminary Sur-Reply, Exhibit-10, Filed on May 20, 2022—Cited in IPR2022-00324, challenging U.S. Pat. No. 8,254,591.
Patent Owner's Preliminary Sur-Reply, Exhibit-10, Filed on May 31, 2022—Cited in IPR2022-00253, challenging U.S. Pat. No. 9,491,542.
Patent Owner's Preliminary Sur-Reply, Exhibit-10, Filed on Jun. 23, 2022—Cited in IPR2022-00388, challenging U.S. Pat. No. 10,966,015.
Patent Owner's Preliminary Sur-Reply, Exhibit-10, Filed on Jun. 7, 2022—Cited in IPR2022-00281, challenging U.S. Pat. No. 9,270,244.
Patent Owner's Preliminary Sur-Reply, Exhibit-11, Filed on Apr. 29, 2022—Cited in IPR2022-00282, challenging U.S. Pat. No. 8,315,400.
Patent Owner's Preliminary Sur-Reply, Exhibit-11, Filed on Jun. 23, 2022—Cited in IPR2022-00369, challenging U.S. Pat. No. 10,405,082.
Patent Owner's Preliminary Sur-Reply, Exhibit-14, Filed on Apr. 29, 2022—Cited in IPR2022-00243, challenging U.S. Pat. No. 8,111,839.
Patent Owner's Preliminary Sur-Reply, Exhibit-15, Filed on Apr. 29, 2022—Cited in IPR2022-00242, challenging U.S. Pat. No. 8,111,839.
Patent Owner's Preliminary Sur-Reply, Exhibit-9, Filed on Nov. 17, 2022—Cited in IPR2022-01099, challenging U.S. Pat. No. 11,244,666.
Patent Owner's Preliminary Sur-Reply, Exhibit-9, Filed on Nov. 18, 2022—Cited in IPR2022-01078, challenging U.S. Pat. No. 11,057,701.
Patent Owner's Preliminary Sur-Reply, Exhibit-9, Filed on Nov. 18, 2022—Cited in IPR2022-01106, challenging U.S. Pat. No. 11,039,259.
Patent Owner's Preliminary Sur-Reply, Exhibit-9, Filed on Jun. 23, 2022—Cited in IPR2022-00410, challenging U.S. Pat. No. 10,979,836.
Patent Owner's Preliminary Sur-Reply; Exhibit-11, Filed on Apr. 29, 2022—Cited in IPR2022-00234, challenging U.S. Pat. No. 9,124,982.
Patent Owner's Request for Oral Argument, Exhibit-21, Filed on Feb. 3, 2023—Cited in IPR2022-00282, challenging U.S. Pat. No. 8,315,400.
Patent Owner's Request for Oral Argument, Exhibit-21, Filed on Aug. 17, 2023—Cited in IPR2022-01078, challenging U.S. Pat. No. 11,057,701.
Patent Owner's Request for Oral Argument, Exhibit-22, Filed on Feb. 28, 2023—Cited in IPR2022-00302, challenging U.S. Pat. No. 9,609,424.
Patent Owner's Request for Oral Argument, Exhibit-23, Filed on Mar. 1, 2023—Cited in IPR2022-00281, challenging U.S. Pat. No. 9,270,244.
Patent Owner's Request for Oral Argument, Exhibit-24, Filed on Feb. 28, 2023—Cited in IPR2022-00324, challenging U.S. Pat. No. 8,254,591.
Patent Owner's Request for Oral Argument, Exhibit-24, Filed on Mar. 1, 2023—Cited in IPR2022-00253, challenging U.S. Pat. No. 9,491,542.
Patent Owner's Request for Oral Argument, Exhibit-24, Filed on Apr. 4, 2023—Cited in IPR2022-00388, challenging U.S. Pat. No. 10,966,015.
Patent Owner's Request for Oral Argument, Exhibit-25, Filed on Apr. 4, 2023—Cited in IPR2022-00369, challenging U.S. Pat. No. 10,405,082.
Patent Owner's Request for Oral Argument, Exhibit-25, Filed on Aug. 28, 2023—Cited in IPR2022-01106, challenging U.S. Pat. No. 11,039,259.

(56) References Cited

OTHER PUBLICATIONS

Patent Owner's Request for Oral Argument, Exhibit-26, Filed on Feb. 7, 2023—Cited in IPR2022-00243, challenging U.S. Pat. No. 8,111,839.

Patent Owner's Request for Oral Argument, Exhibit-27, Filed on Feb. 7, 2023—Cited in IPR2022-00242, challenging U.S. Pat. No. 8,111,839.

Patent Owner's Request for Oral Argument; Exhibit-22, Filed on Feb. 3, 2023—Cited in IPR2022-00234, challenging U.S. Pat. No. 9,124,982.

Patent Owner's Response, Exhibit-14, Filed on Mar. 23, 2023—Cited in IPR2022-01078, challenging U.S. Pat. No. 11,057,701.

Patent Owner's Response, Exhibit-15, Filed on Sep. 9, 2022—Cited in IPR2022-00282, challenging U.S. Pat. No. 8,315,400.

Patent Owner's Response, Exhibit-16, Filed on Dec. 6, 2024—Cited in IPR2024-00559, challenging U.S. Pat. No. 11,610,587.

Patent Owner's Response, Exhibit-17, Filed on Apr. 10, 2023—Cited in IPR2022-01106, challenging U.S. Pat. No. 11,039,259.

Patent Owner's Response, Exhibit-18, Filed on Oct. 17, 2022—Cited in IPR2022-00302, challenging U.S. Pat. No. 9,609,424.

Patent Owner's Response, Exhibit-18, Filed on Nov. 8, 2022—Cited in IPR2022-00388, challenging U.S. Pat. No. 10,966,015.

Patent Owner's Response, Exhibit-19, Filed on Oct. 19, 2022—Cited in IPR2022-00253, challenging U.S. Pat. No. 9,491,542.

Patent Owner's Response, Exhibit-19, Filed on Oct. 19, 2022—Cited in IPR2022-00281, challenging U.S. Pat. No. 9,270,244.

Patent Owner's Response, Exhibit-19, Filed on Nov. 8, 2022—Cited in IPR2022-00369, challenging U.S. Pat. No. 10,405,082.

Patent Owner's Response, Exhibit-20, Filed on Oct. 17, 2022—Cited in IPR2022-00324, challenging U.S. Pat. No. 8,254,591.

Patent Owner's Response, Exhibit-21, Filed on Sep. 13, 2022—Cited in IPR2022-00243, challenging U.S. Pat. No. 8,111,839.

Patent Owner's Response, Exhibit-22, Filed on Sep. 13, 2022—Cited in IPR2022-00242, challenging U.S. Pat. No. 8,111,839.

Patent Owner's Sur-Reply, Exhibit-19, Filed on Jan. 12, 2023—Cited in IPR2022-00282, challenging U.S. Pat. No. 8,315,400.

Patent Owner's Sur-Reply, Exhibit-19, Filed on Jul. 26, 2023—Cited in IPR2022-01078, challenging U.S. Pat. No. 11,057,701.

Patent Owner's Sur-Reply, Exhibit-21, Filed on Feb. 21, 2023—Cited in IPR2022-00302, challenging U.S. Pat. No. 9,609,424.

Patent Owner's Sur-Reply, Exhibit-22, Filed on Feb. 22, 2023—Cited in IPR2022-00281, challenging U.S. Pat. No. 9,270,244.

Patent Owner's Sur-Reply, Exhibit-22, Filed on Mar. 13, 2023—Cited in IPR2022-00388, challenging U.S. Pat. No. 10,966,015.

Patent Owner's Sur-Reply, Exhibit-23, Filed on Feb. 20, 2023—Cited in IPR2022-00324, challenging U.S. Pat. No. 8,254,591.

Patent Owner's Sur-Reply, Exhibit-23, Filed on Feb. 22, 2023—Cited in IPR2022-00253, challenging U.S. Pat. No. 9,491,542.

Patent Owner's Sur-Reply, Exhibit-23, Filed on Mar. 13, 2023—Cited in IPR2022-00369, challenging U.S. Pat. No. 10,405,082.

Patent Owner's Sur-Reply, Exhibit-23, Filed on Aug. 14, 2023—Cited in IPR2022-01106, challenging U.S. Pat. No. 11,039,259.

Patent Owner's Sur-Reply, Exhibit-25, Filed on Jan. 17, 2023—Cited in IPR2022-00243, challenging U.S. Pat. No. 8,111,839.

Patent Owner's Sur-Reply, Exhibit-26, Filed on Jan. 12, 2023—Cited in IPR2022-00242, challenging U.S. Pat. No. 8,111,839.

Patent Owner's Sur-Reply; Exhibit-21, Filed on Jan. 13, 2023—Cited in IPR2022-00234, challenging U.S. Pat. No. 9,124,982.

Patent Owner's Unopposed Motion to Withdraw and Substitute Counsel Under 37 CFR 11.116, Exhibit-11, Filed on Nov. 13, 2024—Cited in IPR2024-00559, challenging U.S. Pat. No. 11,610,587.

Patent Owner's Unopposed Motion to Withdraw and Substitute Counsel Under 37 CFR 11.116, Exhibit-11, Filed on Nov. 21, 2024—Cited in IPR2024-01003, challenging U.S. Pat. No. 9,191,083.

Patent Owner's Unopposed Motion to Withdraw and Substitute Counsel Under 37 CFR 11.116, Exhibit-11, Filed on Nov. 21, 2024—Cited in IPR2024-01004, challenging U.S. Pat. No. 9,614,943.

Patent Owner's Unopposed Motion to Withdraw and Substitute Counsel Under 37 CFR 11.116, Exhibit-11, Filed on Nov. 21, 2024—Cited in IPR2024-01031, challenging U.S. Pat. No. 7,049,850.

Patent Owner's Unopposed Motion to Withdraw and Substitute Counsel Under 37 CFR 11.116, Exhibit-12, Filed on Nov. 21, 2024—Cited in IPR2024-01034, challenging U.S. Pat. No. 9,279,263.

Patent Owner's Unopposed Motion to Withdraw and Substitute Counsel Under 37 CFR 11.116Paper10,Nov. 21, 2024—Cited in IPR2024-01033, challenging U.S. Pat. No. 8,434,966.

Patent Owner's Updated Exhibit List, Exhibit-23, Filed on Sep. 25, 2023—Cited in IPR2022-01078, challenging U.S. Pat. No. 11,057,701.

Patent Owner's Updated Mandatory Notice under 37 C.F.R. 42.8, Exhibit-15, Filed on Jul. 27, 2022—Cited in IPR2022-00324, challenging U.S. Pat. No. 8,254,591.

Patent Owner's Updated Mandatory Notice under 37 C.F.R. 42.8, Exhibit-17, Filed on Jul. 27, 2022—Cited in IPR2022-00243, challenging U.S. Pat. No. 8,111,839.

Patent Owner's Updated Mandatory Notice under 37 C.F.R. 42.8, Exhibit-18, Filed on Jul. 27, 2022—Cited in IPR2022-00242, challenging U.S. Pat. No. 8,111,839.

Patent Owner's Updated Mandatory Notice under 37 C.F.R. 42.8, Exhibit-8, Filed on Dec. 28, 2021—Cited in IPR2022-00242, challenging U.S. Pat. No. 8,111,839.

Patent Owner's Updated Mandatory Notice under 37 C.F.R. 42.8; Exhibit-14, Filed on Jul. 27, 2022—Cited in IPR2022-00234, challenging U.S. Pat. No. 9,124,982.

Patent Owner's Updated Mandatory Notice under 37 C.F.R. 42.8; Exhibit-7, Filed on Dec. 28, 2021—Cited in IPR2022-00234, challenging U.S. Pat. No. 9,124,982.

Patent Owner's Updated Mandatory Notice, Exhibit-17, Filed on Sep. 13, 2022—Cited in IPR2022-00253, challenging U.S. Pat. No. 9,491,542.

Patent Owner's Updated Mandatory Notice, Exhibit-17, Filed on Sep. 13, 2022—Cited in IPR2022-00281, challenging U.S. Pat. No. 9,270,244.

Patent Owner's Updated Mandatory Notice, Exhibit-18, Filed on Jun. 28, 2023—Cited in IPR2022-01078, challenging U.S. Pat. No. 11,057,701.

Patent Owner's Updated Mandatory Notice, Exhibit-20, Filed on Jun. 28, 2023—Cited in IPR2022-01106, challenging U.S. Pat. No. 11,039,259.

Patent Owner's Updated Mandatory Notice, Exhibit-29, Filed on Jun. 28, 2023—Cited in IPR2022-00282, challenging U.S. Pat. No. 8,315,400.

Patent Owner's Updated Mandatory Notice, Exhibit-29, Filed on Jun. 28, 2023—Cited in IPR2022-00388, challenging U.S. Pat. No. 10,966,015.

Patent Owner's Updated Mandatory Notice, Exhibit-30, Filed on Jun. 28, 2023—Cited in IPR2022-00281, challenging U.S. Pat. No. 9,270,244.

Patent Owner's Updated Mandatory Notice, Exhibit-30, Filed on Jun. 28, 2023—Cited in IPR2022-00369, challenging U.S. Pat. No. 10,405,082.

Patent Owner's Updated Mandatory Notice, Exhibit-31, Filed on Jun. 28, 2023—Cited in IPR2022-00253, challenging U.S. Pat. No. 9,491,542.

Patent Owner's Updated Mandatory Notice, Exhibit-31, Filed on Jun. 28, 2023—Cited in IPR2022-00324, challenging U.S. Pat. No. 8,254,591.

Patent Owner's Updated Mandatory Notice, Exhibit-35, Filed on Jun. 28, 2023—Cited in IPR2022-00302, challenging U.S. Pat. No. 9,609,424.

Patent Owner's Updated Mandatory Notice, Exhibit-36, Filed on Jun. 28, 2023—Cited in IPR2022-00243, challenging U.S. Pat. No. 8,111,839.

Patent Owner's Updated Mandatory Notice, Exhibit-37, Filed on Jun. 28, 2023—Cited in IPR2022-00242, challenging U.S. Pat. No. 8,111,839.

Patent Owner's Updated Mandatory Notice; Exhibit-30, Filed on Jun. 28, 2023—Cited in IPR2022-00234, challenging U.S. Pat. No. 9,124,982.

Patent Owner's Updated Mandatory Notices, Exhibit-15, Filed on Dec. 6, 2024—Cited in IPR2024-00559, challenging U.S. Pat. No. 11,610,587.

(56) References Cited

OTHER PUBLICATIONS

Patent Owner's Updated Power of Attorney Pursuant to 37 CFR 41.10(b), Exhibit-14, Filed on Dec. 6, 2024—Cited in IPR2024-00559, challenging U.S. Pat. No. 11,610,587.
Petition : as filed for Inter Partes Review of U.S. Pat. No. 11,610,587, Exhibit-4, Filed on Feb. 9, 2024—Cited in IPR2024-00559, challenging U.S. Pat. No. 11,610,587.
Petition : as filed, Exhibit-3, Filed on Jun. 12, 2024—Cited in IPR2024-01003, challenging U.S. Pat. No. 9,191,083.
Petition : as filed, Exhibit-3, Filed on Jun. 12, 2024—Cited in IPR2024-01004, challenging U.S. Pat. No. 9,614,943.
Petition : as filed, Exhibit-4, Filed on Jun. 25, 2024—Cited in IPR2024-01031, challenging U.S. Pat. No. 7,049,850.
Petition : as filed, Exhibit-5, Filed on Jul. 1, 2024—Cited in IPR2024-01034, challenging U.S. Pat. No. 9,279,263.
Petition : as filedPaper3,Jun. 18, 2024—Cited in IPR2024-01033, challenging U.S. Pat. No. 8,434,966.
Petition for Inter Partes Review of U.S. Pat. No. 11,217,237, Exhibit-4, Filed on Jun. 9, 2022—Cited in IPR2022-01098, challenging U.S. Pat. No. 11,217,237.
Petition for Inter Partes Review of U.S. Pat. No. 11,244,666, Exhibit-3, Filed on Jun. 9, 2022—Cited in IPR2022-01099, challenging U.S. Pat. No. 11,244,666.
Petition for Inter Partes Review of U.S. Pat. No. 8,254,591, Exhibit-3, Filed on Dec. 20, 2021—Cited in IPR2022-00324, challenging U.S. Pat. No. 8,254,591.
Petition for Inter Partes Review of U.S. Pat. No. 10,405,082, Exhibit-3, Filed on Dec. 30, 2021—Cited in IPR2022-00369, challenging U.S. Pat. No. 10,405,082.
Petition for Inter Partes Review of U.S. Pat. No. 10,966,015, Exhibit-3, Filed on Jan. 4, 2022—Cited in IPR2022-00388, challenging U.S. Pat. No. 10,966,015.
Petition for Inter Partes Review of U.S. Pat. No. 10,979,836, Exhibit-3, Filed on Jan. 14, 2022—Cited in IPR2022-00410, challenging U.S. Pat. No. 10,979,836.
Petition for Inter Partes Review of U.S. Pat. No. 11,039,259, Exhibit-3, Filed on Jun. 9, 2022—Cited in IPR2022-01106, challenging U.S. Pat. No. 11,039,259.
Petition for Inter Partes Review of U.S. Pat. No. 8,111,839, Exhibit-3, Filed on Dec. 13, 2021—Cited in IPR2022-00242, challenging U.S. Pat. No. 8,111,839.
Petition for Inter Partes Review of U.S. Pat. No. 8,111,839, Exhibit-3, Filed on Dec. 13, 2021—Cited in IPR2022-00243, challenging U.S. Pat. No. 8,111,839.
Petition for Inter Partes Review of U.S. Pat. No. 9,124,982; Exhibit-3, Filed on Dec. 13, 2021—Cited in IPR2022-00234, challenging U.S. Pat. No. 9,124,982.
Petition for Inter Partes Review of U.S. Pat. No. 9,270,244, Exhibit-3, Filed on Dec. 21, 2021—Cited in IPR2022-00281, challenging U.S. Pat. No. 9,270,244.
Petition for Inter Partes Review of U.S. Pat. No. 9,491,542, Exhibit-3, Filed on Dec. 17, 2021—Cited in IPR2022-00253, challenging U.S. Pat. No. 9,491,542.
Petition for Inter Partes Review of U.S. Pat. No. 9,609,424, Exhibit-3, Filed on Dec. 21, 2021—Cited in IPR2022-00302, challenging U.S. Pat. No. 9,609,424.
Petition of Inter Partes Review of U.S. Pat. No. 11,057,701, Exhibit-3, Filed on Jun. 9, 2022—Cited in IPR2022-01078, challenging U.S. Pat. No. 11,057,701.
Petition with Proposed Corrections in Redline, Exhibit-1042, Filed on Jan. 31, 2022—Cited in IPR2022-00242, challenging U.S. Pat. No. 8,111,839.
Petition with Proposed Corrections in Redline, Exhibit-1042, Filed on Jan. 31, 2022—Cited in IPR2022-00243, challenging U.S. Pat. No. 8,111,839.
Petitioner's Power of Attorney from Samsung Electronics Co., Ltd.; Exhibit-1, Filed on Dec. 13, 2021—Cited in IPR2022-00234, challenging U.S. Pat. No. 9,124,982.

Petitioner's Power of Attorney from Samsung Electronics, America, Inc.; Exhibit-2, Filed on Dec. 13, 2021—Cited in IPR2022-00234, challenging U.S. Pat. No. 9,124,982.
Petitioner's Updated Mandatory Notices, Exhibit-16, Filed on Oct. 13, 2022—Cited in IPR2022-00388, challenging U.S. Pat. No. 10,966,015.
Petitioner's Updated Mandatory Notices, Exhibit-17, Filed on Oct. 13, 2022—Cited in IPR2022-00369, challenging U.S. Pat. No. 10,405,082.
Petitioner's Updated Mandatory Notices; Exhibit-27, Filed on Apr. 3, 2023—Cited in IPR2022-00234, challenging U.S. Pat. No. 9,124,982.
Petitioners Supplemental Brief on Interim Fintiv Guidance, Exhibit-10, Filed on Jul. 1, 2022—Cited in IPR2022-00410, challenging U.S. Pat. No. 10,979,836.
Petitioners Supplemental Brief on Interim Fintiv Guidance, Exhibit-11, Filed on Jul. 1, 2022—Cited in IPR2022-00253, challenging U.S. Pat. No. 9,491,542.
Petitioners Supplemental Brief on Interim Fintiv Guidance, Exhibit-11, Filed on Jul. 1, 2022—Cited in IPR2022-00281, challenging U.S. Pat. No. 9,270,244.
Petitioners Supplemental Brief on Interim Fintiv Guidance, Exhibit-11, Filed on Jul. 1, 2022—Cited in IPR2022-00302, challenging U.S. Pat. No. 9,609,424.
Petitioners Supplemental Brief on Interim Fintiv Guidance, Exhibit-11, Filed on Jul. 1, 2022—Cited in IPR2022-00324, challenging U.S. Pat. No. 8,254,591.
Petitioners Supplemental Brief on Interim Fintiv Guidance, Exhibit-11, Filed on Jul. 1, 2022—Cited in IPR2022-00388, challenging U.S. Pat. No. 10,966,015.
Petitioners Supplemental Brief on Interim Fintiv Guidance, Exhibit-12, Filed on Jul. 1, 2022—Cited in IPR2022-00369, challenging U.S. Pat. No. 10,405,082.
Petitioners' Demonstrative Exhibits for Oral Argument, Exhibit-1019, Filed on Mar. 14, 2023—Cited in IPR2022-00282, challenging U.S. Pat. No. 8,315,400.
Petitioners' Demonstrative Exhibits for Oral Argument; Exhibit-1045, Filed on Mar. 14, 2023—Cited in IPR2022-00234, challenging U.S. Pat. No. 9,124,982.
Petitioners' Motion for Leave to File Corrected Petition, Exhibit-9, Filed on Jan. 31, 2022—Cited in IPR2022-00243, challenging U.S. Pat. No. 8,111,839.
Petitioners' Motion to Submit Supplemental Information Pursuant to 37 C.F.R. §42.123(b), Exhibit-29, Filed on Apr. 13, 2023—Cited in IPR2022-00302, challenging U.S. Pat. No. 9,609,424.
Petitioners' Notice of Appeal, Exhibit-31, Filed on Aug. 11, 2023—Cited in IPR2022-00282, challenging U.S. Pat. No. 8,315,400.
Petitioners' Notice of Appeal, Exhibit-38, Filed on Aug. 11, 2023—Cited in IPR2022-00302, challenging U.S. Pat. No. 9,609,424.
Petitioners' Notice of Cross-Appeal, Exhibit-34, Filed on Sep. 20, 2023—Cited in IPR2022-00281, challenging U.S. Pat. No. 9,270,244.
Petitioners' Notice of Cross-Appeal, Exhibit-35, Filed on Sep. 20, 2023—Cited in IPR2022-00253, challenging U.S. Pat. No. 9,491,542.
Petitioners' Notice of Cross-Appeal, Exhibit-35, Filed on Sep. 20, 2023—Cited in IPR2022-00324, challenging U.S. Pat. No. 8,254,591.
Petitioners' Notice of Cross-Appeal, Exhibit-39, Filed on Aug. 24, 2023—Cited in IPR2022-00242, challenging U.S. Pat. No. 8,111,839.
Petitioners' Notice of Cross-Appeal; Exhibit-32, Filed on Aug. 24, 2023—Cited in IPR2022-00234, challenging U.S. Pat. No. 9,124,982.
Petitioners' Notice of Depo of Chrisotpher Struck, Exhibit-16, Filed on May 15, 2023—Cited in IPR2022-01078, challenging U.S. Pat. No. 11,057,701.
Petitioners' Notice of Deposition of Christopher Struck, Exhibit-19, Filed on Nov. 15, 2022—Cited in IPR2022-00302, challenging U.S. Pat. No. 9,609,424.
Petitioners' Notice of Deposition of Daniel P. Anagnos, Exhibit-23, Filed on Nov. 9, 2022—Cited in IPR2022-00243, challenging U.S. Pat. No. 8,111,839.
Petitioners' Notice of Deposition of Daniel P. Anagnos, Exhibit-24, Filed on Nov. 9, 2022—Cited in IPR2022-00242, challenging U.S. Pat. No. 8,111,839.
Petitioners' Notice of Deposition of Daniel P. Anagnos; Exhibit-19, Filed on Nov. 9, 2022—Cited in IPR2022-00234, challenging U.S. Pat. No. 9,124,982.

(56) References Cited

OTHER PUBLICATIONS

Petitioners' Notice of Deposition of David Kleinschmidt, Exhibit-19, Filed on May 24, 2023—Cited in IPR2022-01106, challenging U.S. Pat. No. 11,039,259.

Petitioners' Notice of Objections to Evidence, Exhibit-18, Filed on Apr. 19, 2023—Cited in IPR2022-01106, challenging U.S. Pat. No. 11,039,259.

Petitioners' Notice of Objections to Evidence, Exhibit-22, Filed on Sep. 20, 2022—Cited in IPR2022-00243, challenging U.S. Pat. No. 8,111,839.

Petitioners' Notice of Objections to Evidence, Exhibit-23, Filed on Sep. 20, 2022—Cited in IPR2022-00242, challenging U.S. Pat. No. 8,111,839.

Petitioners' Notice of Objections to Evidence; Exhibit-18, Filed on Sep. 16, 2022—Cited in IPR2022-00234, challenging U.S. Pat. No. 9,124,982.

Petitioners' Preliminary Reply, Exhibit-10, Filed on Apr. 20, 2022—Cited in IPR2022-00282, challenging U.S. Pat. No. 8,315,400.

Petitioners' Preliminary Reply, Exhibit-10, Filed on Jun. 14, 2022—Cited in IPR2022-00369, challenging U.S. Pat. No. 10,405,082.

Petitioners' Preliminary Reply, Exhibit-13, Filed on Apr. 20, 2022—Cited in IPR2022-00243, challenging U.S. Pat. No. 8,111,839.

Petitioners' Preliminary Reply, Exhibit-14, Filed on Apr. 20, 2022—Cited in IPR2022-00242, challenging U.S. Pat. No. 8,111,839.

Petitioners' Preliminary Reply, Exhibit-8, Filed on Nov. 10, 2022—Cited in IPR2022-01078, challenging U.S. Pat. No. 11,057,701.

Petitioners' Preliminary Reply, Exhibit-8, Filed on Nov. 10, 2022—Cited in IPR2022-01099, challenging U.S. Pat. No. 11,244,666.

Petitioners' Preliminary Reply, Exhibit-8, Filed on Nov. 10, 2022—Cited in IPR2022-01106, challenging U.S. Pat. No. 11,039,259.

Petitioners' Preliminary Reply, Exhibit-8, Filed on Jun. 14, 2022—Cited in IPR2022-00410, challenging U.S. Pat. No. 10,979,836.

Petitioners' Preliminary Reply, Exhibit-9, Filed on Nov. 15, 2022—Cited in IPR2022-01098, challenging U.S. Pat. No. 11,217,237.

Petitioners' Preliminary Reply, Exhibit-9, Filed on May 10, 2022—Cited in IPR2022-00302, challenging U.S. Pat. No. 9,609,424.

Petitioners' Preliminary Reply, Exhibit-9, Filed on May 11, 2022—Cited in IPR2022-00324, challenging U.S. Pat. No. 8,254,591.

Petitioners' Preliminary Reply, Exhibit-9, Filed on May 20, 2022—Cited in IPR2022-00253, challenging U.S. Pat. No. 9,491,542.

Petitioners' Preliminary Reply, Exhibit-9, Filed on May 27, 2022—Cited in IPR2022-00281, challenging U.S. Pat. No. 9,270,244.

Petitioners' Preliminary Reply, Exhibit-9, Filed on Jun. 14, 2022—Cited in IPR2022-00388, challenging U.S. Pat. No. 10,966,015.

Petitioners' Preliminary Reply; Exhibit-10, Filed on Apr. 20, 2022—Cited in IPR2022-00234, challenging U.S. Pat. No. 9,124,982.

Petitioners' Reply to Patent Owner's Response, Exhibit-17, Filed on Dec. 2, 2022—Cited in IPR2022-00282, challenging U.S. Pat. No. 8,315,400.

Petitioners' Reply to Patent Owner's Response, Exhibit-17, Filed on Jun. 15, 2023—Cited in IPR2022-01078, challenging U.S. Pat. No. 11,057,701.

Petitioners' Reply to Patent Owner's Response, Exhibit-20, Filed on Jan. 10, 2023—Cited in IPR2022-00302, challenging U.S. Pat. No. 9,609,424.

Petitioners' Reply to Patent Owner's Response, Exhibit-20, Filed on Jan. 31, 2023—Cited in IPR2022-00388, challenging U.S. Pat. No. 10,966,015.

Petitioners' Reply to Patent Owner's Response, Exhibit-21, Filed on Jan. 11, 2023—Cited in IPR2022-00281, challenging U.S. Pat. No. 9,270,244.

Petitioners' Reply to Patent Owner's Response, Exhibit-21, Filed on Jan. 31, 2023—Cited in IPR2022-00369, challenging U.S. Pat. No. 10,405,082.

Petitioners' Reply to Patent Owner's Response, Exhibit-21, Filed on Jun. 30, 2023—Cited in IPR2022-01106, challenging U.S. Pat. No. 11,039,259.

Petitioners' Reply to Patent Owner's Response, Exhibit-22, Filed on Jan. 10, 2023—Cited in IPR2022-00324, challenging U.S. Pat. No. 8,254,591.

Petitioners' Reply to Patent Owner's Response, Exhibit-24, Filed on Dec. 6, 2022—Cited in IPR2022-00243, challenging U.S. Pat. No. 8,111,839.

Petitioners' Reply to Patent Owner's Response, Exhibit-25, Filed on Dec. 6, 2022—Cited in IPR2022-00242, challenging U.S. Pat. No. 8,111,839.

Petitioners' Reply to Patent Owner's Response; Exhibit-20, Filed on Dec. 2, 2022—Cited in IPR2022-00234, challenging U.S. Pat. No. 9,124,982.

Petitioners' Reply to Patent Owners Response, Exhibit-21, Filed on Jan. 11, 2023—Cited in IPR2022-00253, challenging U.S. Pat. No. 9,491,542.

Petitioners' Request for Oral Argument, Exhibit-20, Filed on Aug. 17, 2023—Cited in IPR2022-01078, challenging U.S. Pat. No. 11,057,701.

Petitioners' Request for Oral Argument, Exhibit-22, Filed on Feb. 3, 2023—Cited in IPR2022-00282, challenging U.S. Pat. No. 8,315,400.

Petitioners' Request for Oral Argument, Exhibit-23, Filed on Feb. 28, 2023—Cited in IPR2022-00302, challenging U.S. Pat. No. 9,609,424.

Petitioners' Request for Oral Argument, Exhibit-24, Filed on Mar. 1, 2023—Cited in IPR2022-00281, challenging U.S. Pat. No. 9,270,244.

Petitioners' Request for Oral Argument, Exhibit-24, Filed on Aug. 28, 2023—Cited in IPR2022-01106, challenging U.S. Pat. No. 11,039,259.

Petitioners' Request for Oral Argument, Exhibit-25, Filed on Feb. 28, 2023—Cited in IPR2022-00324, challenging U.S. Pat. No. 8,254,591.

Petitioners' Request for Oral Argument, Exhibit-25, Filed on Mar. 1, 2023—Cited in IPR2022-00253, challenging U.S. Pat. No. 9,491,542.

Petitioners' Request for Oral Argument, Exhibit-25, Filed on Apr. 4, 2023—Cited in IPR2022-00388, challenging U.S. Pat. No. 10,966,015.

Petitioners' Request for Oral Argument, Exhibit-26, Filed on Apr. 4, 2023—Cited in IPR2022-00369, challenging U.S. Pat. No. 10,405,082.

Petitioners' Request for Oral Argument, Exhibit-27, Filed on Feb. 7, 2023—Cited in IPR2022-00243, challenging U.S. Pat. No. 8,111,839.

Petitioners' Request for Oral Argument, Exhibit-28, Filed on Feb. 7, 2023—Cited in IPR2022-00242, challenging U.S. Pat. No. 8,111,839.

Petitioners' Request for Oral Argument; Exhibit-23, Filed on Feb. 3, 2023—Cited in IPR2022-00234, challenging U.S. Pat. No. 9,124,982.

Petitioners' Request for Refund of Post-Institution Fee, Exhibit-12, Filed on Mar. 2, 2023—Cited in IPR2022-01099, challenging U.S. Pat. No. 11,244,666.

Petitioners' Request for Refund of Post-Institution Fee, Exhibit-13, Filed on Jan. 18, 2023—Cited in IPR2022-00410, challenging U.S. Pat. No. 10,979,836.

Petitioners' Request for Refund of Post-Institution Fee, Exhibit-13, Filed on Mar. 2, 2023—Cited in IPR2022-01098, challenging U.S. Pat. No. 11,217,237.

Petitioners' Request for Refund of Post-Institution Fees, Exhibit-17, Filed on Dec. 16, 2024—Cited in IPR2024-01003, challenging U.S. Pat. No. 9,191,083.

Petitioners' Request for Refund of Post-Institution Fees, Exhibit-17, Filed on Dec. 16, 2024—Cited in IPR2024-01004, challenging U.S. Pat. No. 9,614,943.

Petitioners' Request for Refund of Post-Institution Fees, Exhibit-17, Filed on Dec. 16, 2024—Cited in IPR2024-01031, challenging U.S. Pat. No. 7,049,850.

Petitioners' Request for Refund of Post-Institution Fees, Exhibit-18, Filed on Dec. 16, 2024—Cited in IPR2024-01034, challenging U.S. Pat. No. 9,279,263.

Petitioners' Request for Refund of Post-Institution FeesPaper16,Dec. 16, 2024—Cited in IPR2024-01033, challenging U.S. Pat. No. 8,434,966.

Petitioners' Submission of Supplemental Information, Exhibit-33, Filed on May 15, 2023—Cited in IPR2022-00302, challenging U.S. Pat. No. 9,609,424.

Petitioners' Sur-Sur-Reply to Patent Owner's Sur-Reply, Exhibit-20, Filed on Jan. 27, 2023—Cited in IPR2022-00282, challenging U.S. Pat. No. 8,315,400.

Petitioners' Sur-Sur-Reply to Patent Owner's Sur-Reply, Exhibit-26, Filed on Mar. 7, 2023—Cited in IPR2022-00281, challenging U.S. Pat. No. 9,270,244.

(56)　　　　　References Cited

OTHER PUBLICATIONS

Petitioners' Sur-Sur-Reply to Patent Owner's Sur-Reply, Exhibit-27, Filed on Mar. 7, 2023—Cited in IPR2022-00253, challenging U.S. Pat. No. 9,491,542.

Petitioners' Updated Exhibit List, Exhibit-10, Filed on Nov. 20, 2024—Cited in IPR2024-01003, challenging U.S. Pat. No. 9,191,083.

Petitioners' Updated Exhibit List, Exhibit-10, Filed on Nov. 20, 2024—Cited in IPR2024-01004, challenging U.S. Pat. No. 9,614,943.

Petitioners' Updated Exhibit List, Exhibit-10, Filed on Nov. 20, 2024—Cited in IPR2024-01031, challenging U.S. Pat. No. 7,049,850.

Petitioners' Updated Exhibit List, Exhibit-11, Filed on Nov. 20, 2024—Cited in IPR2024-01034, challenging U.S. Pat. No. 9,279,263.

Petitioners' Updated Exhibit List, Exhibit-15, Filed on Dec. 11, 2024—Cited in IPR2024-01003, challenging U.S. Pat. No. 9,191,083.

Petitioners' Updated Exhibit List, Exhibit-15, Filed on Dec. 11, 2024—Cited in IPR2024-01004, challenging U.S. Pat. No. 9,614,943.

Petitioners' Updated Exhibit List, Exhibit-15, Filed on Dec. 11, 2024—Cited in IPR2024-01031, challenging U.S. Pat. No. 7,049,850.

Petitioners' Updated Exhibit List, Exhibit-16, Filed on Dec. 11, 2024—Cited in IPR2024-01034, challenging U.S. Pat. No. 9,279,263.

Petitioners' Updated Exhibit List, Exhibit-19, Filed on Dec. 11, 2024—Cited in IPR2024-00559, challenging U.S. Pat. No. 11,610,587.

Petitioners' Updated Exhibit List, Exhibit-24, Filed on Mar. 14, 2023—Cited in IPR2022-00282, challenging U.S. Pat. No. 8,315,400.

Petitioners' Updated Exhibit List, Exhibit-24, Filed on Sep. 26, 2023—Cited in IPR2022-01078, challenging U.S. Pat. No. 11,057,701.

Petitioners' Updated Exhibit List, Exhibit-27, Filed on May 9, 2023—Cited in IPR2022-00388, challenging U.S. Pat. No. 10,966,015.

Petitioners' Updated Exhibit List, Exhibit-28, Filed on Oct. 11, 2023—Cited in IPR2022-01106, challenging U.S. Pat. No. 11,039,259.

Petitioners' Updated Exhibit List, Exhibit-28, Filed on Apr. 11, 2023—Cited in IPR2022-00302, challenging U.S. Pat. No. 9,609,424.

Petitioners' Updated Exhibit List, Exhibit-28, Filed on Apr. 13, 2023—Cited in IPR2022-00281, challenging U.S. Pat. No. 9,270,244.

Petitioners' Updated Exhibit List, Exhibit-28, Filed on May 9, 2023—Cited in IPR2022-00369, challenging U.S. Pat. No. 10,405,082.

Petitioners' Updated Exhibit List, Exhibit-30, Filed on Apr. 12, 2023—Cited in IPR2022-00253, challenging U.S. Pat. No. 9,491,542.

Petitioners' Updated Exhibit List, Exhibit-30, Filed on Apr. 13, 2023—Cited in IPR2022-00302, challenging U.S. Pat. No. 9,609,424.

Petitioners' Updated Exhibit List, Exhibit-30, Filed on Apr. 4, 2023—Cited in IPR2022-00324, challenging U.S. Pat. No. 8,254,591.

Petitioners' Updated Exhibit List, Exhibit-31, Filed on Mar. 16, 2023—Cited in IPR2022-00243, challenging U.S. Pat. No. 8,111,839.

Petitioners' Updated Exhibit List, Exhibit-31, Filed on Apr. 13, 2023—Cited in IPR2022-00302, challenging U.S. Pat. No. 9,609,424.

Petitioners' Updated Exhibit List, Exhibit-32, Filed on Mar. 16, 2023—Cited in IPR2022-00242, challenging U.S. Pat. No. 8,111,839.

Petitioners' Updated Exhibit List; Exhibit-25, Filed on Mar. 14, 2023—Cited in IPR2022-00234, challenging U.S. Pat. No. 9,124,982.

Petitioners' Updated Exhibit ListPaper14,Dec. 11, 2024—Cited in IPR2024-01033, challenging U.S. Pat. No. 8,434,966.

Petitioners' Updated Exhibit ListPaper9,Nov. 20, 2024—Cited in IPR2024-01033, challenging U.S. Pat. No. 8,434,966.

Petitioners' Updated Mandatory Notices, Exhibit-15, Filed on Apr. 3, 2023—Cited in IPR2022-01078, challenging U.S. Pat. No. 11,057,701.

Petitioners' Updated Mandatory Notices, Exhibit-16, Filed on Mar. 28, 2023—Cited in IPR2022-01106, challenging U.S. Pat. No. 11,039,259.

Petitioners' Updated Mandatory Notices, Exhibit-18, Filed on Aug. 10, 2022—Cited in IPR2022-00324, challenging U.S. Pat. No. 8,254,591.

Petitioners' Updated Mandatory Notices, Exhibit-20, Filed on Aug. 10, 2022—Cited in IPR2022-00243, challenging U.S. Pat. No. 8,111,839.

Petitioners' Updated Mandatory Notices, Exhibit-21, Filed on Feb. 8, 2023—Cited in IPR2022-00388, challenging U.S. Pat. No. 10,966,015.

Petitioners' Updated Mandatory Notices, Exhibit-21, Filed on Aug. 10, 2022—Cited in IPR2022-00242, challenging U.S. Pat. No. 8,111,839.

Petitioners' Updated Mandatory Notices, Exhibit-22, Filed on Feb. 8, 2023—Cited in IPR2022-00369, challenging U.S. Pat. No. 10,405,082.

Petitioners' Updated Mandatory Notices, Exhibit-23, Filed on Apr. 3, 2023—Cited in IPR2022-00388, challenging U.S. Pat. No. 10,966,015.

Petitioners' Updated Mandatory Notices, Exhibit-24, Filed on Apr. 3, 2023—Cited in IPR2022-00369, challenging U.S. Pat. No. 10,405,082.

Petitioners' Updated Mandatory Notices, Exhibit-26, Filed on Apr. 3, 2023—Cited in IPR2022-00282, challenging U.S. Pat. No. 8,315,400.

Petitioners' Updated Mandatory Notices, Exhibit-26, Filed on Apr. 3, 2023—Cited in IPR2022-00302, challenging U.S. Pat. No. 9,609,424.

Petitioners' Updated Mandatory Notices, Exhibit-27, Filed on Apr. 3, 2023—Cited in IPR2022-00281, challenging U.S. Pat. No. 9,270,244.

Petitioners' Updated Mandatory Notices, Exhibit-28, Filed on Apr. 3, 2023—Cited in IPR2022-00253, challenging U.S. Pat. No. 9,491,542.

Petitioners' Updated Mandatory Notices, Exhibit-28, Filed on Apr. 3, 2023—Cited in IPR2022-00324, challenging U.S. Pat. No. 8,254,591.

Petitioners' Updated Mandatory Notices, Exhibit-33, Filed on Apr. 3, 2023—Cited in IPR2022-00243, challenging U.S. Pat. No. 8,111,839.

Petitioners' Updated Mandatory Notices, Exhibit-34, Filed on Apr. 3, 2023—Cited in IPR2022-00242, challenging U.S. Pat. No. 8,111,839.

Petitioners' Updated Mandatory Notices, Exhibit-4, Filed on Jan. 6, 2022—Cited in IPR2022-00369, challenging U.S. Pat. No. 10,405,082.

Petitioners' Updated Mandatory Notices, Exhibit-6, Filed on Jan. 20, 2022—Cited in IPR2022-00388, challenging U.S. Pat. No. 10,966,015.

Petitioners' Updated Mandatory Notices, Exhibit-7, Filed on Jan. 20, 2022—Cited in IPR2022-00253, challenging U.S. Pat. No. 9,491,542.

Petitioners' Updated Mandatory Notices, Exhibit-7, Filed on Jan. 20, 2022—Cited in IPR2022-00281, challenging U.S. Pat. No. 9,270,244.

Petitioners' Updated Mandatory Notices, Exhibit-7, Filed on Jan. 20, 2022—Cited in IPR2022-00302, challenging U.S. Pat. No. 9,609,424.

Petitioners' Updated Mandatory Notices, Exhibit-7, Filed on Jan. 20, 2022—Cited in IPR2022-00324, challenging U.S. Pat. No. 8,254,591.

Petitioners' Updated Mandatory Notices, Exhibit-7, Filed on Jan. 20, 2022—Cited in IPR2022-00369, challenging U.S. Pat. No. 10,405,082.

Petitioners' Updated Mandatory Notices, Exhibit-8, Filed on Jan. 20, 2022—Cited in IPR2022-00243, challenging U.S. Pat. No. 8,111,839.

Petitioners' Updated Mandatory Notices, Exhibit-8, Filed on Jan. 20, 2022—Cited in IPR2022-00282, challenging U.S. Pat. No. 8,315,400.

Petitioners' Updated Mandatory Notices, Exhibit-9, Filed on Jan. 20, 2022—Cited in IPR2022-00242, challenging U.S. Pat. No. 8,111,839.

Petitioners' Updated Mandatory Notices; Exhibit-16, Filed on Aug. 10, 2022—Cited in IPR2022-00234, challenging U.S. Pat. No. 9,124,982.

Petitioners' Updated Mandatory Notices; Exhibit-8, Filed on Jan. 20, 2022—Cited in IPR2022-00234, challenging U.S. Pat. No. 9,124,982.

PO's Opposition to Motion to File Supplemental Information, Exhibit-32, Filed on Apr. 17, 2023—Cited in IPR2022-00302, challenging U.S. Pat. No. 9,609,424.

PO's Updated Exhibit List, Exhibit-25, Filed on Mar. 14, 2023—Cited in IPR2022-00282, challenging U.S. Pat. No. 8,315,400.

PO's Updated Exhibit List, Exhibit-27, Filed on Oct. 11, 2023—Cited in IPR2022-01106, challenging U.S. Pat. No. 11,039,259.

PO's Updated Exhibit List, Exhibit-27, Filed on Apr. 11, 2023—Cited in IPR2022-00302, challenging U.S. Pat. No. 9,609,424.

PO's Updated Exhibit List, Exhibit-28, Filed on May 9, 2023—Cited in IPR2022-00388, challenging U.S. Pat. No. 10,966,015.

(56)     References Cited

OTHER PUBLICATIONS

PO's Updated Exhibit List, Exhibit-29, Filed on Apr. 12, 2023—Cited in IPR2022-00253, challenging U.S. Pat. No. 9,491,542.
PO's Updated Exhibit List, Exhibit-29, Filed on Apr. 13, 2023—Cited in IPR2022-00281, challenging U.S. Pat. No. 9,270,244.
PO's Updated Exhibit List, Exhibit-29, Filed on Apr. 4, 2023—Cited in IPR2022-00324, challenging U.S. Pat. No. 8,254,591.
PO's Updated Exhibit List, Exhibit-29, Filed on May 9, 2023—Cited in IPR2022-00369, challenging U.S. Pat. No. 10,405,082.
PO's Updated Exhibit List, Exhibit-30, Filed on Oct. 19, 2023—Cited in IPR2022-01106, challenging U.S. Pat. No. 11,039,259.
PO's Updated Exhibit List, Exhibit-32, Filed on Mar. 16, 2023—Cited in IPR2022-00243, challenging U.S. Pat. No. 8,111,839.
PO's Updated Exhibit List, Exhibit-33, Filed on Mar. 16, 2023—Cited in IPR2022-00242, challenging U.S. Pat. No. 8,111,839.
PO's Updated Exhibit List; Exhibit-26, Filed on Mar. 14, 2023—Cited in IPR2022-00234, challenging U.S. Pat. No. 9,124,982.
Power of Attorney for Samsung Electronics America, Inc., Exhibit-2, Filed on Dec. 30, 2021—Cited in IPR2022-00369, challenging U.S. Pat. No. 10,405,082.
Power of Attorney for Samsung Electronics America, Inc., Exhibit-2, Filed on Jun. 9, 2022—Cited in IPR2022-01078, challenging U.S. Pat. No. 11,057,701.
Power of Attorney for Samsung Electronics America, Inc., Exhibit-2, Filed on Jun. 9, 2022—Cited in IPR2022-01098, challenging U.S. Pat. No. 11,217,237.
Power of Attorney for Samsung Electronics America, Inc., Exhibit-2, Filed on Jun. 9, 2022—Cited in IPR2022-01099, challenging U.S. Pat. No. 11,244,666.
Power of Attorney for Samsung Electronics America, Inc., Exhibit-2, Filed on Jun. 9, 2022—Cited in IPR2022-01106, challenging U.S. Pat. No. 11,039,259.
Power of Attorney for Samsung Electronics Co. Ltd., Exhibit-1, Filed on Jun. 9, 2022—Cited in IPR2022-01078, challenging U.S. Pat. No. 11,057,701.
Power of Attorney for Samsung Electronics Co., Ltd., Exhibit-1, Filed on Dec. 10, 2021—Cited in IPR2022-00282, challenging U.S. Pat. No. 8,315,400.
Power of Attorney for Samsung Electronics Co., Ltd., Exhibit-1, Filed on Dec. 30, 2021—Cited in IPR2022-00369, challenging U.S. Pat. No. 10,405,082.
Power of Attorney for Samsung Electronics Co., Ltd., Exhibit-1, Filed on Jun. 9, 2022—Cited in IPR2022-01098, challenging U.S. Pat. No. 11,217,237.
Power of Attorney for Samsung Electronics Co., Ltd., Exhibit-1, Filed on Jun. 9, 2022—Cited in IPR2022-01099, challenging U.S. Pat. No. 11,244,666.
Power of Attorney for Samsung Electronics Co., Ltd., Exhibit-1, Filed on Jun. 9, 2022—Cited in IPR2022-01106, challenging U.S. Pat. No. 11,039,259.
Power of Attorney for Samsung Electronics, America, Inc., Exhibit-2, Filed on Dec. 10, 2021—Cited in IPR2022-00282, challenging U.S. Pat. No. 8,315,400.
Power of Attorney from Samsung Electronics America, Inc., Exhibit-2, Filed on Jan. 14, 2022—Cited in IPR2022-00410, challenging U.S. Pat. No. 10,979,836.
Power of Attorney from Samsung Electronics America, Inc., Exhibit-2, Filed on Jan. 4, 2022—Cited in IPR2022-00388, challenging U.S. Pat. No. 10,966,015.
Power of Attorney from Samsung Electronics America, Inc., Exhibit-2, Filed on Dec. 13, 2021—Cited in IPR2022-00242, challenging U.S. Pat. No. 8,111,839.
Power of Attorney from Samsung Electronics America, Inc., Exhibit-2, Filed on Dec. 13, 2021—Cited in IPR2022-00243, challenging U.S. Pat. No. 8,111,839.
Power of Attorney from Samsung Electronics America, Inc., Exhibit-2, Filed on Dec. 17, 2021—Cited in IPR2022-00253, challenging U.S. Pat. No. 9,491,542.
Power of Attorney from Samsung Electronics America, Inc., Exhibit-2, Filed on Dec. 20, 2021—Cited in IPR2022-00324, challenging U.S. Pat. No. 8,254,591.
Power of Attorney from Samsung Electronics America, Inc., Exhibit-2, Filed on Dec. 21, 2021—Cited in IPR2022-00281, challenging U.S. Pat. No. 9,270,244.
Power of Attorney from Samsung Electronics America, Inc., Exhibit-2, Filed on Dec. 21, 2021—Cited in IPR2022-00302, challenging U.S. Pat. No. 9,609,424.
Power of Attorney from Samsung Electronics Co., Ltd., Exhibit-1, Filed on Jan. 14, 2022—Cited in IPR2022-00410, challenging U.S. Pat. No. 10,979,836.
Power of Attorney from Samsung Electronics Co., Ltd., Exhibit-1, Filed on Jan. 4, 2022—Cited in IPR2022-00388, challenging U.S. Pat. No. 10,966,015.
Power of Attorney from Samsung Electronics Co., Ltd., Exhibit-1, Filed on Dec. 13, 2021—Cited in IPR2022-00242, challenging U.S. Pat. No. 8,111,839.
Power of Attorney from Samsung Electronics Co., Ltd., Exhibit-1, Filed on Dec. 13, 2021—Cited in IPR2022-00243, challenging U.S. Pat. No. 8,111,839.
Power of Attorney from Samsung Electronics Co., Ltd., Exhibit-1, Filed on Dec. 17, 2021—Cited in IPR2022-00253, challenging U.S. Pat. No. 9,491,542.
Power of Attorney from Samsung Electronics Co., Ltd., Exhibit-1, Filed on Dec. 20, 2021—Cited in IPR2022-00324, challenging U.S. Pat. No. 8,254,591.
Power of Attorney from Samsung Electronics Co., Ltd., Exhibit-1, Filed on Dec. 21, 2021—Cited in IPR2022-00281, challenging U.S. Pat. No. 9,270,244.
Power of Attorney from Samsung Electronics Co., Ltd., Exhibit-1, Filed on Dec. 21, 2021—Cited in IPR2022-00302, challenging U.S. Pat. No. 9,609,424.
PR 4-3 JCC Statement, Exhibit-2013, Filed on Jan. 12, 2023—Cited in IPR2022-00282, challenging U.S. Pat. No. 8,315,400.
PR 4-5(d) JCC Chart, Exhibit-2011, Filed on Jan. 12, 2023—Cited in IPR2022-00282, challenging U.S. Pat. No. 8,315,400.
Revised Scheduling Order, Exhibit-22, Filed on Jul. 12, 2023—Cited in IPR2022-01106, challenging U.S. Pat. No. 11,039,259.
Roy Falik, Exhibit-7, Filed on Jul. 18, 2024—Cited in IPR2024-01031, challenging U.S. Pat. No. 7,049,850.
Roy Falik, Exhibit-8, Filed on Jul. 18, 2024—Cited in IPR2024-01034, challenging U.S. Pat. No. 9,279,263.
Sage Journal, The Future of Hearing Aid Technology, Exhibit-2008, Filed on Oct. 17, 2022—Cited in IPR2022-00324, challenging U.S. Pat. No. 8,254,591.
*Samsung Elecs. Co., Ltd., et al.* v. *Staton Techiya, LLC*, IPR2022-00302, Paper 11, Exhibit-2006, Filed on Oct. 11, 2022—Cited in IPR2022-01106, challenging U.S. Pat. No. 11,039,259.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01078, challenging U.S. Pat. No. 11,057,701.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01098, challenging U.S. Pat. No. 11,217,237.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01099, challenging U.S. Pat. No. 11,244,666.
Samsung's Claim Construction Brief, Exhibit-2012, Filed on Jan. 12, 2023—Cited in IPR2022-00282, challenging U.S. Pat. No. 8,315,400.
Samsung's Responsive Claim Construction Brief, Exhibit-2012, Filed on Apr. 10, 2023—Cited in IPR2022-01106, challenging U.S. Pat. No. 11,039,259.
Scheduling Order, Exhibit-11, Filed on Jan. 9, 2023—Cited in IPR2022-01106, challenging U.S. Pat. No. 11,039,259.
Scheduling Order, Exhibit-11, Filed on Dec. 30, 2022—Cited in IPR2022-01078, challenging U.S. Pat. No. 11,057,701.
Scheduling Order, Exhibit-14, Filed on Jul. 12, 2022—Cited in IPR2022-00302, challenging U.S. Pat. No. 9,609,424.
Scheduling Order, Exhibit-14, Filed on Jul. 12, 2022—Cited in IPR2022-00324, challenging U.S. Pat. No. 8,254,591.

(56) References Cited

OTHER PUBLICATIONS

Scheduling Order, Exhibit-14, Filed on Jul. 15, 2022—Cited in IPR2022-00253, challenging U.S. Pat. No. 9,491,542.
Scheduling Order, Exhibit-14, Filed on Jul. 15, 2022—Cited in IPR2022-00281, challenging U.S. Pat. No. 9,270,244.
Scheduling Order, Exhibit-14, Filed on Aug. 16, 2022—Cited in IPR2022-00388, challenging U.S. Pat. No. 10,966,015.
Scheduling Order, Exhibit-15, Filed on Aug. 16, 2022—Cited in IPR2022-00369, challenging U.S. Pat. No. 10,405,082.
Scheduling Order, Exhibit-16, Filed on Jun. 21, 2022—Cited in IPR2022-00243, challenging U.S. Pat. No. 8,111,839.
Scheduling Order, Exhibit-17, Filed on Jun. 21, 2022—Cited in IPR2022-00242, challenging U.S. Pat. No. 8,111,839.
Scheduling Order, Exhibit-9, Filed on Aug. 22, 2024—Cited in IPR2024-00559, challenging U.S. Pat. No. 11,610,587.
*Staton Techiya* v *Samsung*—Docket Control Order, Exhibit-2003, Filed on Apr. 18, 2022—Cited in IPR2022-00253, challenging U.S. Pat. No. 9,491,542.
*Staton Techiya* v *Samsung*—Docket Control Order, Exhibit-2003, Filed on Apr. 18, 2022—Cited in IPR2022-00281, challenging U.S. Pat. No. 9,270,244.
*Staton Techiya* v *Samsung*, Docket Control Order, Exhibit-2003, Filed on Mar. 21, 2022—Cited in IPR2022-00282, challenging U.S. Pat. No. 8,315,400.
*Staton Techiya* v *Samsung*, Docket Control Order, Exhibit-2003, Filed on Apr. 13, 2022—Cited in IPR2022-00302, challenging U.S. Pat. No. 9,609,424.
*Staton Techiya* v *Samsung*, Docket Control Order, Exhibit-2003, Filed on Apr. 13, 2022—Cited in IPR2022-00324, challenging U.S. Pat. No. 8,254,591.
*Staton Techiya* v. *Samsung*, Claim Construction Order, Exhibit-2012, Filed on Mar. 23, 2023—Cited in IPR2022-01078, challenging U.S. Pat. No. 11,057,701.
*Staton Techiya* v. *Samsung*, Docket Control Order, Exhibit-2003, Filed on Mar. 23, 2022—Cited in IPR2022-00242, challenging U.S. Pat. No. 8,111,839.
*Staton Techiya* v. *Samsung*, Docket Control Order, Exhibit-2003, Filed on Mar. 23, 2022—Cited in IPR2022-00243, challenging U.S. Pat. No. 8,111,839.
*Staton Techiya* v. *Samsung*, Docket Control Order, Exhibit—2003, Filed on May 18, 2022—Cited in IPR2022-00369, challenging U.S. Pat. No. 10,405,082.
*Staton Techiya* v. *Samsung*, Docket Control Order, Exhibit-2003, Filed on May 18, 2022—Cited in IPR2022-00388, challenging U.S. Pat. No. 10,966,015.
*Staton Techiya* v. *Samsung*, Docket Control Order, Exhibit-2003, Filed on May 18, 2022—Cited in IPR2022-00410, challenging U.S. Pat. No. 10,979,836.
*Staton Techiya* v. *Samsung*, Docket Control Order; Exhibit-2003, Filed on Mar. 21, 2022—Cited in IPR2022-00234, challenging U.S. Pat. No. 9,124,982.
*Staton Techiya* v. *Samsung*, Joint Motion to Consolidate, Exhibit-2005, Filed on Apr. 29, 2022—Cited in IPR2022-00242, challenging U.S. Pat. No. 8,111,839.
*Staton Techiya* v. *Samsung*, Joint Mtn to Consolidate, Exhibit-2005, Filed on Apr. 29, 2022—Cited in IPR2022-00243, challenging U.S. Pat. No. 8,111,839.
*Staton Techiya* v. *Samsung*, Joint Mtn to Consolidate, Exhibit-2008, Filed on Apr. 29, 2022—Cited in IPR2022-00282, challenging U.S. Pat. No. 8,315,400.
*Staton Techiya* v. *Samsung*, P.R. 4-5(d) Joint Claim Construction Chart, Exhibit-2011, Filed on Mar. 23, 2023—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit-2007, Filed on Nov. 8, 2022—Cited in IPR2022-00369, challenging U.S. Pat. No. 10,405,082.
*Staton Techiya, LLC* v. *Samsung Elecs. Co., Ltd.*, Appendix B to P.R. 4-3 Statement, Exhibit-2009, Filed on Nov. 18, 2022—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit-2010, Filed on Nov. 8, 2022—Cited in IPR2022-00388, challenging U.S. Pat. No. 10,966,015.
*Staton Techiya, LLC* v. *Samsung Elecs., Co., Ltd.*, Appendix B to P.R. 4-3 Statement, Exhibit-2011, Filed on Nov. 18, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit-2004, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order, Exhibit-2005, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Joint Motion to Consolidate, Exhibit-2007, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiff's Infringement Contentions, dated Apr. 6, 2022, Exhibit-2008, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Plaintiff's P.R. 4-2 Disclosures, Exhibit-2003, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' Infringement Contentions dated Apr. 6, 2022, Exhibit-2008, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' Infringement Contentions, dated Apr. 6, 2022, Exhibit-2008, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Plaintiffs' Infringement Contentions, dated Apr. 6, 2022, Exhibit-2008, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' P.R. 4-2 Disclosures, Exhibit-2003, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' P.R. 4-2 Disclosures, Exhibit-2003, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Plaintiffs' P.R. 4-2 Disclosures, Exhibit-2003, Filed on Oct. 7, 2022—Cited in IPR2022-01098, challenging U.S. Pat. No. 11,217,237.
Stipulation Letter dated Apr. 20, 2022, Exhibit-1031, Filed on May 11, 2022—Cited in IPR2022-00324, challenging U.S. Pat. No. 8,254,591.

(56) References Cited

OTHER PUBLICATIONS

Stipulation Letter from D. Rokach to J. Snodgrass, Exhibit-1025, Filed on Nov. 10, 2022—Cited in IPR2022-01099, challenging U.S. Pat. No. 11,244,666.

Stipulation Letter from D. Rokach to J. Snodgrass, Exhibit-1027, Filed on Nov. 10, 2022—Cited in IPR2022-01078, challenging U.S. Pat. No. 11,057,701.

Stipulation Letter from D. Rokach to J. Snodgrass, Exhibit-1030, Filed on Nov. 15, 2022—Cited in IPR2022-01098, challenging U.S. Pat. No. 11,217,237.

Stipulation Letter from D. Rokach to J. Snodgrass, Exhibit-1033, Filed on Nov. 10, 2022—Cited in IPR2022-01106, challenging U.S. Pat. No. 11,039,259.

Stipulation Letter, Exhibit-1015, Filed on Apr. 20, 2022—Cited in IPR2022-00282, challenging U.S. Pat. No. 8,315,400.

Stipulation Letter, Exhibit-1019, Filed on Jun. 14, 2022—Cited in IPR2022-00369, challenging U.S. Pat. No. 10,405,082.

Stipulation Letter, Exhibit-1019, Filed on Jun. 14, 2022—Cited in IPR2022-00388, challenging U.S. Pat. No. 10,966,015.

Stipulation Letter, Exhibit-1020, Filed on Jun. 14, 2022—Cited in IPR2022-00410, challenging U.S. Pat. No. 10,979,836.

Stipulation Letter, Exhibit-1023, Filed on May 10, 2022—Cited in IPR2022-00302, challenging U.S. Pat. No. 9,609,424.

Stipulation Letter, Exhibit-1044, Filed on Apr. 20, 2022—Cited in IPR2022-00242, challenging U.S. Pat. No. 8,111,839.

Stipulation Letter, Exhibit-1044, Filed on Apr. 20, 2022—Cited in IPR2022-00243, challenging U.S. Pat. No. 8,111,839.

Stipulation Letter; Exhibit-1034, Filed on Apr. 20, 2022—Cited in IPR2022-00234, challenging U.S. Pat. No. 9,124,982.

Summary of all applications in the '082 patent family, Exhibit-1018, Filed on Dec. 30, 2021—Cited in IPR2022-00369, challenging U.S. Pat. No. 10,405,082.

Summary of all applications in the '836 patent's family, Exhibit-1019, Filed on Jan. 14, 2022—Cited in IPR2022-00410, challenging U.S. Pat. No. 10,979,836.

Summary of Application in '839 Patent Priority Chain, Exhibit-1041, Filed on Dec. 13, 2021—Cited in IPR2022-00243, challenging U.S. Pat. No. 8,111,839.

Summary of applications in '015 patent family, Exhibit-1018, Filed on Jan. 4, 2022—Cited in IPR2022-00388, challenging U.S. Pat. No. 10,966,015.

Summary of applications in '591 priority chain, Exhibit-1030, Filed on Dec. 20, 2021—Cited in IPR2022-00324, challenging U.S. Pat. No. 8,254,591.

Summary of Applications in '839 Priority Chain, Exhibit-1041, Filed on Dec. 13, 2021—Cited in IPR2022-00242, challenging U.S. Pat. No. 8,111,839.

Summary of Applications in '982 Priority Chain; Exhibit-1032, Filed on Dec. 13, 2021—Cited in IPR2022-00234, challenging U.S. Pat. No. 9,124,982.

Techopedia, Faceplate, Exhibit-2011, Filed on Sep. 13, 2022—Cited in IPR2022-00242, challenging U.S. Pat. No. 8,111,839.

Techopedia, Faceplate; Exhibit-2010, Filed on Sep. 9, 2022—Cited in IPR2022-00234, challenging U.S. Pat. No. 9,124,982.

Termination Decision: Post-DI Settlement, Exhibit-20, Filed on Dec. 12, 2024—Cited in IPR2024-00559, challenging U.S. Pat. No. 11,610,587.

Termination Decision: Pre-DI settlement, Exhibit-16, Filed on Dec. 12, 2024—Cited in IPR2024-01003, challenging U.S. Pat. No. 9,191,083.

Termination Decision: Pre-DI settlement, Exhibit-16, Filed on Dec. 12, 2024—Cited in IPR2024-01004, challenging U.S. Pat. No. 9,614,943.

Termination Decision: Pre-DI settlement, Exhibit-16, Filed on Dec. 12, 2024—Cited in IPR2024-01031, challenging U.S. Pat. No. 7,049,850.

Termination Decision: Pre-DI settlement, Exhibit-17, Filed on Dec. 12, 2024—Cited in IPR2024-01034, challenging U.S. Pat. No. 9,279,263.

Termination Decision: Pre-DI settlementPaper15,Dec. 12, 2024—Cited in IPR2024-01033, challenging U.S. Pat. No. 8,434,966.

Transcript of Deposition of Chris Kyriakakis, Ph.D. taken Oct. 7, 2022, Exhibit-2007, Filed on Oct. 17, 2022—Cited in IPR2022-00302, challenging U.S. Pat. No. 9,609,424.

Transcript of Deposition of Christopher Struck, Exhibit-1028, Filed on Jun. 15, 2023—Cited in IPR2022-01078, challenging U.S. Pat. No. 11,057,701.

Transcript of Deposition of Dr. Les Atlas, Exhibit-2007, Filed on Oct. 17, 2022—Cited in IPR2022-00324, challenging U.S. Pat. No. 8,254,591.

Transcript of Deposition of Dr. Les Atlas; Exhibit-2007, Filed on Sep. 9, 2022—Cited in IPR2022-00234, challenging U.S. Pat. No. 9,124,982.

Transcript of Deposition of Les Atlas, Ph.D., Aug. 18, 2022, Exhibit-2007, Filed on Sep. 13, 2022—Cited in IPR2022-00242, challenging U.S. Pat. No. 8,111,839.

Transcript of Deposition of Les Atlas, Ph.D., Aug. 18, 2022, Exhibit-2007, Filed on Sep. 13, 2022—Cited in IPR2022-00243, challenging U.S. Pat. No. 8,111,839.

Transcript of Deposition of Les Atlas, Ph.D., Exhibit-2016, Filed on Apr. 10, 2023—Cited in IPR2022-01106, challenging U.S. Pat. No. 11,039,259.

Transcript of Deposition of Nathaniel Polish, Ph.D., taken Sep. 29, 2022, Exhibit-2007, Filed on Oct. 19, 2022—Cited in IPR2022-00253, challenging U.S. Pat. No. 9,491,542.

Transcript of Deposition of Nathaniel Polish, Ph.D., taken Sep. 29, 2022, Exhibit-2007, Filed on Oct. 19, 2022—Cited in IPR2022-00281, challenging U.S. Pat. No. 9,270,244.

Transcript of Deposition of Richard M. Stern, Exhibit-2010, Filed on Mar. 23, 2023—Cited in IPR2022-01078, challenging U.S. Pat. No. 11,057,701.

Transcript of Deposition of Richard M. Stern, Ph.D., taken Oct. 27, 2022, Exhibit-2009, Filed on Nov. 8, 2022—Cited in IPR2022-00369, challenging U.S. Pat. No. 10,405,082.

Transcript of Deposition of Richard M. Stern, Ph.D., taken Oct. 27, 2022, Exhibit-2009, Filed on Nov. 8, 2022—Cited in IPR2022-00388, challenging U.S. Pat. No. 10,966,015.

Transcript of Deposition of Richard Stern, Ph.D., Exhibit-2010, Filed on Sep. 9, 2022—Cited in IPR2022-00282, challenging U.S. Pat. No. 8,315,400.

U.S. Appl. No. 09/653,869, Exhibit-1007, Filed on Dec. 20, 2021—Cited in IPR2022-00324, challenging U.S. Pat. No. 8,254,591.

U.S. Pat. No. 10,405,082, Exhibit-1001, Filed on Dec. 30, 2021—Cited in IPR2022-00369, challenging U.S. Pat. No. 10,405,082.

U.S. Appl. No. 61/778,737, Exhibit-1008, Filed on Dec. 21, 2021—Cited in IPR2022-00281, challenging U.S. Pat. No. 9,270,244.

U.S. Appl. No. 62/575,713, Exhibit-1006, Filed on Dec. 30, 2021—Cited in IPR2022-00369, challenging U.S. Pat. No. 10,405,082.

U.S. Appl. No. 62/575,713, Exhibit-1006, Filed on Jan. 4, 2022—Cited in IPR2022-00388, challenging U.S. Pat. No. 10,966,015.

Wikipedia, Apple headphones, Exhibit-2010, Filed on Sep. 13, 2022—Cited in IPR2022-00243, challenging U.S. Pat. No. 8,111,839.

Wikipedia, Microphone, Exhibit-2012, Filed on Sep. 13, 2022—Cited in IPR2022-00242, challenging U.S. Pat. No. 8,111,839.

Wikipedia, Microphone; Exhibit-2011, Filed on Sep. 9, 2022—Cited in IPR2022-00234, challenging U.S. Pat. No. 9,124,982.

Wiley Elec and Elecs Eng Dictionary (excerpts), Exhibit-2004, Filed on Mar. 21, 2022—Cited in IPR2022-00282, challenging U.S. Pat. No. 8,315,400.

Wiley Electrical and Electronics Engineering Dictionary (excerpt), Exhibit-2009, Filed on Oct. 7, 2022—Cited in IPR2022-01098, challenging U.S. Pat. No. 11,217,237.

*Samsung Electronics Co., Ltd., And Samsung Electronics, America, Inc.,* v. *Staton Techiya, LLC,* IPR2022-00282, Dec. 21, 2021.

*Samsung Electronics Co., Ltd., And Samsung Electronics, America, Inc.,* v. *Staton Techiya, LLC,* IPR2022-00242, Dec. 23, 2021.

*Samsung Electronics Co., Ltd., And Samsung Electronics, America, Inc.,* v. *Staton Techiya, LLC,* IPR2022-00243, Dec. 23, 2021.

*Samsung Electronics Co., Ltd., And Samsung Electronics, America, Inc.,* v. *Staton Techiya, LLC,* IPR2022-00234, Dec. 21, 2021.

*Samsung Electronics Co., Ltd., And Samsung Electronics, America, Inc.,* v. *Staton Techiya, LLC,* IPR2022-00253, Jan. 18, 2022.

(56) References Cited

OTHER PUBLICATIONS

*Samsung Electronics Co., Ltd., And Samsung Electronics, America, Inc.*, v. *Staton Techiya, LLC*, IPR2022-00324, Jan. 13, 2022.
*Samsung Electronics Co., Ltd., And Samsung Electronics, America, Inc.*, v. *Staton Techiya, LLC*, IPR2022-00281, Jan. 18, 2022.
*Samsung Electronics Co., Ltd., And Samsung Electronics, America, Inc.*, v. *Staton Techiya, LLC*, IPR2022-00302, Jan. 13, 2022.
*Samsung Electronics Co., Ltd., And Samsung Electronics, America, Inc.*, v. *Staton Techiya, LLC*, IPR2022-00369, Feb. 18, 2022.
*Samsung Electronics Co., Ltd., And Samsung Electronics, America, Inc.*, v. *Staton Techiya, LLC*, IPR2022-00388, Feb. 18, 2022.
*Samsung Electronics Co., Ltd., And Samsung Electronics, America, Inc.*, v. *Staton Techiya, LLC*, IPR2022-00410, Feb. 18, 2022.
*Samsung Electronics Co., Ltd., And Samsung Electronics, America, Inc.*, v. *Staton Techiya, LLC*, IPR2022-01078, Jun. 9, 2022.
*Samsung Electronics Co., Ltd., And Samsung Electronics, America, Inc.*, v. *Staton Techiya, LLC*, IPR2022-01099, Jun. 9, 2022.
*Samsung Electronics Co., Ltd., And Samsung Electronics, America, Inc.*, v. *Staton Techiya, LLC*, IPR2022-01106, Jun. 9, 2022.
*Samsung Electronics Co., Ltd., And Samsung Electronics, America, Inc.*, v. *Staton Techiya, LLC*, IPR2022-01098, Jun. 9, 2022.
*Samsung Electronics Co., Ltd., And Samsung Electronics, America, Inc.*, v. *Staton Techiya, LLC*, IPR2022-00559, Feb. 9, 2024.
U.S. Appl. No. 90/015,146, Samsung Electronics Co., Ltd. and Samsung Electronics, America, Inc., Request For Ex Parte Reexamination Of U.S. Pat. No. 10,979,836.
U.S. Appl. No. 90/019,169, Samsung Electronics Co., Ltd. and Samsung Electronics, America, Inc., Request For Ex Parte Reexamination Of U.S. Pat. No. 11,244,666.
Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 1A-1C for U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022.
Appendix 2A-2C for U.S. Pat. No. 8,254,591 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022.
Appendix 3A-3C for U.S. Pat. No. 8,315,400 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022.
Appendix 4A-4C for U.S. Pat. No. 9,124,982 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22- CV-00053-JRG-RSP), served May 18, 2022.
Appendix 5A-5C for U.S. Pat. No. 9,270,244 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 6A-6C for U.S. Pat. No. 9,491,542 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 7A-7C for U.S. Pat. No. 9,609,424 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 8A-8C for U.S. Pat. No. 10,405,082 to Samsung's Invalidity Contentions and P.R. 3-3 And 3-4 Disclosures for U.S.

Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 9A-9Cfor U.S. Pat. No. 8,111,839 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 10A-10C for U.S. Pat. No. 10,979,836 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 11A-11C for U.S. Pat. No. 11,039,259 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 12A-12C for U.S. Pat. No. 11,057,701 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 13A-13C for U.S. Pat. No. 11,217,237 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Appendix 14A-14C for Patent No. 11,244,666 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A1 (Nacre QuietPro) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A2 (Silynx QuietOps) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A3 (Motorola H5) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A4 (Jawbone Aliph) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A5 (Snooper) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A6 (NCH Swift) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served 18, 2022.
Ex. A8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served.
Ex. A9 to Samsung's Invalidity Contentions and P.R. 3-3 And 3-4 Disclosures for U.S. Pat. Nos. 8,111,839, 8,254,591, 8,315,400,

(56) References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.

Ex. A10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A11 (NaturalRecorder) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A32 (Olympus WS-320M) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. A35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B7 to Samsung's Invalidity Contentions and P.R. 3-3 And 3-4 Disclosures for U.S. Pat. Nos. 8,111,839, 8,254,591, 8,315,400, 9,124,982, 9,270,244, 9,609,424, 10,405,082, 10,966,015 (Case No. 2:22-CV-00053-JRG-RSP), served May 18, 2022.

Ex. B8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B9 to Samsung's Invalidity Contentions and P.R. 3-3 And 3-4 Disclosures for U.S. Pat. Nos. 8,111,839, 8,254,591, 8,315,400,

(56)           References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.

Ex. B10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. B19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. C15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served.

Ex. D6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served.

Ex. D7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D10 to Samsung's Invalidity Contentions and P.R. 3-3 And 3-4 Disclosures for U.S. Pat. Nos. 8,111,839, 8,254,591, 8,315,400,

(56)        References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.

Ex. D11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. D32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

936. Ex. E11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E12 to Samsung's Invalidity Contentions and P.R. 3-3 And 3-4 Disclosures for U.S. Pat. Nos. 8,111,839, 8,254,591, 8,315,400,

(56)                    References Cited

OTHER PUBLICATIONS 9,124,982, 9,270,244, 9,491,542, 9,609,424, 10,405,082, 10,966,015 (Case No. 2:22-CV-00053-JRG-RSP), served May 18, 2022.

Ex. E13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. E18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F4 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F5 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F9 (corrected) to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F15 to Samsung's Invalidity Contentions and P.R. 3-3 And 3-4 Disclosures for US Patent Nos. 8,111,839, 8,254,591, 8,315,400, 9,124,982, 9,270,244, 9,609,424, 10,405,082, 10,966,015 (Case No. 2:22-CV-00053-JRG-RSP), served May 18, 2022.

Ex. F16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. F18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. G7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56)  References Cited

OTHER PUBLICATIONS

Ex. G8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G31 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G32 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G33 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G34 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G35 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56)　　　　　References Cited

OTHER PUBLICATIONS

Ex. H8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. H20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. I18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J1 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J2 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J3 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J4 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J5 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J6 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J7 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J8 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. J9 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J10 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J11 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J12 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J13 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J14 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J15 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J16 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J17 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J18 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J19 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J20 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J21 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J22 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J23 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J24 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J25 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J26 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J27 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J28 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J29 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Ex. J30 to Samsung's Invalidity Contentions and P.R. 3-3 And 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K1 (Calhoun) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K2 (Cerra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K3 (Chen '353) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K4 (Comerford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K5 (Couper) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit (Emoto) to Samsung's Invalidity Contentions and P.R. 3-3 And 3-4 Disclosures for the U.S. Pat. Nos. 11,039,259, 11,057,701, 11,217,237, and 11,244,666 (Case No. 2:22-CV-00053-JRG-RSP), served Jul. 6, 2022.

Exhibit K7 (Zaykovskiy) to Samsung's Invalidity Contentions and P.R. 3-3 And 3-4. Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K8 (Hunter) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K9 (Jones) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K10 (Kelliher) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K11 (Kopra) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K12 (Lagassey '043) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit K13 (Lemelson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K14 (Pickering) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K15 (Schuler) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K16 (Soufflet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K17 (White) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K18 (BlueAnt V1) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K19 (LG Chocolate) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K20 (Midomi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K21 (Promptu) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K22 (Samsung SCH-a950) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K23 (W850) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K24 (Ears) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K25 (Motorola Pebl) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K26 (Silynx QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K27 (NACRE QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K28 (Shazam) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K29 (Vlingo) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit K30 (Yoon) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L1 (Alves 801) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L2 (Burnett 421) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L3 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L4 (Huang 798) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L5 (Jaber) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L6 (LG HBM-730) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L7 (Nokia BH-600) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L8 (Nokia BH-900) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L9 (Pedersen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L10 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L11 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L12 (Visser '958) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L13 (Zhang 099) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L14 (Byford) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L15 (Mejia '156) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit L16 (Yang '130) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M1 (Armstrong) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56)                    References Cited

OTHER PUBLICATIONS

Exhibit M2 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M3 (Dijsktra 972) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M4 (Hamacher 031) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M5 (Hietanen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M6 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M7 (Kondo 701) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M8 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M9 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M10 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M11 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M12 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M13 (Rasmussen 245) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M14 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M15 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M16 (Zurek 379) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M17 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M18 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit M19 (Nacre QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M20 (SenSay) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M21 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M22 (Darbut) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M23 (Ramakrishnan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N1 (Platz 077) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N2 (Kvaløy) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N3 (Inanaga) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N4 (Rosenberg) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N5 (Visser 958) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N6 (Terlizzi) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N7 (Light) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N8 (Boersma) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N9 (McCune) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N10 (Bose) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N11 (Emoto) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N12 (Dijkstra 243) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N13 (Cohen 908) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56)     References Cited

OTHER PUBLICATIONS

Exhibit N14 (Rast) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N15 (Bothra 629) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N16 (Victorian 625) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N17 (Engle) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N18 (Svean 359) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N19 (Hotvet) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N20 (Killion 056) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N21 (Bothra 087) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N22 (Melanson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N23 (Andrea) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N24 (Hohman) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N25 (Bergeron) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N26 (Frank) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N27 (Darbut 423) to Samsung's Invalidity Contentions and P.R. 3-3 And 3-Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N28 (QuietPro) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N29 (QuietOps) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N30 (Jawbone) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N31 (EarSet 2) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N32 (Etymotic ER-6) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N33 (Zen) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N34 (Motorola H605) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N35 (Peltor Lite-Com II) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N36 (Discovery 655) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N37 (MX200 Series) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N38 (Sony S700) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N39 (H5 Miniblue) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N40 (3D Active Ambient IEM) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N41 (Armstrong 422) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N42 (Hohn) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N43 (Mejia 228) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N44 (Nemirovski 368) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N45 (Thomasson) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N46 (Zurek 003) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N47 (Kurcan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

Exhibit N48 (Rafaely) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56)  References Cited

OTHER PUBLICATIONS

Exhibit N49 (Vaidyanathan) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N50 (Westerlund) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N51 (Zhang) to Samsung's Invalidity Contentions and P.R. 3-3 And 3-4 Disclosures for U.S. Pat. Nos. 11,039,259, 11,057,701, 11,217,237, and 11,244,666 (Case No. 2:22-CV-00053-JRG-RSP), served Jul. 6, 2022.
3M/Acaro Technologies' E-A-RFitTM Validation System ("E-A-RFit"), Sep. 10, 2015 WayBack Machine capture of 3M's website depicts a brochure describing the E-A-RFit and "Individual Fit Testing Using F-Mire." https://web.archive.org/web/20150910084252/http:/multimedia.3m.com/mws/media/10622 67O/earfit-dual-ear-brochure-us.pdf?fn=EARfit%20Dual-Ear%20Brochure%20US.pdf (SAM-TECH_00052333-SAM-TECH_00052336; SAM-TECH_00052339-SAM-TECH_00052339).
3M/Acaro Technologies' E-A-RFitTM Validation System ("E-A-RFit"), 2010 brochure from 3M's website describes the E-A-RFit and identifies model 393-1000 as an available mode. https://multimedia.3m.com/mws/media/62914 9O/3m-e-a-rfit-validation-system-brochure.pdf (SAM-TECH_00052186):.
3M/Aearo Technologies' E-A-RFitTM Validation System ("E-A-RFit"), Abstract titled "New from ISEA member 3M Company (www.3m.com] is the E-A-Rfit Validation System a quantitative hearing protector fittest", published in Jul. 2012. New from ISEA member 3M Company (www.3m.com] is the E-A-Rfit Validation System a quantitative hearing protector fittest, EHS today, vol. 5, Issue 7, ISSN 1945-9599, Gale Group Trade & Industry Database (Jul. 2012), available at https://dialog.proquest.com/professional/docview/1095272736?accountid=154502 (SAM-TECH_00052203);.
3M/Aearo Technologies' E-A-RFitTM Validation System ("E-A-RFit"), Apr. 24, 2007 article published by E.H. Berger from Aearo Technologies discusses E-A-RFit and notes that "[t]he E-A-RFitTM Validation System is a quick and accurate method of estimating real-ear attenuation for a given fitting of a pair of earplugs"and "has been designed and built to be an integral part of a comprehensive workplace hearing conservation program." See E.H. Berger, Recommended Applications for the E-A- RFitTM Validation System in a Workplace Hearing Conservation Program, Aearo Company (2007) (SAM-TECH_00056087 - Sam- TECH_0005609).
3M/Aearo Technologies' E-A-RFitTM Validation System ("E-A-RFit"), At least by Feb. 9, 2007, A 2010 brochure for the E-A-RFit describes the validation system and lists Model 393-1000 as an available product. https://multimedia.3m.com/mws/media/67382 80/earfit-brochure.pdf (SAM-TECH_00052179-SAM-TECH_00052184);.
Methods Of Developing And Validating A Field—MIRE Approach For Measuring Hearing Protector Attenuation, Berger, Elliott & Voix, Jérémie & Kieper, R., Feb. 9, 2007, in connection with 3M/Aearo Technologies' E-A-RFitTM Validation System ("E-A-RFit"); This article was originally prepared for the 32nd Annual Conference of the National Hearing Conservation Association, held on Feb. 15-17, 2007, in Savannah, Georgia, and published in Spectrum, vol. 24, Suppl. 1.
3M/Acaro Technologies' E-A-RFitTM Validation System ("E-A-RFit"), Mar. 16, 2016 WayBack Machine capture of 3M's website lists the E-A-RFit for purchase. https://web.archive.org/web/20160316180537/http://www.3m.com/3M/en_US/company-us/all-3m-products/~/All-3M-Products/Personal-Protective- Equipment/Hearing- Protection/Safety/Worker- Health-Safety/E-A-R-Fit-Validation- Tools/?N=5002385+8709322+8711017+8711405+8720 539+8720546+8720770+329 4857497&rt=r3 (SAM-TECH_00052201);.
3M/Acaro Technologies' E-A-RFitTM Validation System ("E-A-RFit"), Mar. 20, 2016 WayBack Machine capture of 3M's website describes the Validation System and protection that the system offers. https://web.archive.org/web/20160320080156/http:/www.3m.com/3M/en_US/company-us/all-3m-products/~/All-3M-Products/Personal-Protective-Equipment/Hearing-Protection/Safety/Worker-Health- Safety/?N=5002385+8709322+8711017+871 1405+8720539+8720546+3294857497&rt=r3 (SAM-TECH_00052278; SAM-TECH_00052292);.
3M/Aearo Technologies' E-A-RFitTM Validation System ("E-A-RFit"), Sep. 4, 2015 WayBack Machine capture of 3M's website contains an image of the E-A-RFit and states "[t]he 3MTM E-A-Rfit™M Dual Ear Validation System makes it easy to measure every employee's unique level of protection and takes the guesswork out of managing compliance in your hearing conservation program." https://web.archive.org/web/20150904132810/http:/solutions.3m.com/wps/portal/3M/en_US/3M-PPE-Safety-Solutions/Personal-Protective-Equipment/safety-management/safety-training/hearing- pro-tection-fit- testing/?WT.mc_id=www.3m.com/EARfitDe mo/ (SAM-TECH_00052276; Sam- Tech _; SAM-TECH_00052274);.
A binaural processor for missing data speech recognition in the presence of noise and small-room reverberation, Kalle Palomäki, Guy Brown & Deliang Wang, Speech Communication, 43, 361-378.
A compact multi-sensor headset for hands-free communication, Liu, Zicheng & Seltzer, Michael & Acero, A. & Tashev, Ivan & Zhang, Zhengyou & Sinclair, Michael, IEEE Workshop on Applications of Signal Processing to Audio and Acoustics, 138 - 141. 10.1109/ASPAA.2005.1540188.
A Dual - Mode Human - Machine Interface for Robotic Control Based on Acoustic Sensitivity of the Aural Cavity - Ravi Vaidyanathan, et al., Feb. 2006.
A Local Active Noise Control System for Locomotive Drivers, internoise 2000, the 29th International Congress and Exhibition on Noise Control Enginerring, Nielsen, Saebo, Ottesen, Reinen, Sorsdal, Aug. 2000.
A MFCC-based CELP speech coder for server-based speech recognition in network environments, Yoon, Jae Sam, Gil Ho Lee, and Hong Kook Kim, Ieice Transactions on Fundamentals of Electronics, Communications and Computer Sciences 90.3, 626-632, Mar. 2007.
A Modified Coherence Based Method for Dual Microphone Speech Enhancement, M. Rahmani, et al., Signal Processing and Communications, 2007.
A New Two—Sensor Active Noise Cancellation Algorithm, K.C. Zangi, 1993 IEEE International Conference on Acoustics, Speech, and Signal Processing, Minneapolis, Mn, USA, 1993, pp. 351-354 vol.2, doi: 10.
A Pattern Recognition Approach to Voiced-Unvoiced-Silence Classification with Applications to Speech Recognition, B. Atal and L. Rabiner, IEEE Transactions on Acoustics, Speech, and Signal Processing, vol. 24, No. 3, pp. 201-212, Jun. 1976.
Active Noise Attenuation Using LQG/LTR Control, Garcia, José & Bortoloto, Edson & Ribeiro, Jean & Garcia, Eletrônica de Potência. 9. 23-27, Eletrônica de Potência. 9. 23-27. 10.18618/REP.2005.2. 023027, Nov. 2004.
Active Noise Cancellation for Headphones Used in High Noise Environments Using Conventional Analog Circuitry, Mark C. Flohr, May 1, 1987.
Active Noise Control System for Headphone Applications Sen M. Kuo, et al. 2006.
Active Noise Control: Low - Frequency Techniques for Suppressing Acoustic Noise Leap Forward with Signal Processing, S.J. Elliott and P.A. Nelson, Oct. 1993.
Active Noise Reduction Headphone Measurement: Comparison Of Physical And Psychophysical Protocols And Effects Of Microphone Placement, PERALA, Apr. 10, 2006.
Active noise Reduction in an ear terminal, OTTESEN, The Journal of the Acoustical Society of America, vol. 105, Issue 2, Feb. 1999.
Adaptive Feedback Active Noise Control Headset: Implementation, Evaluation, and its Extensions, Woon S. Gan, et al. 2005.
Adaptive Filtering in the Frequency Domain, M. Dentino, J. Mccool & B. Widrow, Proceedings of the IEEE, vol. 66, No. 12, pp. 1658-1659, Dec. 1978.

(56) References Cited

OTHER PUBLICATIONS

Adaptive Noise Cancellation in a Multimicrophone System for Distortion Product Otoacoustic Emission Acquisition, Rafael E. Delgado, et al., 2000.

Adaptive Noise Cancelling In Headsets, Per Rubak, Henrik D. Green & Lars G. Johansen, Proceedings of IEEE Nordic Signal Processing Symposium, NORSIG'96, Sep. 24-27, 1996, Espoo, Finland.

Adaptive noise cancelling: Principles and applications, B. Widrow, et al., Proceedings of the IEEE, vol. 63, No. 12, pp. 1692-1716, Dec. 1975.

Air- and Bone-Conductive Integrated Microphones for Robust Speech Detection and Enhancement, Yanli Zheng, et al., 2003 IEEE Workshop on Automatic Speech Recognition and Understanding.

An Integrated Audio And Active Noise Control Headsets, W. S. Gan & S. M. Kuo, IEEE Transactions on Consumer Electronics, vol. 48, No. 2, pp. 242-247, May 2002.

Apple's AirPods Pro ("AirPods Pro"), Article on Apple's website published Apr. 15, 2020 mentions the AirPods Pro has an Ear Tip Fit test available. https://support.apple.com/en-US/HT210633 (SAM-TECH_00072120 - Sam- TECH_00072123).

Apple's AirPods Pro ("AirPods Pro"), article published by Dan Seifert on Mar. 29, 2019 reviews the AirPods Pro and states Apple is selling the second-gen AirPods in two ways: with the new wireless charging case for $199 or with the standard case for the same $159 as before. https://www.theverge.com/2019/3/29/182860 12/apple-airpods-2-new-2nd-gen-review-price-specs-features; (SAM-TECH_00057262-SAM-TECH_00057275).

Apple's AirPods Pro ("AirPods Pro"), Dec. 21, 2019 WayBack Machine capture of Apple's website displays an image of the AirPods Pro and states "[u]se the Ear Tip Fit Test to create the optimal listening experience—you'll get the right tip size for your ears, and the best seal for noise cancellation." https://web.archive.org/web/20191221170719/ https://www.apple.com/airpods-pro/ (SAM-TECH_00054447; SAM-TECH_00054134).

Apple's AirPods Pro ("AirPods Pro"), Nov. 2, 2019 article by Karisa Bell published on mashable.com discusses whether Apple's AirPods Pro are compatible with Androids. https://mashable.com/article/do-airpods-pro- work-with-android. (SAM-TECH_00052378 - SAM-TECH_00052390).

Nov. 3, 2019 article published by Imran Hussain discusses how to use the ear tip fit test with the AirPods Pro and an iOS device such as the iphone 11 for the best fit. https://www.esquire.com/lifestyle/a29612084/apple-airpods-pro-active-noise-cancellation-review/ (SAM-TECH_00052413 - SAM-TECH_00052424).

Oct. 20, 2019 article by Tim Hardwick discussing how to perform an ear tip fit test using Apple's AirPods Pro with Apple's iPhone 11. https://www.macrumors.com/how-to/perform-ear-tip-fit-test-airpods-pro/; (SAM-TECH_00052357-SAM-TECH_00052370);.

Apple's AirPods Pro ("AirPods Pro"), Oct. 29, 2019 artcile by Sarah Rense also discusses testing out the AirPods Pro with active-noise cancellation. https://www.esquire.com/lifestyle/a29612084/apple-airpods-pro-active-noise-cancellation-review/ (SAM-TECH_00058067-SAM-TECH_00058080);.

Apple's AirPods Pro ("AirPods Pro"), The specs of the AirPods Pro can be found here https://web.archive.org/web/20191224065355/ https://www.apple.com/airpods-pro/specs/ (SAM-TECH_00052343-SAM-TECH_00052352; SAM-TECH_00053159);.

Apple's iPhone 11 (iPhone 11), Oct. 11, 2019 article published by Jake Peterson discusses the eartip fit test using AirPods Pro and an iPhone running iOS 13.2. https://ios.gadgethacks.com/how-to/make-your-airpods-pro-fit-better-by-testing-rubber-tips-0210500/ (SAM-TECH_00056564-SAM-TECH_00056569);.

Apple's iPhone 11 (iPhone 11), Press release from Apple's website dated Sep. 10, 2019 states "Apple introduces dual camera iPhone 11" and that "Customers in the US, Puerto Rico, the US Virgin Islands and more than 30 other countries and regions will be able to pre-order iPhone 11 beginning at 5 a.m. PDT on Friday, Sep. 13 with availability beginning Friday, Sep. 20." https://www.apple.com/ newsroom/2019/09/apple-introduces-dual-camera-iphone-11/ (SAM-TECH_00056571-SAM-TECH_00056588);.

Apple's iPhone 11 (iPhone 11), Sep. 15, 2019 WayBack Machine capture of Apple's website has an image of the iphone 11 and lists it for sale on the website. https://web.archive.org/web/20190915061032 /https://www.apple.com/shop/buy-iphone/iphone-11; (SAM-TECH_00055106-SAM-TECH_00055123);.

Apple's iPhone 11 (iPhone 11), WayBack Machine capture from Sep. 16, 2019 of Apple's website, displays the iPhone and states "Available 9.20." https://web.archive.org/web/20190916102733/ https://www.apple.com/iphone-11/specs/. (SAM-TECH_00056907).

Audiometric Ear Canal Probe with Active Ambient Noise Control, B. Rafaely & M. Furst, IEEE Transactions on Speech and Audio Processing, vol. 4, No. 3, pp. 224-230, May 1996.

Bang and Olufsen EarSet 2 Bluetooth Headset, At least by 2006, https://www.beoworld.org/prod_details.asp?pid=733 (SAM-TECH_00094798).

Bang and Olufsen EarSet 2 Bluetooth Headset, At least by 2006, https://www.dexigner.com/news/9935 (SAM-TECH_00094865).

Brian Hobbs et al., Wideband Hearing, Intelligibility, and Sound Protection, Jan. 10, 2008 Final Report AFRL-RH-WP-TR-2009-0031 at 2 (SAM-TECH_00053002-116).

Build These Noise-Cancelling Headphones, Jules Ryckebusch, 1997.

Combined feedback-feedforward active noise-reducing headset—The effect of the acoustics on broadband performance, Boaz Rafaely & Matthew Jones, J. Acoust. Soc. Am. Sep. 1, 2002; 112 (3): 981-989.

Dec. 25, 2005 WayBack Machine Capture of Maico's website has an image of the Maico MI26 and discusses the products features. https://web.archive.org/web/20051225200404/http:/www.maico-diagnostics.com/eprise/main/Maico/Products/ Files/MI26/SpecSheet.MI24-26.NEW.pdf (SAM-TECH_00051161-SAM- TECH_00051162).

Direct filtering for air- and bone-conductive microphones, Zicheng Liu, Zhengyou Zhang, A. Acero, J. Droppo and Xuedong Huang , IEEE 6th Workshop on Multimedia Signal Processing, 2004., Siena, Italy, 2004, pp. 363-366.

DSP Software Development Techniques for Embedded and Real-Time Systems, Robert Oshana, 2006.

E-3 In-Flight Acoustic Exposure Studies and Mitigation Via Active Noise Reduction Headset, Frank Mobley, John Allen Hall, & Donald Yeager, Dec. 2002.

Efficient Tracking of the Cross-Correlation Coefficient, Aarts, IEEE Transactions on Speech and Audio Processing, vol. 10, No. 6, Sep. 2002.

Etymotic ER-6 Earphones, At least by Feb. 7, 2005, https://www.cnet.com/reviews/etymoti c-er-6-review/ (SAM-TECH_00095121).

Etymotic ER-6 Earphones, At least by Feb. 7, 2005, https://www.etymotic.com/ephp/er6i-ts.aspx (SAM-TECH_00095178).

Etymotic's ER-33 Occlusion Effect Meter ("ER-33"), Apr. 9, 2001 WayBack Machine capture of Etymotic's website contains an image of the ER-33 and states that "[t]he ER-33 Occlusion Effect Meter quickly quantifies the occlusion effect and earmold leakage" and was on sale for $350.00. https://web.archive.org/web/20010404224259/ https://www.etymotic.com/ (SAM-TECH_00054976);.

Etymotic's ER-33 Occlusion Effect Meter ("ER-33"), Aug. 2003 article by H. Gustav Mueller in the Hearing Journal, Mueller describes the ER-33 as a product manufactured by Etymotic that "costs No. more than a few bottles of good wine." See H. Gustav Mueller, There's less talking in barrels, but the occlusion effect is still with US, 56 Hearing J. 10, 14 (2003) (SAM-TECH_00054761-SAM-TECH_00054764);.

Etymotic's ER-33 Occlusion Effect Meter ("ER-33"), Dec. 5, 2004 article submitted by Wayne J. Staab to The Hearing Review, discusses the ER-33 and notes "[t]he occlusion effect was measured with the ER-33 Occlusion Effect meter (Figure 5) using a probe tube extending 2 mm beyond the receiver tip. The ER-33 is a hand- held device that measures both the magnitude of the occlusion effect and the leakage around an earmold." https://hearingreview.com/practice-building/practice-management/measuring-the-occlusion-effect-in-a-deep-fitting-hearing-device (SAM-TECH_00060339-SAM-TECH_00060350);.

(56) References Cited

OTHER PUBLICATIONS

Etymotic's ER-33 Occlusion Effect Meter ("ER-33"), Mar. 3, 2005 capture of Etymotic's website contains a description of the ER-33 which includes a sale price for $350.00. https://web.archive.org/web/20050303170952/http://www.etymotic.com/pro/er33.asp (SAM-TECH_00054986);.

Etymotic's ER-33 Occlusion Effect Meter ("ER-33"), Mar. 4, 2005 WayBack Machine capture of Etymotic's website contains a user manual for the ER-33 which was on sale at that time. https://web.archive.org/web/20050304030715/http://www.etymotic.com/pdf/er33-oem-usermanual.pdf (SAM-TECH_00055001; SAM-TECH_00060165).

Excerpts from Discrete-Time Signal Processing, Third Edition, Alan V. Oppenheim & Ronald W. Schafer, Aug. 18, 2009.

Experimentation To Address Appropriate Test Techniques For Measuring The Attenuation Provided By Double ANR Hearing Protectors, Susan E. Mercy, Christopher Tubb and Soo H. James, New Directions for Improving Audio Effectiveness (pp. 18-1-18-14). Meeting Proceedings RTO-MP-HFM-123, Paper 18. Neuilly-sur-seine, France: RTO.

Fit-Testing of Hearing Protection, WITT, The Hearing Review.

Gennum Zen Digital Wireless Headset ("Zen"), At least by 2004, CNET Article—Gennum Zen Bluetooth Headset Review (SAM-TECH_00098419).

Gennum Zen Digital Wireless Headset ("Zen"), At least by 2004, Gennum Zen User Manual (SAM-TECH_00098432).

Gennum Zen Digital Wireless Headset ("Zen"), At least by 2004, Globe and Mail Article—Gennum Z-E- N Headset for Bluetooth (SAM-TECH_00098485).

Huseyin Dogan, Trym Holter, & Ingrid Svagard, Trial of a special end user terminal that aids field operators during emergency rescue operations, Proceedings of the 3rd International Iscram China Workshop, Harbin, China, at 4 (Aug. 2008) discusses the PARAT as well (SAM-TECH_00051920-SAM-TECH_00051931).

In-Ear Microphone Speech Data Recognition using HMMs, R. S. Kurcan, M. P. Fargues and R. Vaidyanathan, 2006 IEEE 12th Digital Signal Processing Workshop & 4th IEEE Signal Processing Education Workshop, Teton National Park, WY, USA, 2006.

In-Ear Microphone Speech Data Segmentation and Recognition using Neural Networks, G. Bulbuller, Monique Fargues & Ravi Vaidyanathan, IEEE 12th Digital Signal Processing Workshop and 4th IEEE Signal Processing Education Workshop, 2006.

In-Ear Microphone Techniques For Severe Noise Situations, N. Westerlund, M. Dahl, I. Claesson, Nov. 2005.

Interaction Techniques Using Prosodic Features of Speech and Audio Localization, Alex Olwal & Steven Feiner, Jan. 5, 2011.

Isolated Word Recognition from In-Ear Microphone Data Using Hidden Markov Models (HMM), Remzi Serdar Kurcan, Mar. 2006.

Jawbone Aliph, At least by Sep. 9, 2004, https://www.capecodtimes.com/story/news/20 06/12/24/new-earphones-let-you-go/50845129007 (SAM-TECH_00062054).

Jawbone Aliph, At least by Sep. 9, 2004, https://www.cnet.com/reviews/aliph-jawbone-bluetooth-headset-review/ (SAM-TECH_00060121).

Jawbone Aliph, At least by Sep. 9, 2004, https://www.wired.com/2004/09/military-headset-reaches-masses (SAM-TECH_00062036).

Jawbone Aliph, At least by Sep. 9, 2004, Jawbone User Manual (SAM-TECH_00061992).

Learning-Based Three Dimensional Sound Localization Using a Compact Non-Coplanar Array of Microphones, Kamen Y. Guentchev and John J. Weng, Aaai Technical Report SS-98-02, 1998.

Maico MI26 Tymp/audiometer combo ("Maico MI26"), Aug. 12, 2004 WayBack Machine Capture of Maico's website has an image of the Maico MI26 and lists the Maico MI26 as a product available for purchase. https://web.archive.org/web/20040422090329/http://www.maico-diagnostics.com:80/eprise/main/Maico/US_en/ProductCategories/LST01_Tympanometers (SAM-TECH_00060329-SAM-TECH_00060331).

Mar. 17, 2006 Wayback Machine capture of Maico's website has a user manual available for the Maico MI26 https://web.archive.org/web/20060317092410/http://www.maico-diagnostics.com/eprise/main/Maico/Products/Files/MI26/1162-0322REVD.pdf (SAM-Tech_00051168-SAM-TECH_00051215).

Mar. 17, 2006 WayBack Machine Capture of Maico's website discusses frequently asked questions about the Maico MI26 andis' features. https://web.archive.org/web/20060317092109/ http://www.maico-diagnostics.com/eprise/main/Maico/Products/Files/MI24/FAQ.MI24-26.pdf (SAM-Tech_00051250-SAM-TECH_00051251).

Methods of measuring the attenuation of hearing protection devices, E H Berger, The Journal of the Acoustical Society of America vol. 79,6 (1986).

Microphone Array for Headset with Spatial Noise Suppressor, Ivan Tashev, Michael Seltzer & Alex Acero, 2005.

Microphone Array Processing for Robust Speech Recognition, Michael L. Seltzer, Jul. 2003.

Motorola H5 Miniblue Bluetooth Headset, Jan. 14, 2005, https://newatlas.com/ces-2006-bluetooth-innovations-abound-inner-ear-headset-bluetooth-keyboard-and-wireless-ipod-companion/4977/ (SAM-TECH_00060368) (Motorola H5 Miniblue Bluetooth Headset).

Motorola H5 Miniblue Bluetooth Headset, Jan. 14, 2005, https://www.cnet.com/tech/mobile/motorola-h5-miniblue-bluetooth-headset/ (SAM-TECH_00060424) (Motorola H5 Miniblue Bluetooth Headset).

Motorola H5 Miniblue Bluetooth Headset, Jan. 14, 2005, https://www.engadget.com/2006-01-04-motorolas-h5-miniblue-bluetooth-headset.html (SAM-TECH_00060628).

Motorola H5 Miniblue Headset ("Miniblue"), Jan. 2006, Motorola H9 Bluetooth Headset User Manual (SAM-TECH_00060509-14).

Motorola H605, At least by 2006, CNET Article—Motorola H605 Bluetooth Headset Review (SAM-TECH_00098639).

Motorola H605, At least by 2006, Motorola H605 User Manual (SAM-TECH_00098719).

Motorola H605, At least by 2006, PhoneArena Article—Motorola H605 Review (SAM-TECH_00098743).

Motorola Miniblue Press Release (https://web.archive.org/web/20060212115000/http://www.motorola.com/motoinfo/product/de tails/0,,133,00.html) (SAM-TECH_00056060);.

Motorola's Astro XTS 5000 Digital Portable Radio ("Motorola XTS 5000"), At least by Jun. 2002, Motorola's Detailed Service Manuel has a release date in 2003. See Detailed Service Manuel for Astro XTS 5000 VHF/UHF Range 1/Range 2/700-800 MHZ, Digital Portable Radios (2003) (SAM-TECH_00051382-SAM-TECH_00051711);.

Motorola's Astro XTS 5000 Digital Portable Radio ("Motorola XTS 5000"), Jun. 14, WayBack Machine capture of Motorola Inc.'s website contains an image of the Motorola and states that "[t]he top of the line XTS 5000 portable radio is ready and equipped to meet the needs of demanding environments" and that it is "Motorola's newest maximum performance two-way radio." xts5000.shtml (SAM-TECH_00051718).

Motorola's XTS 2500 Digital Portable Radio ("Motorola XTS 2500"), Motorola XTS 2500's Basic Service Manual dated 2002-2003, see XTS 2500 XTS 1500 MT 1500 700-800 MHz Digital Portable Radios, Basic Service Manual at 70 (SAM_00051287-SAM-TECH_00051374).

Motorola's XTS 2500 Digital Portable Radio ("Motorola XTS 2500"), Nov. 9, 2001, WayBack Machine capture of Motorola's website contains an image of the XTS 2500 and states that "[t]he XTS 2500 portable radio is Motorola's high- performance, small-sized, digital two-way radio." (SAM-TECH_00051258).

Multi-Microphone Correlation-Based Processing for Robust Automatic Speech Recognition, Thomas M. Sullivan, Department of Electrical and Computer Engineering Carnegie Mellon University.

Multi-Microphone Signal Acquisition for Speech Recognition Systems, Kevin Fink, Ee 586 - Speech Recognition Systems, Dec. 16, 1993.

Multi-sensory microphones for robust speech detection, enhancement and recognition, Zhengyou Zhang, Zicheng Liu, M. Sinclair, A. Acero, L. Deng, J. Droppo, Xuedong Huang, Yanli Zheng, 2004 IEEE International Conference on Acoustics, Speech, and Signal Processing 3 (2004).

(56) References Cited

OTHER PUBLICATIONS

NACRE QuietPro, In a Mar. 7, 2013 presentation by Blake Martin of Honeywell Safety Products to the Alberta Industrial Fire Protection Association, Mr. Martin identifies "2005" as the "First commercial success for Quietpro." (SAM-TECH_00054652).

NACRE QuietPro, In Aug. 2006, Nacre won U.S. Government Contract No. W912DQ-06-D-0037 to supply the NACRE QuietPro to the U.S. military. U.S. Government Contract No. W912DQ-06-D-0037 (SAM-TECH_00055735).

NACRE QuietPro, In proceedings before the U.S. Trademark Trial and Appeal Board, Nacre stated that it "has used in commerce with the United States, long since prior to Apr. 28, 2006, the registered trademark QUIETPRO on one or more of headphones, earphones . . . . " *Nacre AS* v. *Silynx Communications, Inc.*, Sep. 4, 2007 Notice of Opposition. (SAM-TECH_00054696).

NACRE QuietPro, Mar. 9, 2005, Honeywell Quietpro QP100ex Mar. 2013 presentation (SAM-TECH_00063985);.

NACRE QuietPro, Mar. 9, 2005, IEEE Explore Article (SAMTECH_00063687).

NACRE QuietPro, Mar. 9, 2005, NACRE QuietPro User Manual v2.0 (SAMTECH_00055181).

NACRE QuietPro, Mar. 9, 2005, New Scientist Article (SAMTECH_00064068).

NACRE QuietPro, Mar. 9, 2005, SoldierMod Article (SAM-TECH_00065729).

NACRE QuietPro, Mar. 9, 2005, Article posted at: https://www.tu.no/artikler/quietproverner-og-forsterker-horselen/261960 (SAM-TECH_00097600).

NACRE QuietPro, Mar. 9, 2005, WayBack Machine capture of Nacre's website contains an image of the NACRE QuietPro and states that "Nacre has secured MNOK 27,5 from a consortium led by Ferd Venture" and that "[m]ost of the money will be spent to boost efforts within sales and marketing of QUIETPRO in the global military market.".

Nacre's PARAT earplug ("Parat"), 1999 article published by one of the PARAT's designers Georg E. Ottensen, discusses the PARAT system and states, "[a]n active ear terminal is beeing designed at SEVTEF Telecom and informatics. The acronym of the consept is PARAT—Personal Active Radio/Audio Terminal." Georg E. Ottesen, Active noise reduction in an ear terminal, The Journal of the Acoustical Society of America 105, 1300 (1999); https://doi.org/10.1121/1.424828, SINTEF Telecom and Informatics, N-7465 (SAM-TECH_00051952-SAM-TECH_00051955);.

Nacre's PARAT earplug ("Parat"), Jan. 2004 publication by Fredrik Vraalsen et al., describes how "[p]articular attention has been given to voice interaction in noisy industrial scenarios, utilising the PARAT earplug." Fredrik Vraalsen, Trym Holter, Ingrid Storruste Svagard, and Oyvind Kvennas, A Multimodal Context Aware Mobile Maintenance Terminal For Noisy Environments, SINTEF ICT, N-7465 Trondheim, Norway, 79, 79 (Jan. 2004) (SAM-TECH_00051938-SAM-TECH_00051951);.

Noise attenuation and proper insertion of earplugs into ear canals, Markku Toivonen, Rauno Pääkkönen, Seppo Savolainen, Kyösti Lehtomäki, The Annals of occupational hygiene, vol. 46,6 (2002): 527-530.

Oct. 29, 2019 on BusinessToday.in states the AirPods Pro require Apple devices running iOS 13.2 or later, iPadOS 13.2 or later, watchOS 6.1 or later, tvOS 13.2 or later, or macOS Catalina 10.15.1 or later. https://www.businesstoday.in/technology/lau nch/story/apple-airpods-pro-with-noise-cancellation-launched-check-out-price-in-india features-235269-2019-10-29 (SAM-TECH_00061346-SAM-TECH_00061349);.

Oct. 31, 2019 article published by Charlie Sorrel discusses the Ear tip fit test for the AirPods Pro in the iPhone settings. https://www.cultofmac.com/662548/airpods-pro-ear-tip-fit-test/; (SAM-TECH_00056870-SAM-TECH_00056881);.

Olympus WS-320M, At least by Nov. 25, 2005 (Olympus WS-320M) https://web.archive.org/web/20051125000137mp_, http://www.olympusamerica.com/cpg_se ction/cpg_vr_digitalmusic.asp (SAM-TECH_00051760).

Olympus WS-320M, At least by Nov. 25, 2005 (Olympus WS-320M) https://web.archive.org/web/20060314095402/, http://www.olympusamerica.com/cpg_sectio n/product.asp?product=1195&fl=2 (SAM-TECH_00051767; SAM-TECH_00051753).

Olympus WS-320M, At least by Nov. 25, 2005 Olympus WS-320M Instruction Manual (SAM-TECH_00051833).

Optimal Feedback Control Formulation of the Active Noise Cancellation Problem: Pointwise and Distributed, Kambiz C. Zangi, RLE Technical Report No. 583, Research Laboratory of Electronics Massachusetts Institute of Technology, May 1994.

Peltor Lite-Com II, At least by 1999, Peltor Lite-Com II Manual (SAM-TECH_00099254).

Peltor Lite-Com II, At least by 1999, Peltor Lite-Com II Brochure (SAM-TECH_00099203).

Performance of dual microphone in-the-ear hearing aids, Michael Valente, Gerald Schuchmant, Lisa G. Potts & Lucille B. Beck, Journal of the American Academy of Audiology, 2000.

Plantronics Discovery 655, At least by 2006, CNET Article—Plantronics Discovery 655 Bluetooth Headset Review (SAM-TECH_00099287).

Plantronics Discovery 655, At least by 2006, Plantronics Discovery 655 Brochure (SAM-TECH_00099296).

Plantronics Discovery 655, At least by 2006, Plantronics Discovery 655 User Guide (SAM-TECH_00099344).

Plantronics Discovery 655, At least by 2006, Silicon Poip Culture Article—Plantronics Discovery 655 (SAM-TECH_00099387).

Plantronics MX200, At least by 2006, Plantronics MX200 Brochure (SAM-TECH_00099419).

Plantronics MX200, At least by 2006, Plantronics MX200 User Guide (SAM-TECH_00099435).

Plantronics MX200, At least by 2006, Plantronics MX250 User Guide (SAM-TECH_00099461).

PocketLint Article—Zen Gennum Bluetooth Headset (SAM-TECH_00098490).

Preferred methods for measuring hearing protector attenuation, Elliott Berger, International Congress on Noise Control Engineering 2005, INTERNOISE 2005.

Products of Interest, Project Muse, Computer Music Journal, vol. 30, No. 3, Fall 2006.

Reducing the Negative Effects of Ear-Canal Occlusion, Samuel S. Job, Department of Electrical and Computer Engineering Brigham Young University, 2002.

Research in Motion's BlackBerry 7520 ("BlackBerry"), At least by 2004, Blackberry 7520 Wireles Handheld Model No. RAL11IN, Version 4.1 User Guide, last modified Mar. 6, 2006 (SAM-TECH_00054461-SAM-TECH_00054618);.

Research in Motion's BlackBerry 7520 ("BlackBerry"), Jun. 28, 2006 WayBack Machine capture of the BlackBerry lists it for sale and describes the Blackberry as a "strong addition to the product line-up." https://web.archive.org/web/20060628035351/http://www.blackberry-7520.com (SAM-TECH_00054619; SAM-TECH_00054624; SAM-TECH_00054622);.

Research in Motion's BlackBerry 7520 ("BlackBerry"), At least by 2004, BlackBerry Wireless Handheld Getting Started Guide (SAM-TECH_00228841).

Research in Motion's BlackBerry 7520 ("BlackBerry"), Nextel Services Guide for the Blackberry is dated the year 2004; (SAM-TECH_00226708).

SeboTek Hearing Systems' PAC (Post Auricular Canal) Instrument ("Sebotek"), Mar. 19, 2003 WayBack Machine capture of SeboTek's website contains a description of the PAC, which notes that "[t]he PAC is an exciting new hearing system by SeboTek that is significantly different from traditional hearing aids. If offers deep canal fitting, superior acoustics, incredible discreetness, and unmatched comfort." https://web.archive.org/web/20030319140205 /http://www.sebotek.com:80/(SAM-TECH_00052377);.

SeboTek Hearing Systems' PAC (Post Auricular Canal) Instrument ("Sebotek"), May 26, 2007 WayBack Machine capture of SeboTek's website contains a description of the PAC, and notes that "Prior to 2003, depending on the level of hearing loss, consumers could choose between four primary styles, none of which offered superior sound quality, comfort or cosmetic appeal. All that changed in 2003, when SeboTek introduced the PAC Voice-QTM hearing instrument,

(56)         References Cited

OTHER PUBLICATIONS the first-ever speaker-in-the-canal device." https://web.archive.org/web/20070526135524 /http://www.sebotek.com:80/OurProducts/our Products.html (SAM-TECH_00052392);.

SeboTek Hearing Systems' PAC (Post Auricular Canal) Instrument ("Sebotek"), Oct. 6, 2003 post by Bruce Gefvert, Director of Sales and Marketing at SeboTek Hearing Systems, on audiologyonline.com discusses the PAC, and states "PAC refers to Post Auricular Canal, an entirely new style of hearing aid that is intended to provide hearing professionals with one more option for treating hearing loss in the mild to severe ranges." https://www.audiologyonline.com/ask-the- experts/sebotek-pac-post-auricular-canal-601 (SAM_00052353-SAM-TECH_00052356);.

SeboTek Hearing Systems' PAC (Post Auricular Canal) Instrument ("Sebotek"), Publication by King Chung in 2004 mentions that "SeboTek VoiceQ and Vivatone have recently launched newly designed behind-the- ear or postauricular canal (PAC, as SeboTek preferred) hearing aids that have receivers situated in the ear canal." See King Chung, Challenges and recent developments in hearing aids. Part II. Feedback and occlusion effect reduction strategies, laser shell manufacturing processes, and other signal processing technologies, 8 Trends Amplif. 125, 150 (2004), available at https://www.ncbi.nlm.nih.gov/pmc/articles/P MC4111464/pdf/10.1177_108471380400800 402.pdf (SAM-TECH_00062067-SAM-TECH_00062106).

Sensaphonics 3D Active Ambient In-Ear Monitor System, At least by 2006, Products of Interest Article (SAM-TECH_00096723).

Sensaphonics 3D Active Ambient In-Ear Monitor System, At least by 2006, Sensaphonics 3D Active Ambient In-Ear Monitor System User Guide (SAM-TECH_00100046).

Sensaphonics 3D Active Ambient In-Ear Monitor System, At least by 2006, Sensaphonics 3D Active Ambient IEM System Article (SAM-TECH_00100065).

Silynx QuietOps, Oct. 4, 2007 Applicant's Answer to Opposer's Notice of Opposition (SAM-TECH_00052371).

Silynx QuietOps, https://defense-update.com/20080513_c4ops.html (SAM-TECH_00057150).

Silynx QuietOps, QuietOps Pocket Guide (Rev. 2.00) (Silynx QuietOps).

Small-footprint keyword spotting using deep neural networks, G. Chen, C. Parada and G. Heigold, 2014 IEEE International Conference on Acoustics, Speech and Signal Processing (ICASSP), Florence, Italy, 2014, pp. 4087-4091.

Sonar-operator active noise reduction insert-earphone: Prototype preliminary test and evaluation, Joseph S. Russotti, Naval Submarine Medical Research Laboratory, Report No. 1225.

Sonomax's Sonomax: SonoCustom and SonoPass ("Sonomax"), Apr. 8, 2006 WayBack Machine capture of Sonomax's website contains an image of the Sonomax and states that "[t]ens of Thousands of people around the world give the SonoCustom a big thumbs up for comfort." https://web.archive.org/web/20060408170243 /http://sonomax.com.au/index.cfm/aboutus/so nomax_solution/ (SAM-TECH_00052472; SAM-TECH_00052998);.

Sonomax's Sonomax: SonoCustom and SonoPass ("Sonomax"), Jun. 15, 2006 WayBack Machine capture of Sonomax's website contains frequently asked questions about the Sonomax and states that SonoPass, our proprietary Windows-based software, drives the fitting process and provides immediate proof of functionality. https://web.archive.org/web/20060615054356 /http://www.sonomax.com.au:80/index.cfm/fa q/ (SAM-TECH_00052643).

Sonomax's Sonomax: SonoCustom and SonoPass ("Sonomax"), Apr. 8, 2006 WayBack Machine capture of Sonomax's website contains an image of the SonoCustom and describes it as a "cost effective, comfortable and resusable earpiece." https://web.archive.org/web/20060408165744 /http://sonomax.com.au:80/index.cfm/fittingprocess/ (SAM-TECH_00052436);.

Sonomax's Sonomax: SonoCustom and SonoPass ("Sonomax"), Apr. 8, 2006 WayBack Machine capture of Sonomax's website contains an image of the Sonomax and states that "[t]he Sonomax is a hearing protection system that combines a uniquely designed earpiece, the SonoCustom, with an optimised hardware and software application, called SonoPass." https://web.archive.org/web/20060408170221 /http://sonomax.com.au:80/index.cfm/testingp rocess/ (SAM-TECH_00052425);.

Sonomax's Sonomax: SonoCustom and SonoPass ("Sonomax"), Jun. 15, 2006 WayBack Machine capture of Sonomax's website contains an image of the Sonomax and states that "application provides employers the unique ability to quantify and track hearing protection performance and produce detailed reports." https://web.archive.org/web/20060615054658 /http://www.sonomax.com.au/index.cfm/testi ngprocess/ (SAM-TECH_00052589);.

Sony S700 Walkman, At least by Oct. 13, 2006, EAFIT Article—The Sony Walkman (SAM-TECH_00099514).

Sony S700 Walkman, At least by Oct. 13, 2006, IDG Article—Sony's New Walkman Players Pack Noise Canceling (SAM-TECH_00099533).

Sony S700 Walkman, At least by Oct. 13, 2006, Sony Walkman User Manual (SAM-TECH_00099557).

Sony S700 Walkman, At least by Oct. 13, 2006, Stuff Article—Sony NW-S700 Review (SAM-TECH_00099579).

Sound Source Localization and Separation, Biniyam Tesfaye Taddese, Mathematics, Statistics, and Computer Science Honors Projects (2006).

Speaker Turn Segmentation Based on Between-Channel Differences, Daniel P.W. Ellis & Jerry C. Liu, LabROSA, Dept. of Electrical Engineering, Columbia University.

Spectral analysis of speech by linear prediction, J. Makhoul, IEEE Transactions on Audio and Electroacoustics, vol. 21, No. 3, pp. 140-148, Jun. 1973.

Speech Input Hardware Investigation for Future Dismounted Soldier Computer Systems, Jeffrey C. Bos & David W. Tack, Drdc Toronto CR 2005-064, May 1, 2005.

Speech Modeling with Magnitude-Normalized Complex Spectra and Its Application to Multisensory Speech Enhancement, A. Subramanya, Z. Zhang, Z. Liu and A. Acero, 2006 IEEE International Conference on Multimedia and Expo, Toronto, ON, Canada, 2006, pp. 1157-1160.

Speech Recognition in Severely Disturbed Environments Combining Ear-Mic and Active Noise Control, N. Westerlund, M. Dahl, I. Claesson, Published 2002, Engineering, Computer Science.

Survey of the Speech Recognition Techniques for Mobile Devices, Dmitry Zaykovskiy, Department of Information Technology, SPECOM'2006, St. Petersburg, Jun. 2006.

Techniques and applications for wearable augmented reality audio, Härmä, Aki & Turku, Julia & Tikander, Miikka & Karjalainen, M & Lokki, Tapio & Nironen, H & Vesa, Sampo (2003).

The Effect of Hearing Aid Microphone Location on the Intelligibility of Hearing Aid - Transduced Speech, John Robert Franks, Dec. 1975.

Using Audio-Based Signal Processing to Passively Monitor Road Traffic, Orla Duffner, Centre for Digital Video Processing and School of Electronic Engineering Dublin City University, Jul. 2006.

Verifying the attenuation of earplugs in situ: Method validation using artificial head and numerical simulations, Annelies Bockstael, Bram De Greve, Timothy Van Renterghem, Dick Botteldooren, Wendy D'haenens, Hannah Keppler, Leen Maes, Birgit Philips, Freya Swinnen, Bart Vinck, The Journal of the Acoustical Society of America; 124 (2): 973-981, Aug. 1, 2008.

Samsung's Motion for Summary Judgment of Invalidity under 35 U.S.C. §112 of the '666 Patent (Redacted) (Dkt. No. 457), 78 pages.

Techiya's Opposition to Samsung's Motion for Summary Judgment of Invalidity under 35 U.S.C. § 112 of the '666 Patent (Redacted) (Dkt. No. 515), 30 pages.

Samsung's Reply in Support of Its Motion for Summary Judgment of Invalidity under 35 U.S.C. § 112 of the '666 Patent (Redacted) (Dkt. No. 556), 22 pages.

Techiya's Sur-Reply to Samsung's Motion for Summary Judgment of Invalidity under 35 U.S.C. § 112 of the '666 Patent (Dkt. No. 587), 5 pages.

* cited by examiner

302 ─

Receive audio signal

304 ─

Receive spatial impulse response
(SIR)

306 ─

Convolve received audio signal with SIR

308 ─

Direct processed audio message to
loudspeaker in earphone

FIG. 4

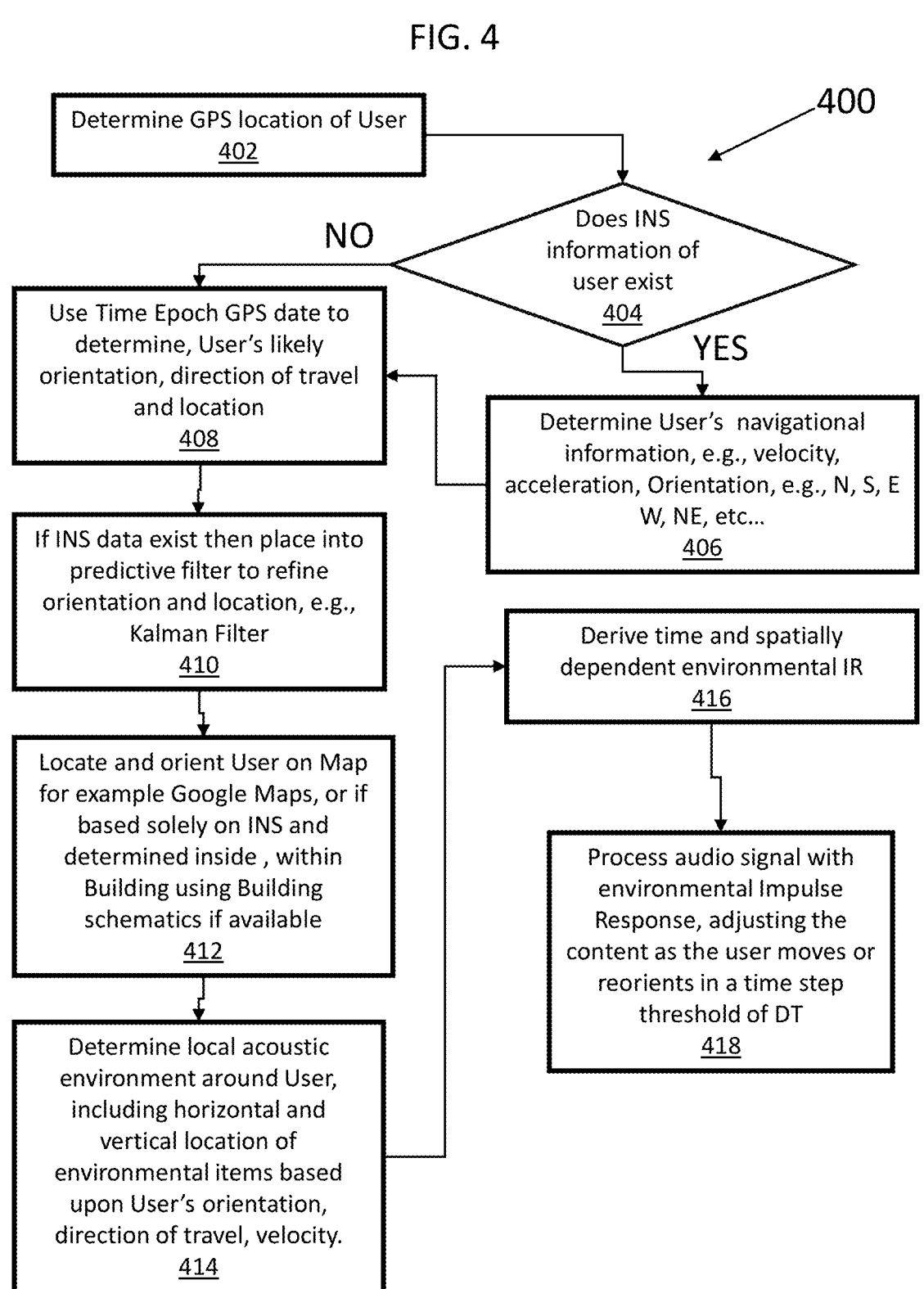

Determine GPS location of User
402

400

Does INS information of user exist
404

NO

YES

Use Time Epoch GPS date to determine, User's likely orientation, direction of travel and location
408

Determine User's navigational information, e.g., velocity, acceleration, Orientation, e.g., N, S, E W, NE, etc...
406

If INS data exist then place into predictive filter to refine orientation and location, e.g., Kalman Filter
410

Derive time and spatially dependent environmental IR
416

Locate and orient User on Map for example Google Maps, or if based solely on INS and determined inside , within Building using Building schematics if available
412

Process audio signal with environmental Impulse Response, adjusting the content as the user moves or reorients in a time step threshold of DT
418

Determine local acoustic environment around User, including horizontal and vertical location of environmental items based upon User's orientation, direction of travel, velocity.
414

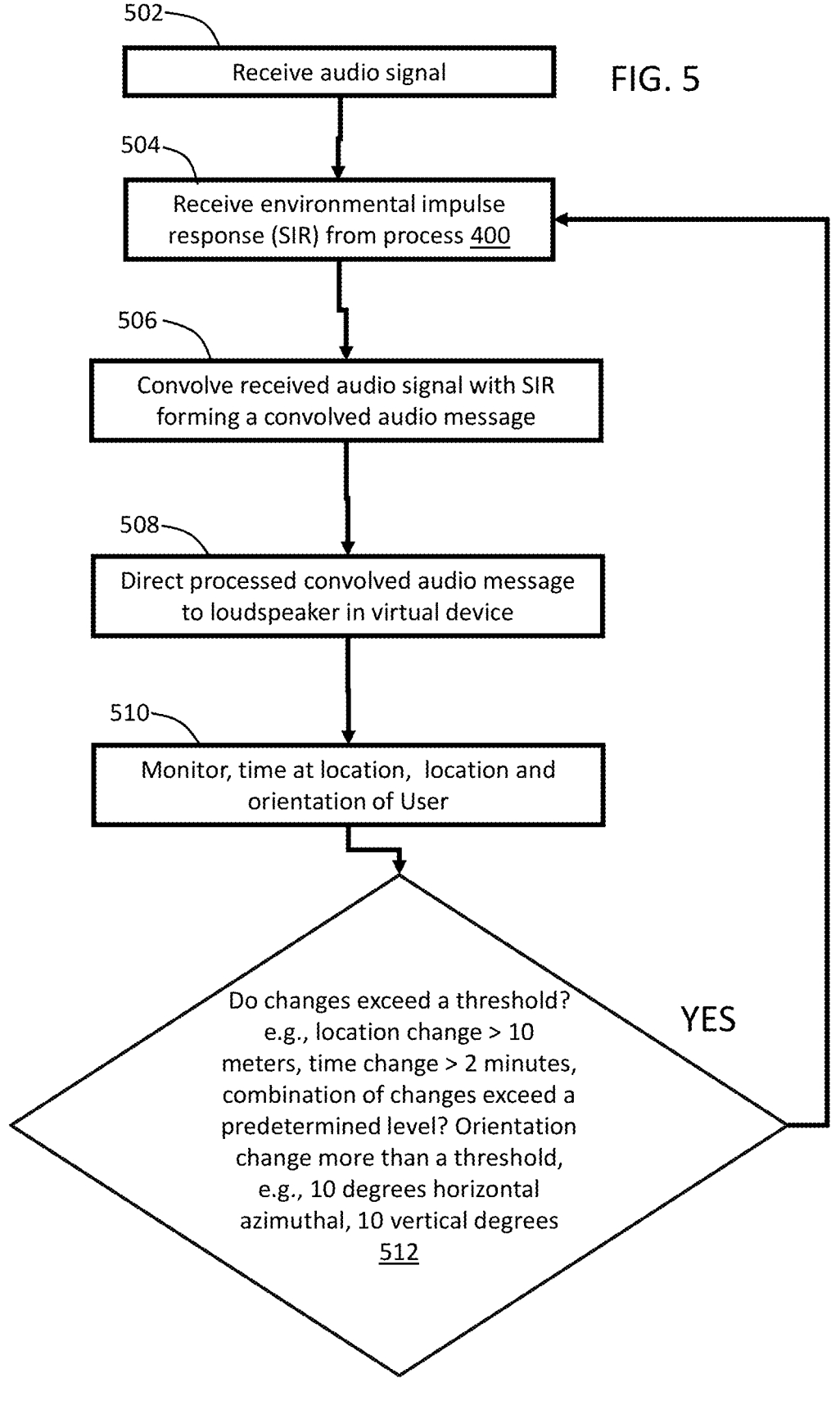

FIG. 5

502 — Receive audio signal

504 — Receive environmental impulse response (SIR) from process 400

506 — Convolve received audio signal with SIR forming a convolved audio message

508 — Direct processed convolved audio message to loudspeaker in virtual device

510 — Monitor, time at location, location and orientation of User

Do changes exceed a threshold? e.g., location change > 10 meters, time change > 2 minutes, combination of changes exceed a predetermined level? Orientation change more than a threshold, e.g., 10 degrees horizontal azimuthal, 10 vertical degrees 512

YES

LOCATION BASED AUDIO SIGNAL MESSAGE PROCESSING

CROSS-REFERENCE TO RELATED APPLICATIONS

This application is a continuation of and claims priority to U.S. patent application Ser. No. 18/134,567, Apr. 13, 2023, which issued as U.S. patent Ser. No. 12/041,438 on 16 Jul. 2024, which is a continuation of and claims priority to U.S. patent application Ser. No. 17/858,987, filed Jul. 6, 2022, which issued as U.S. patent Ser. No. 11/665,499 on May 30, 2023, which is a continuation of and claims priority to U.S. Pat. App. No. 17/242,288, filed 27 Apr. 2021, which issued as U.S. patent Ser. No. 11/451,923 on Sep. 20, 2022, which is a continuation of and claims priority to U.S. patent application Ser. No. 16/425,410, filed May 29, 2019, which issued as U.S. patent Ser. No. 11/032,664 on Jun. 8, 2021, which is a non provisional of and claims priority to U.S. Pat. App. No. 62/677,635, filed May 29, 2018, the disclosure of all of which are incorporated herein by reference in their entirety.

FIELD OF THE INVENTION

The present invention relates in general to methods for hardware and software components of an earphone for processing audio in an augmented reality sound scene, and in particular, though not exclusively, enhancing the perceived naturalness of the augmented reality experience.

BACKGROUND OF THE INVENTION

Auditory display is the use of speech and non-speech audio to convey information or perceptualize data. Such auditorily displayed messages can be virtual, originating from a sound source that is not physically located in an immediate environment, although in Augmented Reality (AR) scenes the user may be presented with an image corresponding to the virtual sound source.

To enhance the perceived naturalness of the AR experience, the spatial acoustic properties of the audio message can be consistent with the spatial acoustic properties of the scene the sound source is located within. For example, if the user is located outdoors then the virtual sound message can be processed with a spatial acoustics sound filter that matches the outdoor scene. Likewise, indoors the spatial acoustics sound filter can be matched to an indoor scene.

The present invention discloses a method to process a speech or non-speech audio content/message with a spatial acoustic filter where the filter matches the spatial acoustic properties of the physical environment the user is within. The processing is directed to earphone hardware platforms.

BRIEF DESCRIPTION OF THE DRAWINGS

Exemplary embodiments of present invention will become more fully understood from the detailed description and the accompanying drawings, wherein:

FIG. 4 illustrates a method of processing an audio signal with an environmental impulse response in accordance with an exemplary embodiment;

FIG. 5 illustrates a method of monitoring the change in location of the user and modifying the environmental impulse response in accordance with an exemplary embodiment;

ABBREVIATIONS

Figure 1:
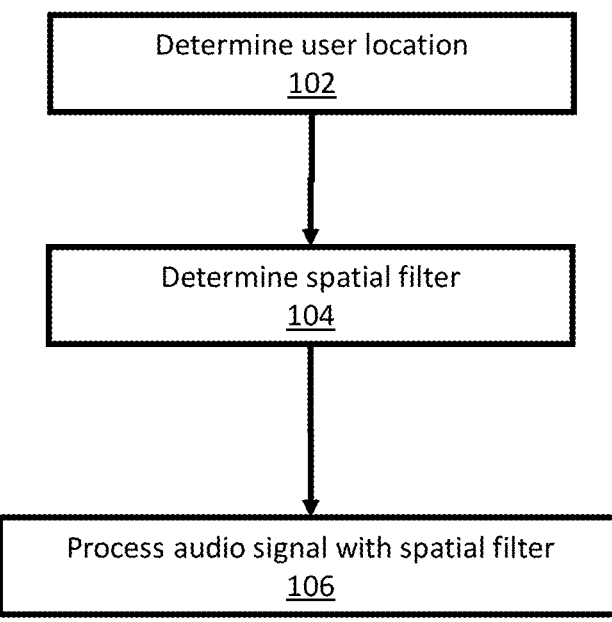
FIG. 1 illustrates a general method using a spatial filter in accordance with an exemplary embodiment.

A2DP: Advanced Audio Distribution Profile. The Bluetooth 2.1 mode for uni-directional transfer of an audio stream in up to 2 channel stereo, either to or from the Bluetooth host, AKA "music mode".

ASM: Ambient Sound Microphone. Microphones configured to detect sound around the listener, not in the ear canal. There is one external microphone on each HearBud.

BTLE: Bluetooth low energy, AKA Bluetooth 4.0 (i.e. non-audio low baud data transfer).

CL: Cirrus Logic, the quad core DSP in the ButtonBox.

CSR: Cambridge Silicon Radio Bluetooth module, containing the Bluetooth CSR 8670 chip, antennae, RAM etc.

ECM: Ear Canal Microphone. Digital microphone for detecting sound in the occluded ear canal of the user. The ASM and ECM are the same component model.

SPKR/ECR: Ear Canal Receiver. A "receiver" is another name for a loudspeaker: it is probably so-called due to Bells 1876 patent for "apparatus for transmitting vocal or other sounds telegraphically", where the "receiver" was the loudspeaker transducer for receiving the telegraphic signal from the far-end party.

SNR: Signal-to-noise ratio.

SPKR: LoudSpeaker, this abbreviation is often used instead of ECR but refer to the same component.

SIR: Spatial Impulse Response. An SIR is one or two signals corresponding (respectively) to a mono or stereo acoustic impulse response for an acoustic space-as is familiar to those skilled in the art. The mono SIR is an actual or virtual acoustic IR from a sound source to a single location, e.g. a single microphone measurement location, and a stereo SIR is an actual or virtual acoustic IR from a sound source to two locations, where each location approximates the location of a left and right ear of an individual in that same acoustic space.

DETAILED DESCRIPTION OF EXEMPLARY EMBODIMENTS

The following description of exemplary embodiment(s) is merely illustrative in nature and is in no way intended to limit the invention, its application, or uses.

Exemplary embodiments are directed to or can be operatively used on various wired or wireless audio devices (e.g., hearing aids, ear monitors, earbuds, headphones, ear terminal, behind the ear devices or other acoustic devices as known by one of ordinary skill, and equivalents). For example, the earpieces can be without transducers (for a noise attenuation application in a hearing protective earplug) or one or more transducers (e.g. ambient sound microphone (ASM), ear canal microphone (ECM), ear canal receiver (ECR)) for monitoring/providing sound. In all the examples illustrated and discussed herein, any specific values should be interpreted to be illustrative only and non-limiting. Thus, other examples of the exemplary embodiments could have different values.

Processes, techniques, apparatus, and materials as known by one of ordinary skill in the art may not be discussed in detail but are intended to be part of the enabling description where appropriate. For example, specific materials may not be listed for achieving each of the targeted properties discussed, however one of ordinary skill would be able, without undo experimentation, to determine the materials needed given the enabling disclosure herein.

Notice that similar reference numerals and letters refer to similar items in the following figures, and thus once an item is defined in one figure, it may not be discussed or further defined in the following figures. Processes, techniques, apparatus, and materials as known by one of ordinary skill in the relevant art may not be discussed in detail but are intended to be part of the enabling description where appropriate.

The present invention is directed towards processing audio signals for reproduction with a loudspeaker on an earphone or headphone. The audio signal can be a speech or non speech message or audio content that conveys information. The speech signal may be a continuous speech signal from a pre-recorded stored data file or a live speech signal from another individual.

In the present invention, the received audio signal is processed with a spatial impulse response (SIR). An SIR is one or two signals corresponding (respectively) to a mono or stereo acoustic impulse response for an acoustic space—as is familiar to those skilled in the art. The mono SIR is an actual or virtual acoustic IR from a sound source to a single location, e.g. a single microphone measurement location, and a stereo SIR is an actual or virtual acoustic IR from a sound source to two locations, where each location approximates the location of a left and right ear of an individual in that same acoustic space.

FIG. 1 illustrates a general overview of at least one example of the present invention: A user location is determined in step 102 to determine if the user is inside a building or outside. Such a location can be determined using GPS coordinates, using a GPS transceiver and associated hardware and software processing on a mobile computing device or located with an earphone device. Note that inertial navigation systems can be used in conjunction with GPS systems. For example, the virtual reality device (e.g., goggles) can have INS chips imbedded that measure acceleration and velocity which can then be fed into a navigational model from a start position. Alternatively, the location can be determined using other methods such as based on triangulation from available wifi signals and associating the wifi network name with a known geographical location. For instance, if the mobile phone of the user has a strong signal connection strength to a wifi network, then a logic unit can determine the user is inside.

Figure 2:
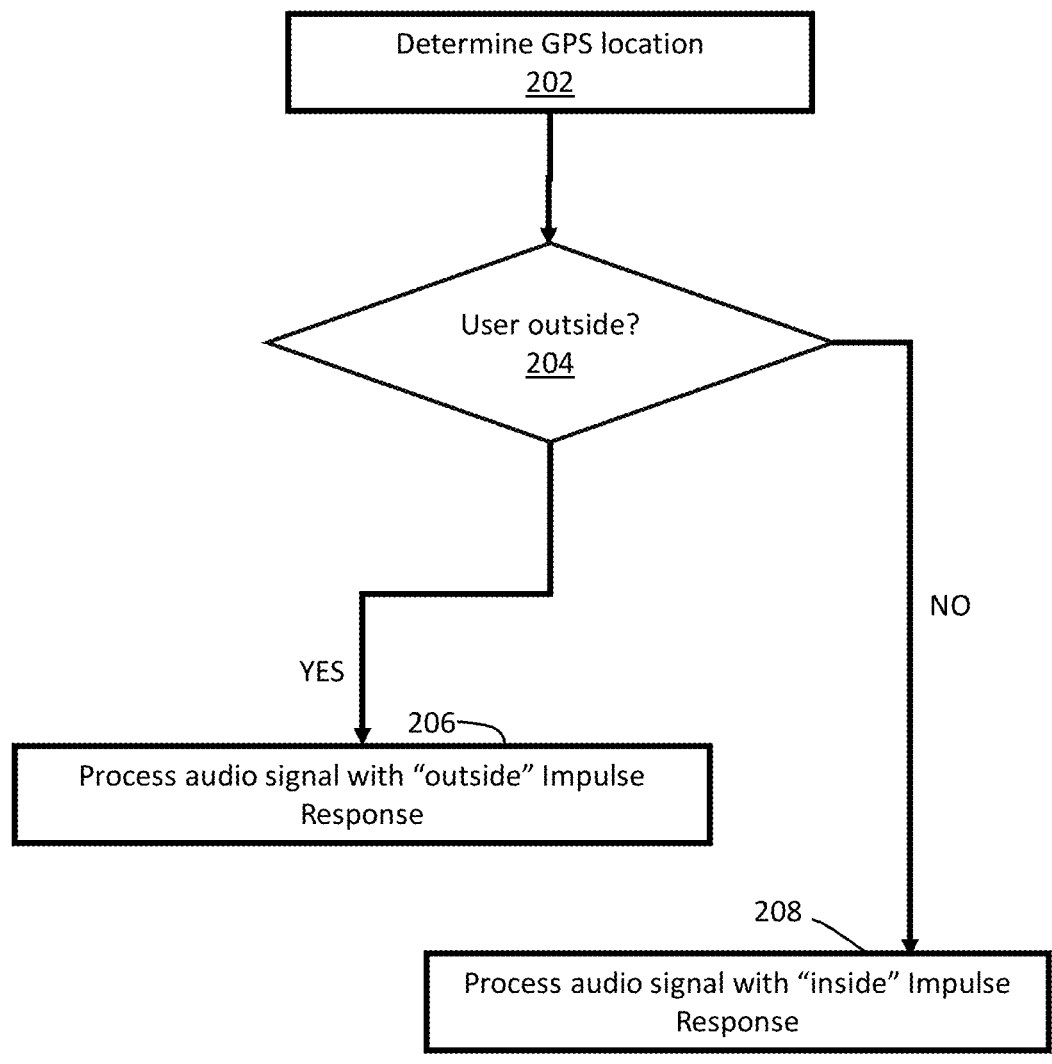
FIG. 2 illustrates a method of determining whether a user is inside or outside to choose an appropriate impulse response in accordance with an exemplary embodiment.

A spatial filter (i.e. an SIR) is determined in step 104: a nonexemplary embodiment is described in FIG. 2.

Figure 3:
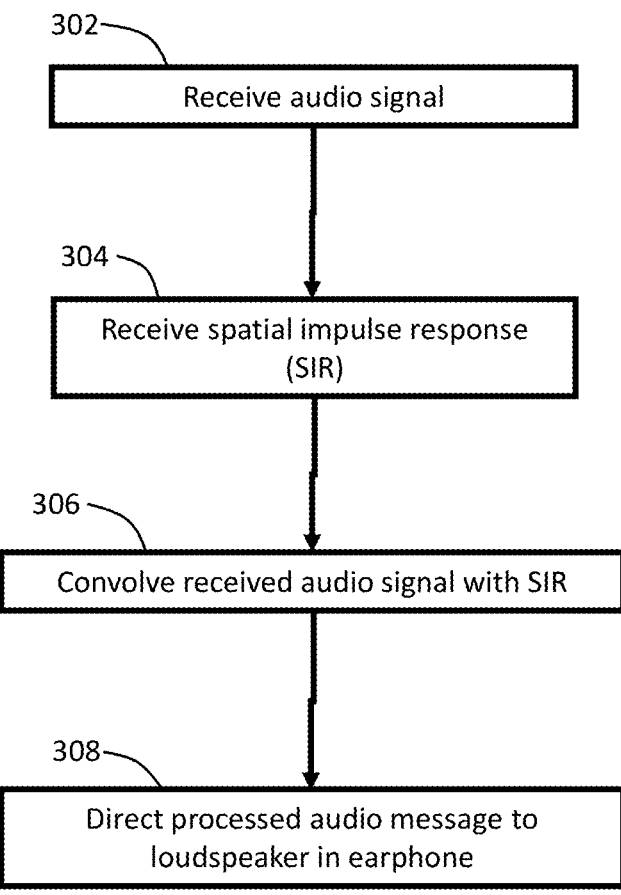
FIG. 3 illustrates a method of determining modifying an acoustic message with a spatial impulse in accordance with an exemplary embodiment.

In step 106, a received audio signal is processed with the determined spatial filter, a nonexemplary embodiment is described in FIG. 3.

Referring to FIG. 2, an exemplary method is described to select either an "outside" SIR or an "inside" SIR.

Based on the determined user location from step 202, it is determined if the user is located outside or inside in step 204. "Outside" here refers to meaning the user (who is assumed to have the same location as the location determining device, e.g. the GPS device) is situated outdoors—i.e. with no substantial roofing material location directly above them. Inside here means the user is located within a building structure, with a substantial roof above them (a substantial roofing material being concrete, wood, roofing tiles etc).

An exemplary embodiment that describes a method for determining if the user is outside or inside is described below:

Method 1: based on an analysis of the GPS accuracy: if the accuracy of the GPS location estimate is below a pre-determined value (which may also be stated as when the error of the GPS location estimate is greater than a pre-determined value, e.g., 15 metres for any given direction) then the user is determined to be inside, as it is assumed that substantial roofing material will attenuate the GPS signals and give a lower accuracy (i.e., higher error) when the user (i.e., the GPS device) is inside. Accuracy can also be determined by the variation in GPS over time. The accuracy of the GPS determined location can be determined by comparison of GPS determined location with map placement location and comparison with Inertial Navigation System (INS) information. For example, if a user has identified that they have just left a building yet the map placement is 5 m inside the building, then the GPS accuracy can be determined. Additionally, GPS location can be enhanced. For example, accuracy is often dependent upon the number of satellites that can be seen, a minimum of 4 is needed to solve the unknowns, x, y, z, and t. If 3 satellites are only available because of signal degradation due to being inside a structure then it is common to eliminate a change in z so that there are three unknowns x, y, and t, which improves x, y, and t location. If 2 satellites are available solution is not typically attempted. Even if no GPS solution is available, INS data can be augmented with GPS data, even if only 2 or 1 satellite signal are acquired to improve the INS determined location, velocity, and acceleration.

Method 2: based on the given GPS location, it is determined if the user is inside or outside by associating the given GPS location with the location on a map, and from the location on the map determining if the user is inside a building or outside. If the user is outside then the audio signal is processed with an outside impulse response function, step 206. If the user is inside then the audio signal is processed with an inside impulse response function, step 208.

Referring to FIG. 3, an exemplary method is described to process the received audio signal with an SIR and direct the processed signal to a loudspeaker in an earphone. If the SIR is a stereo SIR, then two processed output signals will be produced-one sent to the left loudspeaker and the other to the right loudspeaker of the earphone. If the SIR is mono, then the same output signal is directed to both left and right loudspeakers of the earphone. The method of processing the received audio signal with the SIR is convolution—a frequency or time domain signal operation that is familiar and well known to those skilled in the art. The steps includes receiving an audio signal 302, receiving a spatial impulse response (SIR) 304, convolving the received audio signal with the SIR 306, and direct the processed audio message to the loudspeaker in the earphone 308.

FIG. 4 illustrates a method of SIR modification of the virtual audio environment. First the navigational information (location, velocity, acceleration, orientation) is obtained, e.g., via GPS 402, INS 404, combining multiple sensor data 410 into a navigational filter (e.g. Kalman Filter) to refine location, orientation, velocity and acceleration of the viewing vector VV of a user (e.g., a vector from the user's head through the VR visual display). In step 406 the velocity, orientation, and acceleration can be determined from the INS data, GPS data, or a data fusion of the sensor data. In step 408 the GPS signal can be used to determine the User's likely orientation, location and direction of travel. IN step 410 the data from available resources is placed into navigational filters (e.g., Kalman Filter) to refine orientation and location. The navigational information is then compared to maps 412 (e.g., google maps) and a virtual representation of the user placed upon the map and oriented according to the information (Note that this modified map can also be displayed if desired). If the user is located inside a building, a database is searched for that building's schematics, and the virtual representation placed within the building. In step 414, the "near user" environment of the map, (e.g., within 1000 m of the user representation) is searched for sources (S1, S2, S3 in FIG. 6), which are then used to compile a SIR to apply to audio content so that the augmented or virtual environment's audio environment includes elements from the real environment in which a user is located, or virtual representations of the real acoustic environment (e.g., stylized or recorded audio mimicking elements of the real environment, e.g., bird calls). In step 416 the time and spatial environmental impulse response are derived. In step 418 the audio signal is modified the time and spatial environmental impulse response derived.

Note that an additional feature is to feedback into the SIR measurements from the microphones on the virtual or augments system (V/A-S), or a device on the user that can record and transmit to the V/A-S or in the environment. For example microphones on devices in the environment (outside cameras, microphones, e.g., traffic poles with mics and cameras) if publicly available can be fed into the V/A-S to update the next SIR as the location varies. Note also that an alarm can be passed through and emphasized in the virtual or augmented reality environment.

FIG. 5 illustrates a general process in accordance with at least one exemplary embodiment; in this embodiment when the navigational information changes an amount greater than a predetermined threshold the SIR is updated using all available environment data sources. The steps include:

Step 502: receive an audio signal;

Step 504: receive an environmental impulse response;

Step 506: the received audio signal is convolved using the environmental impulse response;

Step 508: send the convolved audio signal to a speaker;

Step 510: monitor the time, location and orientation of the user; and

Step 512: check to see if the monitored values in Step 510 exceed a threshold, and if so then proceed to Step 504.

Figure 6A:
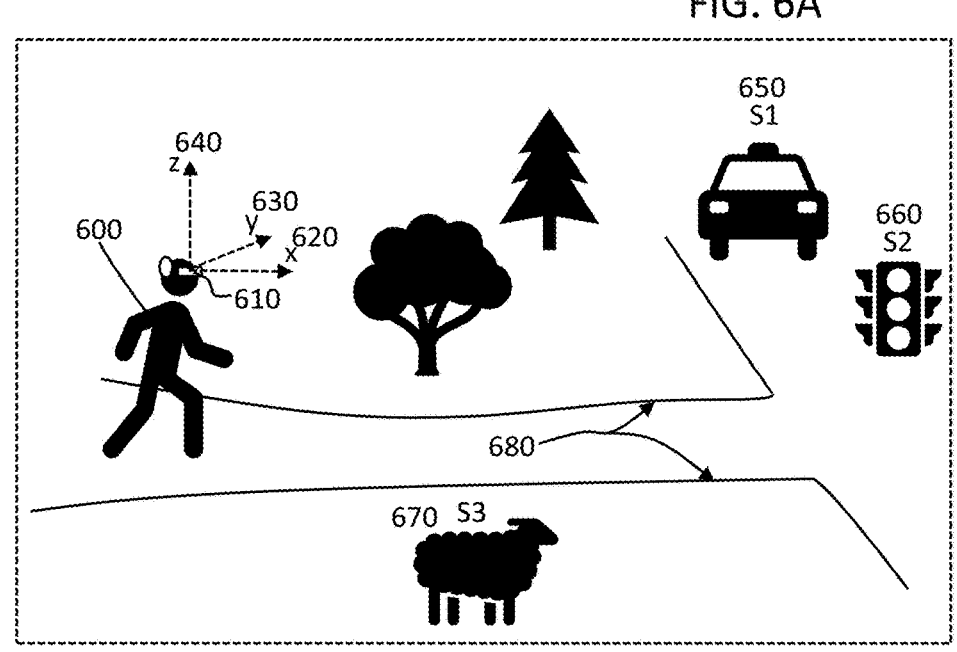
FIG. 6A, FIG. 6B, and FIG. 6C illustrate methods of incorporating environmental acoustic sources into a virtual environment.
Figure 6B:
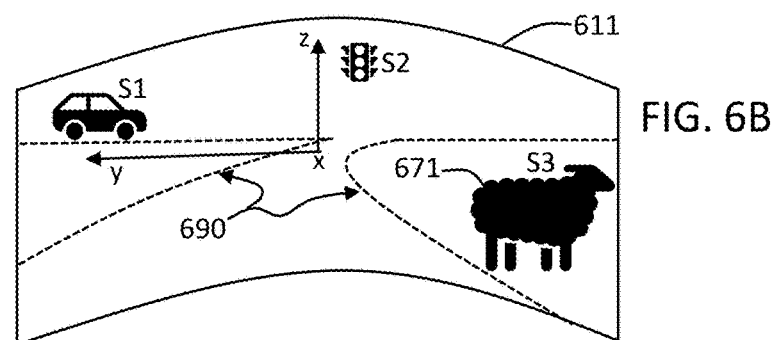
Figure 6C:
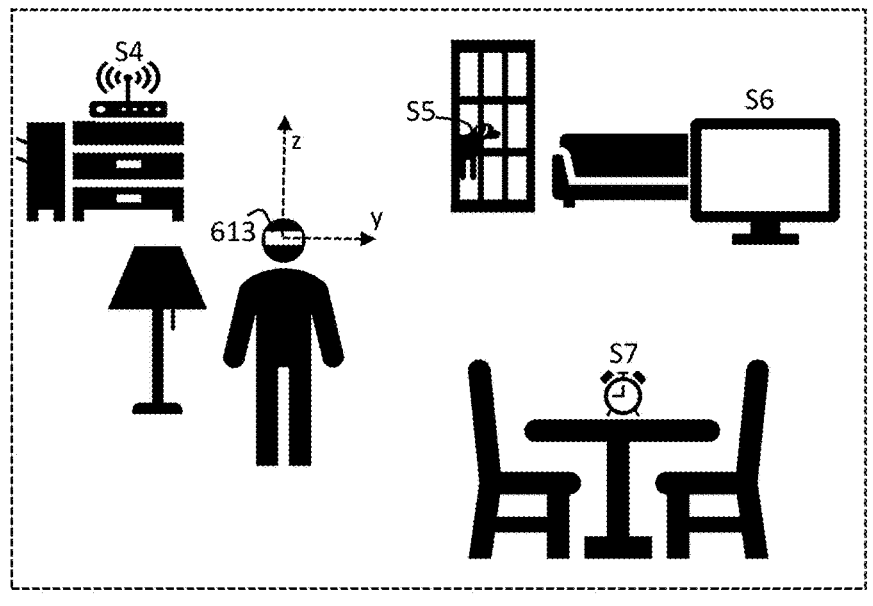

FIG. 6A illustrates a User in an environment outdoors. In FIG. 6A a user 600 wearing an AR or VR goggle set 610 walking along a path 680. FIG. 6C shows a user wearing an AR or VR set within a room. The AR set can be operationally connected with a computer processing device (S4), e.g.

via a wired or wireless link. Alternatively, the VR or AR set can be directly connected with the cloud via wireless means. The goggle 610 has a coordinate system attached to it (e.g., 620, 630, 640) the display 611 seen by the user is illustrated in FIG. 6B. Sources (e.g., acoustic sources) in the real world (FIG. 6A) can be virtually displayed as icons (e.g., 671) and acoustically displayed (e.g., played binaurally into a headset) in the video display 611 so that the source S3 is heard by the user in the approximate location as the real source location. Likewise sources S1 and S2 can be displayed virtually in display 611. The critical real world boundaries 680 can be shown in the display 611 as edges 690 to aid the user in avoiding hazards.

FIG. 6C illustrates a user wearing a goggle 613, with various room sources S5, S6, and S7 displayed in the users visual field and acoustically displayed binaurally so that the user hears the sources in their approximate location to the user.

Figure 7:
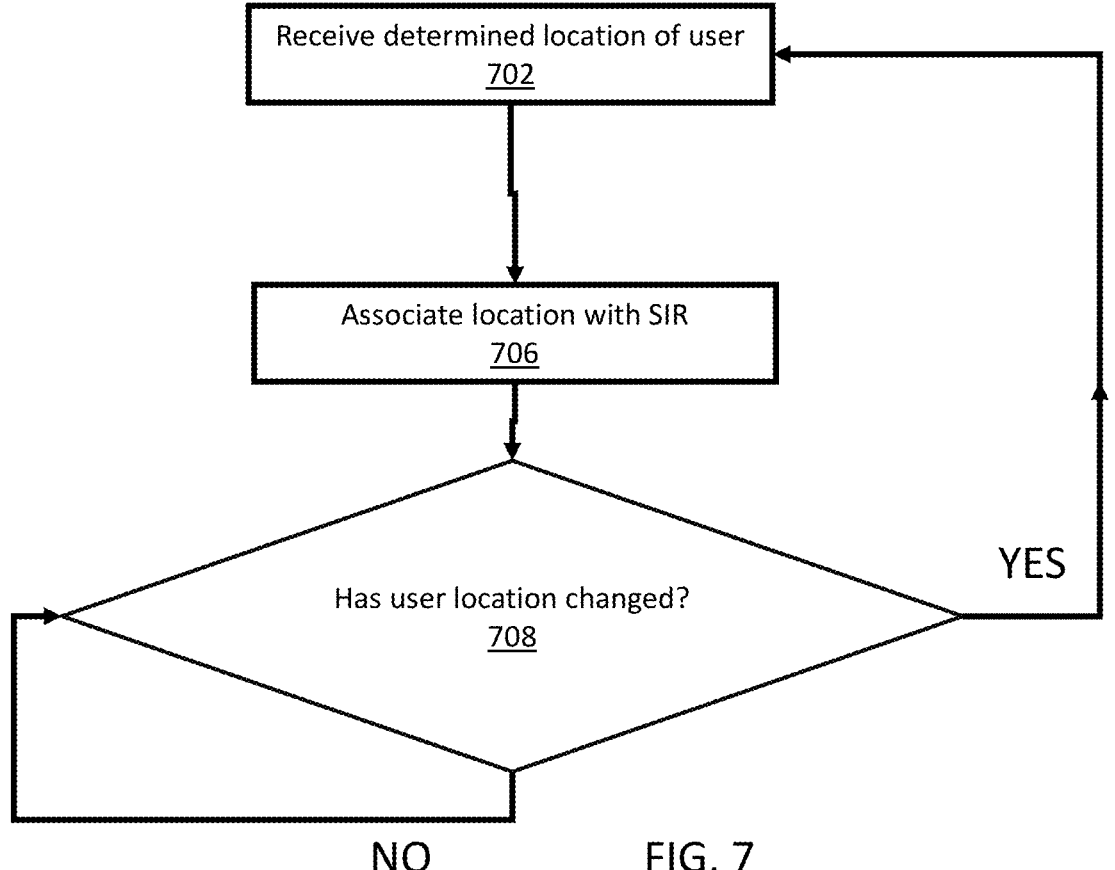
FIG. 7 illustrates a method of associating a geographical region with a particular SIR.

FIG. 7 illustrates a method to associate a geographical region with a particular SIR. The method comprises the steps of:

702: Receiving a determined location of the user, e.g. as a latitude and longitude position.

706: associating the determined region with a Spatial Impulse Response

708: if the user location has changed, we repeat the process of associating the new location with an SIR (note the SIR may not necessarily change). Note that the methods herein can be implemented on various platforms, for example an earphone.

Figure 8:
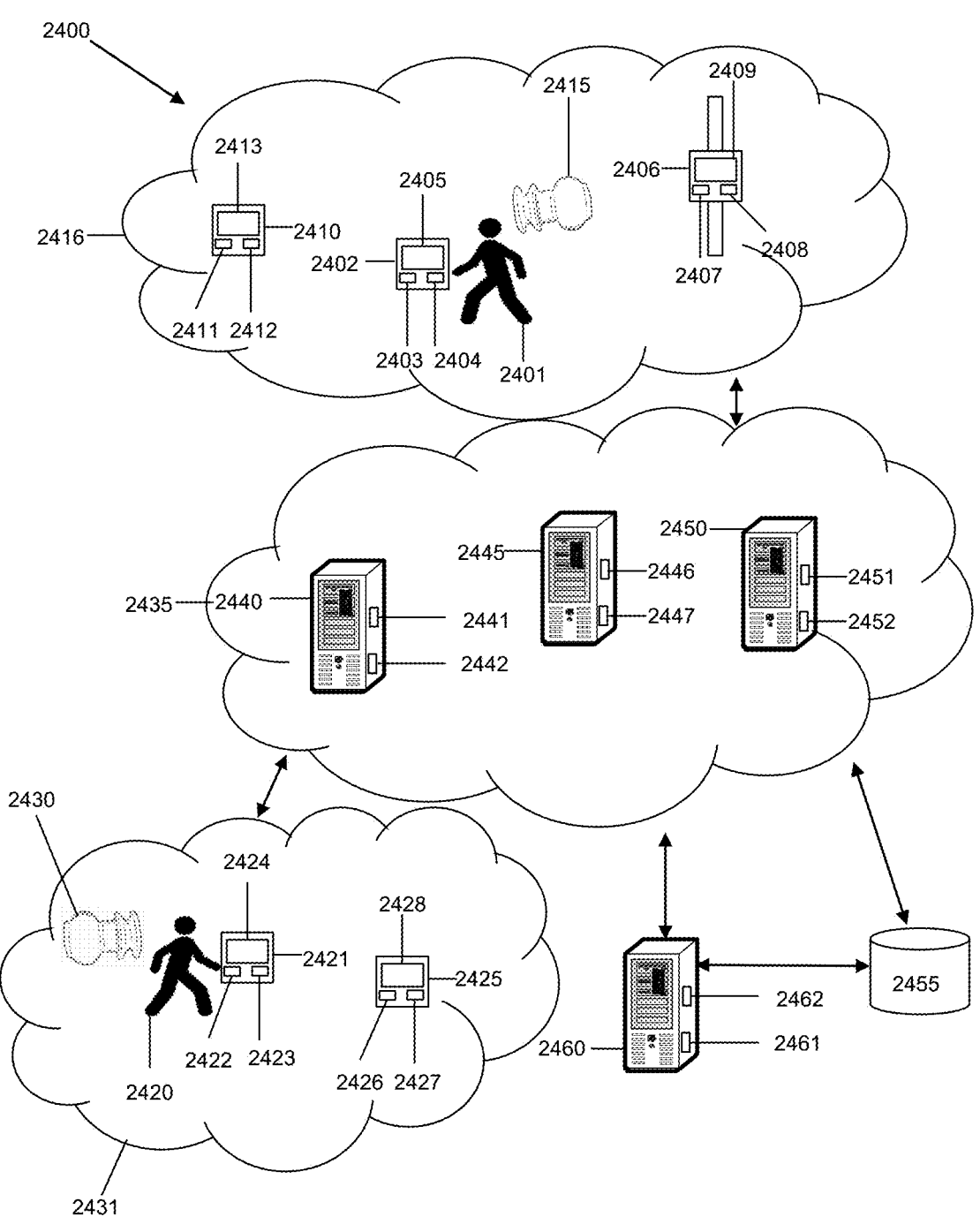
FIG. 8 is a schematic diagram of a system for utilizing earphones according to an embodiment of the present disclosure.

As shown in FIG. 8, a system 2400 and methods for utilizing eartips and/or earphone devices are disclosed. The system 2400 may be configured to support, but is not limited to supporting, data and content services, audio processing applications and services, audio output and/or input applications and services, applications and services for transmitting and receiving audio content, authentication applications and services, computing applications and services, cloud computing services, internet services, satellite services, telephone services, software as a service (SaaS) applications, platform-as-a-service (PaaS) applications, gaming applications and services, social media applications and services, productivity applications and services, voice-over-internet protocol (VoIP) applications and services, speech-to-text translation applications and services, interactive voice applications and services, mobile applications and services, and any other computing applications and services. The system may include a first user 2401, who may utilize a first user device 2402 to access data, content, and applications, or to perform a variety of other tasks and functions. As an example, the first user 2401 may utilize first user device 2402 to access an application (e.g. a browser or a mobile application) executing on the first user device 2402 that may be utilized to access web pages, data, and content associated with the system 2400. In certain embodiments, the first user 2401 may be any type of user that may potentially desire to listen to audio content, such as from, but not limited to, a music playlist accessible via the first user device 2402, a telephone call that the first user 2401 is participating in, audio content occurring in an environment in proximity to the first user 2401, any other type of audio content, or a combination thereof. For example, the first user 2401 may be an individual that may be participating in a telephone call with another user, such as second user 2420.

The first user device 2402 utilized by the first user 2401 may include a memory 2403 that includes instructions, and a processor 2404 that executes the instructions from the memory 2403 to perform the various operations that are performed by the first user device 2402. In certain embodiments, the processor 2404 may be hardware, software, or a combination thereof. The first user device 2402 may also include an interface 2405 (e.g. screen, monitor, graphical user interface, etc.) that may enable the first user 2401 to interact with various applications executing on the first user device 2402, to interact with various applications executing within the system 2400, and to interact with the system 2400 itself. In certain embodiments, the first user device 2402 may include any number of transducers, such as, but not limited to, microphones, speakers, any type of audio-based transducer, any type of transducer, or a combination thereof. In certain embodiments, the first user device 2402 may be a computer, a laptop, a tablet device, a phablet, a server, a mobile device, a smartphone, a smart watch, and/or any other type of computing device. Illustratively, the first user device 2402 is shown as a mobile device in FIG. 8. The first user device 2402 may also include a global positioning system (GPS), which may include a GPS receiver and any other necessary components for enabling GPS functionality, accelerometers, gyroscopes, sensors, and any other componentry suitable for a mobile device.

In addition to using first user device 2402, the first user 2401 may also utilize and/or have access to a second user device 2406 and a third user device 2410. As with first user device 2402, the first user 2401 may utilize the second and third user devices 2406, 2410 to transmit signals to access various online services and content. The second user device 2406 may include a memory 2407 that includes instructions, and a processor 2408 that executes the instructions from the memory 2407 to perform the various operations that are performed by the second user device 2406. In certain embodiments, the processor 2408 may be hardware, software, or a combination thereof. The second user device 2406 may also include an interface 2409 that may enable the first user 2401 to interact with various applications executing on the second user device 2406 and to interact with the system 2400. In certain embodiments, the second user device 2406 may include any number of transducers, such as, but not limited to, microphones, speakers, any type of audio-based transducer, any type of transducer, or a combination thereof. In certain embodiments, the second user device 2406 may be and/or may include a computer, any type of sensor, a laptop, a set-top-box, a tablet device, a phablet, a server, a mobile device, a smartphone, a smart watch, and/or any other type of computing device. Illustratively, the second user device 2402 is shown as a smart watch device in FIG. 8.

The third user device 2410 may include a memory 2411 that includes instructions, and a processor 2412 that executes the instructions from the memory 2411 to perform the various operations that are performed by the third user device 2410. In certain embodiments, the processor 2412 may be hardware, software, or a combination thereof. The third user device 2410 may also include an interface 2413 that may enable the first user 2401 to interact with various applications executing on the second user device 2406 and to interact with the system 2400. In certain embodiments, the third user device 2410 may include any number of transducers, such as, but not limited to, microphones, speakers, any type of audio-based transducer, any type of transducer, or a combination thereof. In certain embodiments, the third user device 2410 may be and/or may include a computer, any type of sensor, a laptop, a set-top-box, a tablet device, a phablet, a server, a mobile device, a smartphone, a smart watch, and/or any other type of computing device. Illustratively, the third user device 2410 is shown as a smart watch device in FIG. 8.

The first, second, and/or third user devices 2402, 2406, 2410 may belong to and/or form a communications network 2416. In certain embodiments, the communications network 2416 may be a local, mesh, or other network that facilitates communications among the first, second, and/or third user devices 2402, 2406, 2410 and/or any other devices, programs, and/or networks of system 2400 or outside system 2400. In certain embodiments, the communications network 2416 may be formed between the first, second, and third user devices 2402, 2406, 2410 through the use of any type of wireless or other protocol and/or technology. For example, the first, second, and third user devices 2402, 2406, 2410 may communicate with one another in the communications network 2416, such as by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2416 may be configured to communicatively link with and/or communicate with any other network of the system 2400 and/or outside the system 2400.

The system 2400 may also include an earphone device 2415, which the first user 2401 may utilize to hear and/or audition audio content, transmit audio content, receive audio content, experience any type of content, process audio content, adjust audio content, store audio content, perform any type of operation with respect to audio content, or a combination thereof. The earphone device 2415 may be an earpiece, a hearing aid, an ear monitor, an ear terminal, a behind-the-ear device, any type of acoustic device, or a combination thereof. The earphone device 2415 may include any type of component utilized for any type of earpiece. In certain embodiments, the earphone device 2415 may include any number of ambient sound microphones that may be configured to capture and/or measure ambient sounds and/or audio content occurring in an environment that the earphone device 2415 is present in and/or is proximate to. In certain embodiments, the ambient sound microphones may be placed at a location or locations on the earphone device 2415 that are conducive to capturing and measuring ambient sounds occurring in the environment. For example, the ambient sound microphones may be positioned in proximity to a distal end (e.g. the end of the earphone device 2415 that is not inserted into the first user's 2401 ear) of the earphone device 2415 such that the ambient sound microphones are in an optimal position to capture ambient or other sounds occurring in the environment. In certain embodiments, the earphone device 2415 may include any number of ear canal microphones, which may be configured to capture and/or measure sounds occurring in an ear canal of the first user 2401 or other user wearing the earphone device 2415. In certain embodiments, the ear canal microphones may be positioned in proximity to a proximal end (e.g. the end of the earphone device 2415 that is inserted into the first user's 2401 ear) of the earphone device 2415 such that sounds occurring in the ear canal of the first user 2401 may be captured more readily.

The earphone device 2415 may also include any number of transceivers, which may be configured to transmit signals to and/or receive signals from any of the devices in the system 2400. In certain embodiments, a transceiver of the earphone device 2415 may facilitate wireless connections and/or transmissions between the earphone device 2415 and any device in the system 2400, such as, but not limited to, the first user device 2402, the second user device 2406, the third user device 2410, the fourth user device 2421, the fifth user device 2425, the earphone device 2430, the servers 2440, 2445, 2450, 2460, and the database 2455. The earphone device 2415 may also include any number of memories for storing content and/or instructions, processors that execute the instructions from the memories to perform the operations for the earphone device 2415, and/or any type integrated circuit for facilitating the operation of the earphone device 2415. In certain embodiments, the processors may comprise, hardware, software, or a combination of hardware and software. The earphone device 2415 may also include one or more ear canal receivers, which may be speakers for outputting sound into the ear canal of the first user 2401. The ear canal receivers may output sounds obtained via the ear canal microphones, ambient sound microphones, any of the devices in the system 2400, from a storage device of the earphone device 2415, or any combination thereof.

The ear canal receivers, ear canal microphones, transceivers, memories, processors, integrated circuits, and/or ear canal receivers may be affixed to an electronics package that includes a flexible electronics board. The earphone device 2415 may include an electronics packaging housing that may house the ambient sound microphones, ear canal microphones, ear canal receivers (i.e. speakers), electronics supporting the functionality of the microphones and/or receivers, transceivers for receiving and/or transmitting signals, power sources (e.g. batteries and the like), any circuitry facilitating the operation of the earphone device 2415, or any combination thereof. The electronics package including the flexible electronics board may be housed within the electronics packaging housing to form an electronics packaging unit. The earphone device 2415 may further include an earphone housing, which may include receptacles, openings, and/or keyed recesses for connecting the earphone housing to the electronics packaging housing and/or the electronics package. For example, nozzles of the electronics packaging housing may be inserted into one or more keyed recesses of the earphone housing so as to connect and secure the earphone housing to the electronics packaging housing. When the earphone housing is connected to the electronics packaging housing, the combination of the earphone housing and the electronics packaging housing may form the earphone device 2415. The earphone device 2415 may further include a cap for securing the electronics packaging housing, the earphone housing, and the electronics package together to form the earphone device 2415.

In certain embodiments, the earphone device 2415 may be configured to have any number of changeable tips, which may be utilized to facilitate the insertion of the earphone device 2415 into an ear aperture of an ear of the first user 2401, secure the earphone device 2415 within the ear canal of an ear of the first user 2401, and/or to isolate sound within the ear canal of the first user 2401. The tips may be foam tips, which may be affixed onto an end of the earphone housing of the earphone device 2415, such as onto a stent and/or attachment mechanism of the earphone housing. In certain embodiments, the tips may be any type of eartip as disclosed and described in the present disclosure. The eartips as disclosed in the present disclosure may be configured to facilitate distributed reduced contact force, sound isolation for sound in the ear canal of the first user 2401 (i.e. between the ambient environment and the ear canal environment within an ear of the first user 2401), mold into a variety of forms and/or positions, encapsulate volumes upon insertion into an ear aperture of the first user 2401, have a pressure adjusting design, facilitate notched stent retention (i.e. on a stent of the earphone housing), facilitate stent insertion into an ear canal of the first user 2401 via an ear aperture of the first user 2401, or any combination thereof. In certain embodiments, the eartip may be designed to provide sound isolation capability that is at least as effective as conventional foam and/or flange tips. Notably, the eartips may be manufactured and configured to be made in any desired size specifications and/or materials, and may be tailored to each individual user, such as first user 2401. In contrast to conventional foam or flange tips, an eartip according to the present disclosure may be adjusted for size without having to substitute the eartip with another eartip, may have an EPA NRR rating of NRR=18, may have a unique flatter high frequency attenuation profile so as to maintain audio quality, may have ease of manufacturability, and may be designed to distribute contact force and minimize radial force against a user's ear canal walls when positioned in a user's ear canal. Additionally, an eartip according to the present disclosure may be made of a non-porous material that is not closed cell foam or open cell foam.

In certain embodiments, the eartip may be designed so that the earphone device's 2415 retention force on the ear canal walls of the first user 2401 may be distributed over a larger area than traditional foam or flange tips allow, thereby reducing the pressure on the ear canal walls of the first user 2401. Unlike foam tips, which primarily provide a restoring radial force that exerts pressure against the ear canal walls of a user, the eartip is designed to move both radially and axially, which allows for more give and redistribution of contact over a larger area, and, thus, decreases the retention pressure. As a result, this allows for increased comfort for the user and allows the user to utilize the eartip for an extended period of time when compared to traditional foam and/or flange tips. In certain embodiments, the eartip utilized with the earphone device 2415 may be configured to encapsulate a volume of gas and/or liquid. In either case (i.e. gas or liquid), the bulk of sound isolation provided by the eartip is achieved through the reflection of ambient sound waves so that the encapsulated volume can be low mass. In certain embodiments, portions of the eartip may encapsulate a volume with the ability to release volume when pressed upon without having to incorporate complicated valves. The encapsulated volume may be achieved by the ear canal wall pressing radially and/or axially against the outer surfaces of the eartip, which may force the outer portion of the eartip to seal with the inner portion of the eartip. In certain embodiments, the inner portion of the eartip may be small than the outer diameter of the stent of the earphone housing upon which the eartip is placed so that upon insertion of the eartip on the stent, the inner portion stretches outward to meet the outer surface of the eartip, which further facilitates the sealing of the ear canal of the first user 2401.

In certain embodiments, the stent of the eartip, over which the eartip is placed, may be designed to have a smaller diameter front end and a larger diameter middle section to promote retention of the eartip on the stent itself. In certain embodiments, a portion of the eartip may have an inner core diameter that is smaller than the stent outer diameter so that the eartip provides radial compression upon the stent so as to enhance sealing and to add friction to prevent axial slippage within the ear canal of the first user 2401. In certain embodiments, an increased mid-section inner core diameter of the eartip may be utilized (i.e. larger than the smaller inner core diameter of the eartip), which may be configured to line up with the mid-section outer diameter of the stent of the earphone housing of the earphone device 2415. This may provide axial stability for the earphone device 2415, while simultaneously preventing axial slippage from the ear canal of the first user 2401. In certain embodiments, the eartip may have an insertion end that has a funnel shape, which aids in inserting the eartip onto the stent of the earphone housing of the earphone device 2415.

In certain embodiments, the eartip has a configuration that applies minimal force against the first user's 2401 ear canal. Additionally, the eartip can seal the first user's 2401 ear canal by providing at least 15 dB of attenuation across frequency. To facilitate manufacturability, the eartip may be molded inverted, thereby allowing inexpensive mass production. Lips of the eartip may then be folded to contact ledges for the eartip that may be utilized by the first user 2401. Sealing and comfort depend upon an accurate fit within the first user's 2401 ear canal, and, as a result, eartips according to the present disclosure may be manufactured in several single sizes, and, because of the unique design of the eartips, a single eartip may be adjusted to fit multiple sizes, which minimizes manufacturing costs, while allowing for more flexibility, versatility, and for a greater number of sizes for the eartip. Notably, any of the features of any of the eartips described in the present disclosure may be combined and/or interchanged with any other eartips described in the present disclosure. Furthermore, the shape, size, features and/or functionality of any of the components of the earphone device and/or hearbud housing device described in the present disclosure may be modified for each particular user for the shape and size of each user's ear aperture and/or ear canal, or a combination thereof.

Notably, in experiments conducted using the eartip, the experiments have shown that the eartip allows for similar levels of sound isolation when compared to conventional foam and/or flange tips. For example, experiments have shown that the eartips provided in the present disclosure provided a NRR of 18 with a generally flat high frequency profile. A flat attenuation profile maintains an ambient environment's frequency profile when level reduced by the attenuation, which can be useful in maintaining the quality of ambient speech and music (or other audio content) during the level reduction process.

In further embodiments, the eartip may be configured to have an open configuration prior to insertion onto a stent of the earphone housing and/or the earphone device 2415 itself. By having an open configuration, the eartip may be mass produced using conventional molding techniques and/or by utilizing 3D commercial printers. The open configuration of the eartip also facilitates molding, and can be 3D printed, where the open configuration allows for resin removal. For example, resin removal may be achieved by utilizing commercial 3D printers that allow the use of lower durometer materials, such as Stratasys machines and the like. In certain embodiments, since the eartip has an open configuration, which is then sealed, any additional pressure can force encapsulated gas out of the eartip relieving the feedback pressure so as to keep the comfort level for the first user 2401 relatively stable.

In addition to the first user 2401, the system 2400 may include a second user 2420, who may utilize a fourth user device 2421 to access data, content, and applications, or to perform a variety of other tasks and functions. Much like the first user 2401, the second user 2420 may be may be any type of user that may potentially desire to listen to audio content, such as from, but not limited to, a storage device of the fourth user device 2421, a telephone call that the second user 2420 is participating in, audio content occurring in an environment in proximity to the second user 2420, any other type of audio content, or a combination thereof. For example, the second user 2420 may be an individual that may be listening to songs stored in a playlist that resides on the fourth user device 2421. Also, much like the first user 2401, the second user 2420 may utilize fourth user device 2421 to access an application (e.g. a browser or a mobile application) executing on the fourth user device 2421 that may be utilized to access web pages, data, and content associated with the system 2400. The fourth user device 2421 may include a memory 2422 that includes instructions, and a processor 2423 that executes the instructions from the memory 2422 to perform the various operations that are performed by the fourth user device 2421. In certain embodiments, the processor 2423 may be hardware, software, or a combination thereof. The fourth user device 2421 may also include an interface 2424 (e.g. a screen, a monitor, a graphical user interface, etc.) that may enable the second user 2420 to interact with various applications executing on the fourth user device 2421, to interact with various applications executing in the system 2400, and to interact with the system 2400. In certain embodiments, the fourth user device 2421 may include any number of transducers, such as, but not limited to, microphones, speakers, any type of audio-based transducer, any type of transducer, or a combination thereof. In certain embodiments, the fourth user device 2421 may be a computer, a laptop, a tablet device, a phablet, a server, a mobile device, a smartphone, a smart watch, and/or any other type of computing device. Illustratively, the fourth user device 2421 may be a computing device in FIG. 8. The fourth user device 2421 may also include any of the componentry described for first user device 2402, the second user device 2406, and/or the third user device 2410. In certain embodiments, the fourth user device 2421 may also include a global positioning system (GPS), which may include a GPS receiver and any other necessary components for enabling GPS functionality, accelerometers, gyroscopes, sensors, and any other componentry suitable for a computing device.

In addition to using fourth user device 2421, the second user 2420 may also utilize and/or have access to a fifth user device 2425. As with fourth user device 2421, the second user 2420 may utilize the fourth and fifth user devices 2421, 2425 to transmit signals to access various online services and content. The fifth user device 2425 may include a memory 2426 that includes instructions, and a processor 2427 that executes the instructions from the memory 2426 to perform the various operations that are performed by the fifth user device 2425. In certain embodiments, the processor 2427 may be hardware, software, or a combination thereof. The fifth user device 2425 may also include an interface 2428 that may enable the second user 2420 to interact with various applications executing on the fifth user device 2425 and to interact with the system 2400. In certain embodiments, the fifth user device 2425 may include any number of transducers, such as, but not limited to, microphones, speakers, any type of audio-based transducer, any type of transducer, or a combination thereof. In certain embodiments, the fifth user device 2425 may be and/or may include a computer, any type of sensor, a laptop, a set-top-box, a tablet device, a phablet, a server, a mobile device, a smartphone, a smart watch, and/or any other type of computing device. Illustratively, the fifth user device 2425 is shown as a tablet device in FIG. 8.

The fourth and fifth user devices 2421, 2425 may belong to and/or form a communications network 2431. In certain embodiments, the communications network 2431 may be a local, mesh, or other network that facilitates communications between the fourth and fifth user devices 2421, 2425, and/or any other devices, programs, and/or networks of system 2400 or outside system 2400. In certain embodiments, the communications network 2431 may be formed between the fourth and fifth user devices 2421, 2425 through the use of any type of wireless or other protocol and/or technology. For example, the fourth and fifth user devices 2421, 2425 may communicate with one another in the communications network 2416, such as by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2431 may be configured to communicatively link with and/or communicate with any other network of the system 2400 and/or outside the system 2400.

Much like first user 2401, the second user 2420 may have his or her own earphone device 2430. The earphone device 2430 may be utilized by the second user 2420 to hear and/or audition audio content, transmit audio content, receive audio content, experience any type of content, process audio content, adjust audio content, store audio content, perform any type of operation with respect to audio content, or a combination thereof. The earphone device 2430 may be an earpiece, a hearing aid, an ear monitor, an ear terminal, a behind-the-ear device, any type of acoustic device, or a combination thereof. The earphone device 2430 may include any type of component utilized for any type of earpiece, and may include any of the features, functionality and/or components described and/or usable with earphone device 2415. For example, earphone device 2430 may include any number of transceivers, ear canal microphones, ambient sound microphones, processors, memories, housings, eartips, foam tips, flanges, any other component, or any combination thereof.

In certain embodiments, the first, second, third, fourth, and/or fifth user devices 2402, 2406, 2410, 2421, 2425 and/or earphone devices 2415, 2430 may have any number of software applications and/or application services stored and/or accessible thereon. For example, the first and second user devices 2402, 2411 may include applications for processing audio content, applications for playing, editing, transmitting, and/or receiving audio content, streaming media applications, speech-to-text translation applications, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 2401, 2420 to readily interact with the software applications. The software applications and services may also be utilized by the first and second users 2401, 2420 to interact with any device in the system 2400, any network in the system 2400 (e.g. communications networks 2416, 2431, 2435), or any combination thereof. For example, the software applications executing on the first, second, third, fourth, and/or fifth user devices 2402, 2406, 2410, 2421, 2425 and/or earphone devices 2415, 2430 may be applications for receiving data, applications for storing data, applications for auditioning, editing, storing and/or processing audio content, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first, second, third, fourth, and/or fifth user devices 2402, 2406, 2410, 2421, 2425 and/or earphone devices 2415, 2430 may include associated telephone numbers, internet protocol addresses, device identities, or any other identifiers to uniquely identify the first, second, third, fourth, and/or fifth user devices 2402, 2406, 2410, 2421, 2425 and/or earphone devices 2415, 2430 and/or the first and second users 2401, 2420. In certain embodiments, location information corresponding to the first, second, third, fourth, and/or fifth user devices 2402, 2406, 2410, 2421, 2425 and/or earphone devices 2415, 2430 may be obtained based on the internet protocol addresses, by receiving a signal from the first, second, third, fourth, and/or fifth user devices 2402, 2406, 2410, 2421, 2425 and/or earphone devices 2415, 2430 or based on profile information corresponding to the first, second, third, fourth, and/or fifth user devices 2402, 2406, 2410, 2421, 2425 and/or earphone devices 2415, 2430.

The system 2400 may also include a communications network 2435. The communications network 2435 may be under the control of a service provider, the first and/or second users 2401, 2420, any other designated user, or a combination thereof. The communications network 2435 of the system 2400 may be configured to link each of the devices in the system 2400 to one another. For example, the communications network 2435 may be utilized by the first user device 2402 to connect with other devices within or outside communications network 2435. Additionally, the communications network 2435 may be configured to transmit, generate, and receive any information and data traversing the system 2400. In certain embodiments, the communications network 2435 may include any number of servers, databases, or other componentry. The communications network 2435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 2440, 2445, and 2450 are shown as being included within communications network 2435. In certain embodiments, the communications network 2435 may be part of a single autonomous system that is located in a particular geographic region, or be part of multiple autonomous systems that span several geographic regions.

Notably, the functionality of the system 2400 may be supported and executed by using any combination of the servers 2440, 2445, 2450, and 2460. The servers 2440, 2445, and 2450 may reside in communications network 2435, however, in certain embodiments, the servers 2440, 2445, 2450 may reside outside communications network 2435. The servers 2440, 2445, and 2450 may provide and serve as a server service that performs the various operations and functions provided by the system 2400. In certain embodiments, the server 2440 may include a memory 2441 that includes instructions, and a processor 2442 that executes the instructions from the memory 2441 to perform various operations that are performed by the server 2440. The processor 2442 may be hardware, software, or a combination thereof. Similarly, the server 2445 may include a memory 2446 that includes instructions, and a processor 2447 that executes the instructions from the memory 2446 to perform the various operations that are performed by the server 2445. Furthermore, the server 2450 may include a memory 2451 that includes instructions, and a processor 2452 that executes the instructions from the memory 2451 to perform the various operations that are performed by the server 2450. In certain embodiments, the servers 2440, 2445, 2450, and 2460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 2440, 2445, 2450 may be communicatively linked to the communications network 2435, the communications network 2416, the communications network 2431, any network, any device in the system 2400, any program in the system 2400, or any combination thereof.

The database 2455 of the system 2400 may be utilized to store and relay information that traverses the system 2400, cache content that traverses the system 2400, store data about each of the devices in the system 2400 and perform any other typical functions of a database. In certain embodiments, the database 2455 may be connected to or reside within the communications network 2435, the communications network 2416, the communications network 2431, any other network, or a combination thereof. In certain embodiments, the database 2455 may serve as a central repository for any information associated with any of the devices and information associated with the system 2400. Furthermore, the database 2455 may include a processor and memory or be connected to a processor and memory to perform the various operation associated with the database 2455. In certain embodiments, the database 2455 may be connected to the earphone devices 2415, 2430, the servers 2440, 2445, 2450, 2460, the first user device 2402, the second user device 2406, the third user device 2410, the fourth user device 2421, the fifth user device 2425, any devices in the system 2400, any other device, any network, or any combination thereof.

The database 2455 may also store information and metadata obtained from the system 2400, store metadata and other information associated with the first and second users 2401, 2420, store user profiles associated with the first and second users 2401, 2420, store device profiles associated with any device in the system 2400, store communications traversing the system 2400, store user preferences, store information associated with any device or signal in the system 2400, store information relating to patterns of usage relating to the first, second, third, fourth, and fifth user devices 2402, 2406, 2410, 2421, 2425, store audio content associated with the first, second, third, fourth, and fifth user devices 2402, 2406, 2410, 2421, 2425 and/or earphone devices 2415, 2430, store audio content and/or information associated with the audio content that is captured by the ambient sound microphones, store audio content and/or information associated with audio content that is captured by ear canal microphones, store any information obtained from any of the networks in the system 2400, store audio content and/or information associated with audio content that is outputted by ear canal receivers of the system 2400, store any information and/or signals transmitted and/or received by transceivers of the system 2400, store any device and/or capability specifications relating to the earphone devices 2415, 2430, store historical data associated with the first and second users 2401, 2415, store information relating to the size (e.g. depth, height, width, curvatures, etc.) and/or shape of the first and/or second user's 2401, 2420 ear canals and/or ears, store information identifying and or describing any eartip utilized with the earphone devices 2401, 2415, store device characteristics for any of the devices in the system 2400, store information relating to any devices associated with the first and second users 2401, 2420, store any information associated with the earphone devices 2415, 2430, store log on sequences and/or authentication information for accessing any of the devices of the system 2400, store information associated with the communications networks 2416, 2431, store any information generated and/or processed by the system 2400, store any of the information disclosed for any of the operations and functions disclosed for the system 2400 herewith, store any information traversing the system 2400, or any combination thereof. Furthermore, the database 2455 may be configured to process queries sent to it by any device in the system 2400.

The system 2400 may also include a software application, which may be configured to perform and support the operative functions of the system 2400, such as the operative functions of the first, second, third, fourth, and fifth user devices 2402, 2406, 2410, 2421, 2425 and/or the earphone devices 2415, 2430. In certain embodiments, the application may be a website, a mobile application, a software application, or a combination thereof, which may be made accessible to users utilizing one or more computing devices, such as the first, second, third, fourth, and fifth user devices 2402, 2406, 2410, 2421, 2425 and/or the earphone devices 2415, 2430. The application of the system 2400 may be accessible via an internet connection established with a browser program or other application executing on the first, second, third, fourth, and fifth user devices 2402, 2406, 2410, 2421, 2425 and/or the earphone devices 2415, 2430, a mobile application executing on the first, second, third, fourth, and fifth user devices 2402, 2406, 2410, 2421, 2425 and/or the earphone devices 2415, 2430, or through other suitable means. Additionally, the application may allow users and computing devices to create accounts with the application and sign-in to the created accounts with authenticating username and password log-in combinations. The application may include a custom graphical user interface that the first user 2401 or second user 2420 may interact with by utilizing a browser executing on the first, second, third, fourth, and fifth user devices 2402, 2406, 2410, 2421, 2425 and/or the earphone devices 2415, 2430. In certain embodiments, the software application may execute directly as an installed program on the first, second, third, fourth, and fifth user devices 2402, 2406, 2410, 2421, 2425 and/or the earphone devices 2415, 2430.

Computing System for Facilitating the Operation and Functionality of the System

Figure 9:
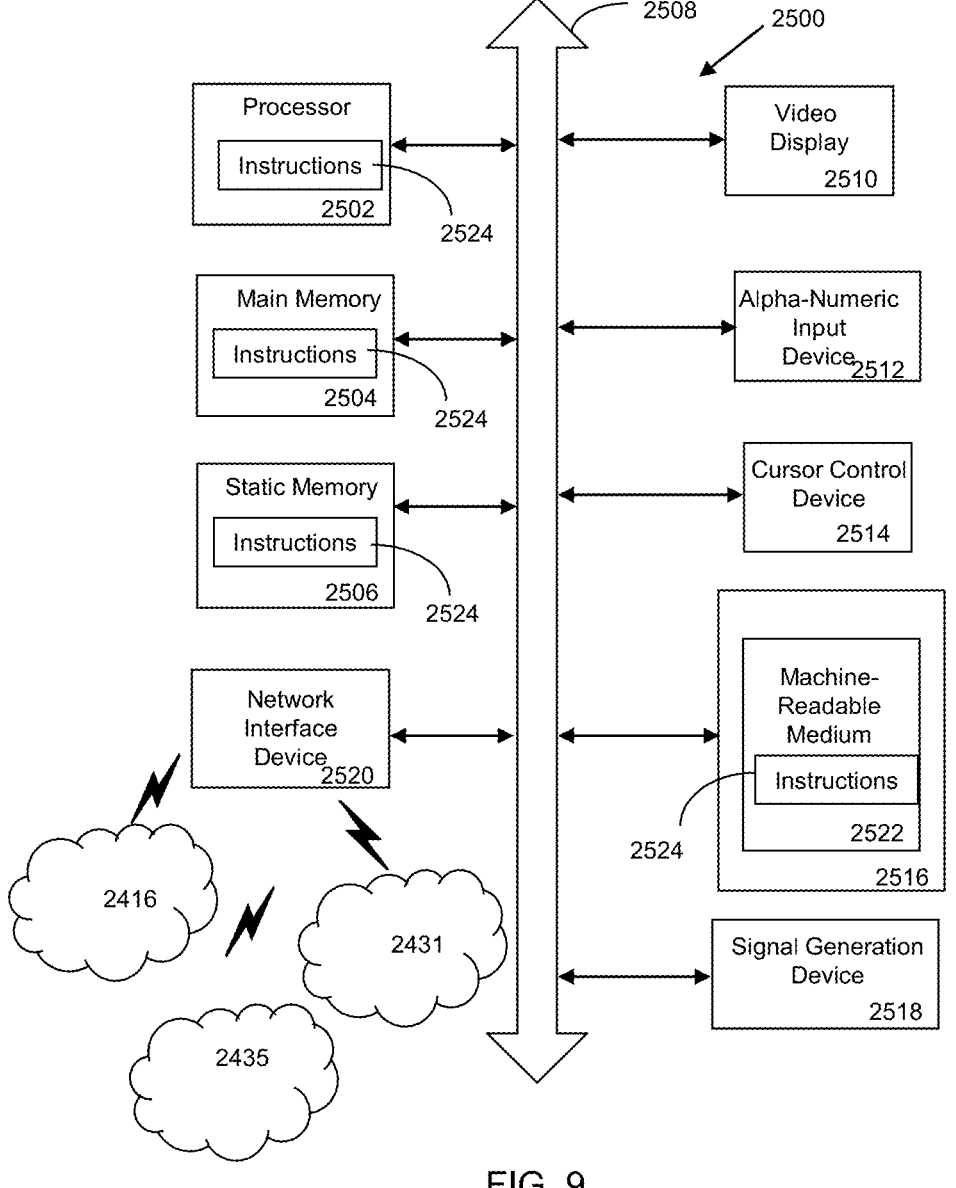
FIG. 9 is a schematic diagram of a machine in the form of a computer system which a set of instructions, when executed, may cause the machine to perform any one or more of the methodologies or operations of the systems and methods for utilizing an earphone according to embodiments of the present disclosure.

Referring now also to FIG. 9, at least a portion of the methodologies and techniques described with respect to the exemplary embodiments of the system 2400 can incorporate a machine, such as, but not limited to, computer system 2500, or other computing device within which a set of instructions, when executed, may cause the machine to perform any one or more of the methodologies or functions discussed above. The machine may be configured to facilitate various operations conducted by the system 2400. For example, the machine may be configured to, but is not limited to, assist the system 2400 by providing processing power to assist with processing loads experienced in the system 2400, by providing storage capacity for storing instructions or data traversing the system 2400, by providing functionality and/or programs for facilitating the operative functionality of the earphone devices 2415, 2430, and/or the first, second, third, fourth, and fifth user devices 2402, 2406, 2410, 2421, 2425 and/or the earphone devices 2415, 2430, by providing functionality and/or programs for facilitating operation of any of the components of the earphone devices 2415, 2430 (e.g. ear canal receivers, transceivers, ear canal microphones, ambient sound microphones, or by assisting with any other operations conducted by or within the system 2400.

In some embodiments, the machine may operate as a standalone device. In some embodiments, the machine may be connected (e.g., using communications network 2435, the communications network 2416, the communications network 2431, another network, or a combination thereof) to and assist with operations performed by other machines and systems, such as, but not limited to, the first user device 2402, the second user device 2411, the third user device 2410, the fourth user device 2421, the fifth user device 2425, the earphone device 2415, the earphone device 2430, the server 2440, the server 2450, the database 2455, the server 2460, or any combination thereof. The machine may be connected with any component in the system 2400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU, or both), a main memory 2504 and a static memory 2506, which communicate with each other via a bus 2508. The computer system 2500 may further include a video display unit 2510, which may be, but is not limited to, a liquid crystal display (LCD), a flat panel, a solid state display, or a cathode ray tube (CRT). The computer system 2500 may include an input device 2512, such as, but not limited to, a keyboard, a cursor control device 2514, such as, but not limited to, a mouse, a disk drive unit 2516, a signal generation device 2518, such as, but not limited to, a speaker or remote control, and a network interface device 2520.

The disk drive unit 2516 may include a machine-readable medium 2522 on which is stored one or more sets of instructions 2524, such as, but not limited to, software embodying any one or more of the methodologies or functions described herein, including those methods illustrated above. The instructions 2524 may also reside, completely or at least partially, within the main memory 2504, the static memory 2506, or within the processor 2502, or a combination thereof, during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2522 containing instructions 2524 so that a device connected to the communications network 2435, the communications network 2416, the communications network 2431, another network, or a combination thereof, can send or receive voice, video or data, and communicate over the communications network 2435, the communications network 2416, the communications network 2431, another network, or a combination thereof, using the instructions. The instructions 2524 may further be transmitted or received over the communications network 2435, another network, or a combination thereof, via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (nonvolatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

In at least one embodiment the step of measuring the vocalization of the user with an ear canal microphone and an ambient sound microphone refers to the microphone measuring the acoustic environment to which it is exposed, where the acoustic environment can include the user's voice or another's voice, and where the system 2400 can be configured to separate the user's voice from another's by comparing the ECM pickup with the ASM. For example, the ECM will primarily pick-up the user's voice whose spectrum can be compared to the ASM pickup spectrum to separate out the user's voice in the ASM pickup from the ambient environment. For example, parsing the temporal signal from the ECM and ASM into blocks, e.g., 256, and performing an FFT on the block, then looking at the amplitude and phase.

In at least one embodiment determining whether the user is in a noisy or quiet environment refers to measuring the SPL levels of the acoustic environment sampled by the ECM and ASM, and comparing the SPL levels to NIOSH and EPA standards for noise exposure, for example, a threshold level of 85 dB can be used as a threshold above which can be referred to as noisy, whereas a different lower level can be used to determine quiet, for example levels below 60 dB can be referred to as quiet. Note those these threshold values are non-limiting examples.

While the present invention has been described with reference to exemplary embodiments, it is to be understood that the invention is not limited to the disclosed exemplary embodiments. The scope of the following claims is to be accorded the broadest interpretation to encompass all modifications, equivalent structures and functions of the relevant exemplary embodiments. For example, if words such as "orthogonal", "perpendicular" are used, the intended meaning is "substantially orthogonal" and "substantially perpendicular" respectively. Additionally, although specific numbers may be quoted in the claims, it is intended that a number close to the one stated is also within the intended scope, i.e. any stated number (e.g., 20 mils) should be interpreted to be "about" the value of the stated number (e.g., about 20 mils).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A system:
a display configured to visually display a mixed visual signal;
a camera configured to generate a camera signal;
a first microphone configured to generate a first microphone signal, wherein the first microphone is oriented to pick up a user's voice;
a second microphone configured to generate a second microphone signal, wherein the second microphone is oriented to pick up ambient sound;
a first speaker;
a second speaker;
a memory configured to store instructions; and
a processor that executes the instructions to perform operations, the operations comprising:
receiving the first microphone signal;
receiving the second microphone signal;
receiving a stored virtual audio signal;
receiving a stored virtual visual signal;
receiving the camera signal;
mixing a portion of the camera signal with the stored virtual visual signal to form a mixed visual signal;
mixing the first microphone signal and the second microphone signal and the virtual audio signal to form a mixed audio signal;
sending the mixed audio signal to the first speaker and the second speaker; and
sending the mixed visual signal to the display.

2. The system according to claim 1, wherein the portion of the camera signal is configured to fit the display as if the user could look through the display to the view behind the display.

3. The system according to claim 1, wherein when mixing the first microphone signal and the second microphone signal and the virtual audio signal to form a mixed audio signal, the signals are time matched when mixed.

4. The system according to claim 1, wherein when mixing a portion of the camera signal with the stored virtual visual signal to form a mixed visual signal, the signals are time matched when mixed.

5. The system according to claim 3, wherein when mixing a portion of the camera signal with the stored virtual visual signal to form a mixed visual signal, the signals are time matched when mixed.

6. The system according to claim 1, the operations further comprising:

time matching the mixed audio signal with the mixed visual signal.

7. The system according to claim 1, wherein the operations further comprise:

analyzing the first microphone signal to detect the voice of a user.

8. The system according to claim 1, wherein the operations further comprise:

analyzing the mixed audio signal to detect the voice of a user.

9. The system according to claim 1, wherein the operations further comprise:

analyzing the second microphone signal to detect the voice of a person other than the user.

10. The system according to claim 1, wherein the operations further comprise:

analyzing the mixed audio signal to detect the voice of a person other than the user.

11. The system according to claim 7, wherein the operations further comprise:

analyzing the first microphone signal to detect a voice command if the voice of the user is detected.

12. The system according to claim 8, wherein the operations further comprise:

analyzing the first microphone signal to detect a voice command if the voice of the user is detected.

13. The system according to claim 11, wherein the operations further comprise:

performing an action in response to the voice command.

14. The system according to claim 12, wherein the operations further comprise:

performing an action in response to the voice command.

15. The system according to claim 1, wherein the system is a VR goggle.

16. The system according to claim 1, wherein the system is an AR goggle.

17. The system according to claim 1, wherein the first speaker is part of a left earphone.

18. The system according to claim 1, wherein the second speaker is part of a right earphone.

* * * * *